(12) United States Patent
Freedman et al.

(10) Patent No.: US 12,213,619 B2
(45) Date of Patent: *Feb. 4, 2025

(54) METHOD AND APPARATUS FOR FORMING FROZEN BEVERAGE BLOCKS

(71) Applicant: FBW, Inc., Ivyland, PA (US)

(72) Inventors: Joel Freedman, Ivyland, PA (US); Shea Barr, Downingtown, PA (US); Michael Willson, King of Prussia, PA (US)

(73) Assignee: FBW, Inc., Ivyland, PA (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/709,524

(22) Filed: Mar. 31, 2022

(65) Prior Publication Data

US 2022/0218145 A1 Jul. 14, 2022

Related U.S. Application Data

(63) Continuation of application No. 16/367,972, filed on Mar. 28, 2019, now Pat. No. 11,297,976, which is a
(Continued)

(51) Int. Cl.
| | |
|---|---|
| *A47J 31/56* | (2006.01) |
| *A23F 5/26* | (2006.01) |
| *A23G 9/04* | (2006.01) |
| *A23G 9/08* | (2006.01) |
| *A47J 31/06* | (2006.01) |

(Continued)

(52) U.S. Cl.
CPC ............... *A47J 31/56* (2013.01); *A23F 5/26* (2013.01); *A23G 9/04* (2013.01); *A23G 9/083* (2013.01); *A47J 31/06* (2013.01); *F25C 1/04* (2013.01); *F25C 1/25* (2018.01); *A23G 9/221* (2013.01); *F25C 2700/04* (2013.01)

(58) Field of Classification Search
CPC .......... A47J 31/10; A47J 31/50; A47J 31/057; A47J 31/462; A47J 31/4403; A47J 31/56; A23G 9/04; A23G 9/083; A23G 9/221; F25C 1/00; F25C 1/04; F25C 1/25; F25C 2700/04
USPC .......... 99/284, 290, 304, 306; 426/524, 590, 426/594, 597; 62/340
See application file for complete search history.

(56) References Cited

U.S. PATENT DOCUMENTS

| | | | |
|---|---|---|---|
| 5,406,805 | A | 4/1995 | Radermacher et al. |
| 5,724,883 | A | 3/1998 | Usherovich |

(Continued)

FOREIGN PATENT DOCUMENTS

EP 1842430 10/2007

*Primary Examiner* — Reginald Alexander
(74) *Attorney, Agent, or Firm* — BELLES KATZ LLC

(57) ABSTRACT

A method or apparatus for forming frozen beverage blocks from a liquid beverage. The method may include introducing a beverage into a beverage receiving reservoir. Next, the beverage may flow from the beverage receiving reservoir into a holding tank. The flow from the beverage receiving reservoir into the holding tank may be done entirely via gravity. Upon the temperature of the beverage located within the holding tank being measured at or below a predetermined lower threshold temperature, the beverage may be permitted to flow from the holding tank into a cool beverage reservoir of a freezing subsystem. The freezing subsystem may be configured to convert the beverage from a liquid into frozen beverage blocks.

15 Claims, 25 Drawing Sheets

Related U.S. Application Data continuation-in-part of application No. 15/582,942, filed on May 1, 2017, now abandoned.

(60) Provisional application No. 62/331,250, filed on May 3, 2016.

(51) Int. Cl.
*F25C 1/04* (2018.01)
*F25C 1/25* (2018.01)
*A23G 9/22* (2006.01)

(56) References Cited

U.S. PATENT DOCUMENTS

| | | |
|---|---|---|
| 8,429,925 B2 | 4/2013 | Marx |
| 9,038,410 B2 | 5/2015 | Erbs et al. |
| 9,066,529 B2 | 6/2015 | Fassberg et al. |
| 9,357,874 B2 | 6/2016 | Licare |
| 2002/0130137 A1 | 9/2002 | Greenwald et al. |
| 2007/0051248 A1 | 3/2007 | Lee et al. |
| 2007/0024330 A1 | 9/2007 | Cheng |
| 2008/0066483 A1 | 3/2008 | Klier et al. |
| 2010/0223946 A1 | 9/2010 | Fuenten et al. |
| 2011/0039009 A1 | 2/2011 | Jones et al. |
| 2012/0192584 A1 | 8/2012 | Fiaschi |
| 2015/0250225 A1 | 9/2015 | Hata et al. |
| 2016/0324363 A1 | 11/2016 | Cohen |
| 2019/0316823 A1 | 10/2019 | Inamori et al. |

METHOD AND APPARATUS FOR FORMING FROZEN BEVERAGE BLOCKS

CROSS-REFERENCE TO RELATED APPLICATIONS

The present application is a continuation of U.S. patent application Ser. No. 16/367,972, filed Mar. 28, 2019, now U.S. Pat. No. 11,297,976, issued Apr. 12, 2022, which is a continuation-in-part of U.S. patent application Ser. No. 15/582,942, filed May 1, 2017, now abandoned, which claims the benefit of U.S. Provisional Patent Application Ser. No. 62/331,250, filed May 3, 2016, the entireties of which are hereby incorporated herein by reference.

BACKGROUND OF THE INVENTION

Today, coffee shops serve many different types of iced coffee beverages. This is generally achieved by pouring hot coffee into a cup that is pre-filled with ice cubes or pouring ice cubes into a cup that is pre-filled with hot coffee. However, this solution results in the iced coffee product being diluted, thereby negatively affecting the flavor and taste of the iced coffee beverage. A current option for the coffee shop to avoid dilution of its iced coffee products is to brew coffee, manually pour the brewed coffee into an ice cube tray, and then place the loaded ice cube tray into a freezer for freezing. However, this is a time consuming process and if the coffee shop employee forgets to initiate the process, the coffee shop will be left without any available coffee ice cubes. Thus, a need exists for a solution to the above-noted problem.

BRIEF SUMMARY OF THE INVENTION

The present invention is directed to a method of forming frozen beverage blocks from a liquid beverage. The method may include introducing a beverage into a hot beverage reservoir of a beverage receiving subsystem to initiate the process. Next, the beverage may flow from the hot beverage reservoir of the beverage receiving subsystem into a cooling subsystem. The flow from the hot beverage reservoir into the cooling subsystem and also through the cooling subsystem may be done entirely via gravity. Cool air may be blown across the cooling subsystem to cool the beverage as the beverage flows through the cooling subsystem. Upon the temperature of the beverage being measured at or below a predetermined lower threshold temperature, the beverage may be permitted to flow, via gravity, from the cooling subsystem into a cool beverage reservoir of a freezing subsystem. The freezing subsystem may be configured to convert the beverage from a liquid into frozen beverage blocks.

In one embodiment, the invention may be an integrated apparatus for brewing and cooling a beverage, the integrated apparatus comprising: a hot water supply subsystem configured to heat water to form hot water; a brewing subsystem configured to receive and mix the hot water generated by the hot water supply subsystem with a beverage additive to form a hot beverage; a cooling subsystem configured to receive the hot beverage generated by the brewing sub-system, cool the hot beverage to form a cooled beverage, and discharge the cooled beverage to a cool beverage reservoir of a freezing subsystem; and wherein liquid flow of the hot water, the hot beverage, and the cooled beverage along a primary beverage processing flow path from the hot water supply subsystem to the cool beverage reservoir of the freezing subsystem is gravity driven.

In another embodiment, the invention may be an integrated apparatus for brewing and cooling a beverage, the integrated apparatus comprising: a hot water supply subsystem configured to heat water to form hot water, the hot water supply system comprising a hot water outlet at a first elevation; a brewing subsystem configured to receive and mix the hot water generated by the hot water supply subsystem with a beverage additive to form a hot beverage, the brewing subsystem comprising a hot water inlet at a second elevation that is less than the first elevation, and a hot beverage outlet that is at a third elevation that is less than the second elevation; a cooling subsystem configured to receive the hot beverage generated by the brewing sub-system and cool the hot beverage to form a cooled beverage, the cooling subsystem comprising a hot beverage inlet located at a fourth elevation that is less than the third elevation, and cooled beverage outlet that is located a fifth elevation that is less than the fourth elevation.

In still another embodiment, the invention may be an integrated apparatus for brewing and cooling a beverage, the integrated apparatus comprising: a first housing enclosing: a hot water supply subsystem; a brewing subsystem configured to receive and mix hot water generated by the hot water supply subsystem with a beverage additive to form a hot beverage; a cooling subsystem configured to receive the hot beverage generated by the brewing sub-system and cool the hot beverage to form a cooled beverage; and a second housing, the first housing positioned atop the second housing, the second housing enclosing: a freezing subsystem configured to freeze the cooled beverage generated by the cooling subsystem to form a frozen beverage and discharge the frozen beverage as a plurality of frozen beverage cubes.

In yet another embodiment, the invention may be a method of brewing and cooling a beverage comprising: a) heating water in a first portion of a beverage processing flow path to form hot water; b) gravity flowing the hot water generated in the first portion of the beverage processing flow path through a second portion of the beverage processing flow path, and introducing an additive into the hot water while the hot water is flowing through the second portion of the beverage processing flow path, thereby forming a hot beverage; c) gravity flowing the hot beverage from the second portion of the beverage processing flow path into a third portion of the beverage processing flow path, and cooling the hot beverage while in the third portion of the beverage processing flow path, thereby forming a cooled beverage; and d) gravity flowing the cooled beverage from the third portion of the beverage processing flow path into a freezing subsystem.

In a further embodiment, the invention may be an integrated apparatus for brewing and cooling a beverage, the integrated apparatus comprising: a hot water supply subsystem configured to heat water to form hot water; a brewing subsystem configured to receive and mix the hot water generated by the hot water supply subsystem with a beverage additive to form a hot beverage; a heat exchanger configured to receive the hot beverage generated by the brewing sub-system and cool the hot beverage to form a cooled beverage; and an air flow generator configured to generate a cooling air flow across the outer surfaces of the heat exchanger.

In a still further embodiment, the invention may be an integrated apparatus for brewing and cooling a beverage, the integrated apparatus comprising: a first housing: a hot water supply subsystem located within the first housing and configured to heat water to form hot water; a brewing subsystem located within the first housing and configured to receive and mix the hot water generated by the hot water supply subsystem with a beverage additive to form a hot beverage, the brewing subsystem located below the hot water supply subsystem; and a cooling subsystem located within the first housing and configured to receive the hot beverage generated by the brewing sub-system, cool the hot beverage to form a cooled beverage, and discharge the cooled beverage to a cool beverage reservoir of a freezing subsystem, the cooling subsystem located below the brewing subsystem.

In one aspect, the invention may be a method of forming frozen beverage blocks comprising: a) introducing a beverage into a hot beverage reservoir of a beverage receiving subsystem; b) flowing the beverage, solely via gravity, from the hot beverage reservoir of the beverage receiving subsystem into a cooling subsystem and blowing cooling air across the cooling subsystem to cool the beverage as the beverage flows through the cooling subsystem, wherein the beverage is prevented from exiting the cooling subsystem until a temperature of the beverage is measured to be at or below a predetermined lower threshold temperature; c) upon the temperature of the beverage being measured at or below the predetermined lower threshold temperature, allowing the beverage to flow, solely via gravity, from the cooling subsystem into a cool beverage reservoir of a freezing subsystem; and d) forming frozen beverage blocks from the beverage in the freezing subsystem.

In another aspect, the invention may be a method of forming frozen beverage blocks comprising: a) introducing a beverage into a hot beverage reservoir of a beverage receiving subsystem; b) flowing the beverage from the hot beverage reservoir of the beverage receiving subsystem into a cooling tube of a cooling subsystem while cooling air is blowing across the cooling tube of the cooling subsystem; c) flowing the beverage from the cooling tube of the cooling subsystem into a chiller tank of the cooling subsystem and holding the beverage in the chiller tank of the cooling subsystem while the cooling air is blowing across the chiller tank of the cooling subsystem; d) measuring a temperature of the beverage in the chiller tank of the cooling subsystem using a temperature sensor that is operably coupled to a controller and preventing the beverage from exiting the chiller tank until the temperature of the beverage is at or below a predetermined lower threshold temperature; e) upon the temperature of the beverage reaching the predetermined lower threshold temperature, the controller opening a valve that is downstream of the chiller tank so that the beverage flows from the chiller tank of the cooling subsystem into a cool beverage reservoir of a freezing subsystem; and f) wherein the freezing subsystem is configured to: (1) freeze the beverage to form a frozen beverage; and (2) discharge the frozen beverage as a plurality of frozen beverage blocks.

In a further aspect, the invention may be a method of forming frozen coffee blocks comprising: introducing coffee into a hot beverage reservoir; flowing the coffee from the hot beverage reservoir into and through a cooling tube that defines a serpentine-shaped flow path and blowing air across the cooling tube to cool the coffee while the coffee flows through the cooling tube; flowing the coffee from the cooling tube into a cavity of a chiller tank and blowing air across the chiller tank to cool the coffee while the coffee is held in the cavity of the chiller tank; measuring a temperature of the coffee that is in the cavity of the chiller tank using a temperature sensor that is operably coupled to a controller, wherein the coffee is prevented from exiting the chiller tank until a temperature of the coffee in the cavity of the chiller tank is measured to be at or below a predetermined lower threshold temperature; upon the temperature of the coffee in the cavity of the chiller tank being measured to be at or below the predetermined lower threshold temperature, the controller opening a valve to allow the coffee to flow from the cavity of the chiller tank into a cool beverage reservoir of a freezing subsystem; and wherein the freezing subsystem is configured to freeze the coffee to form frozen coffee blocks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
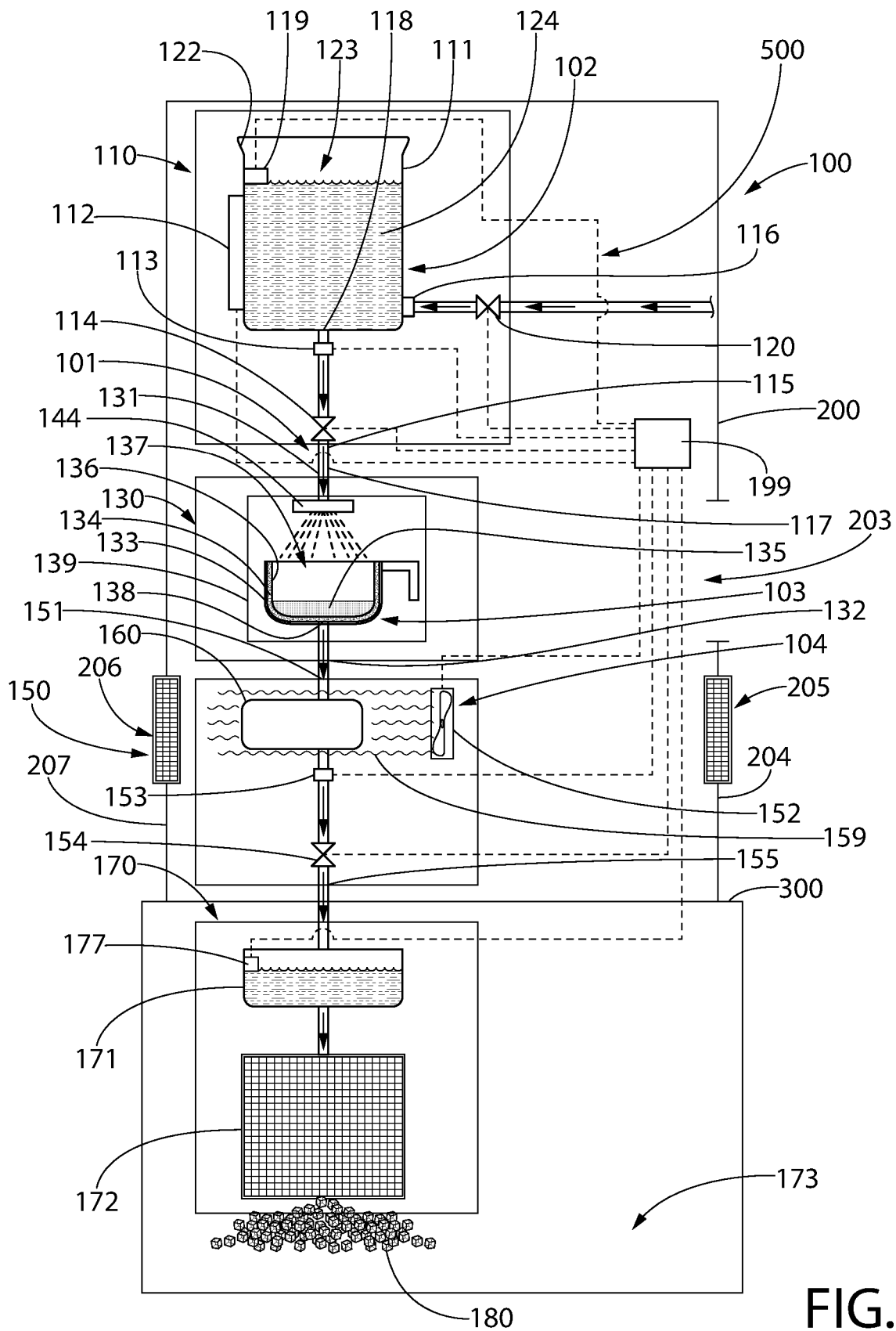
FIG. 1 is a fluid circuit schematic of an integrated apparatus for brewing and cooling a beverage in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
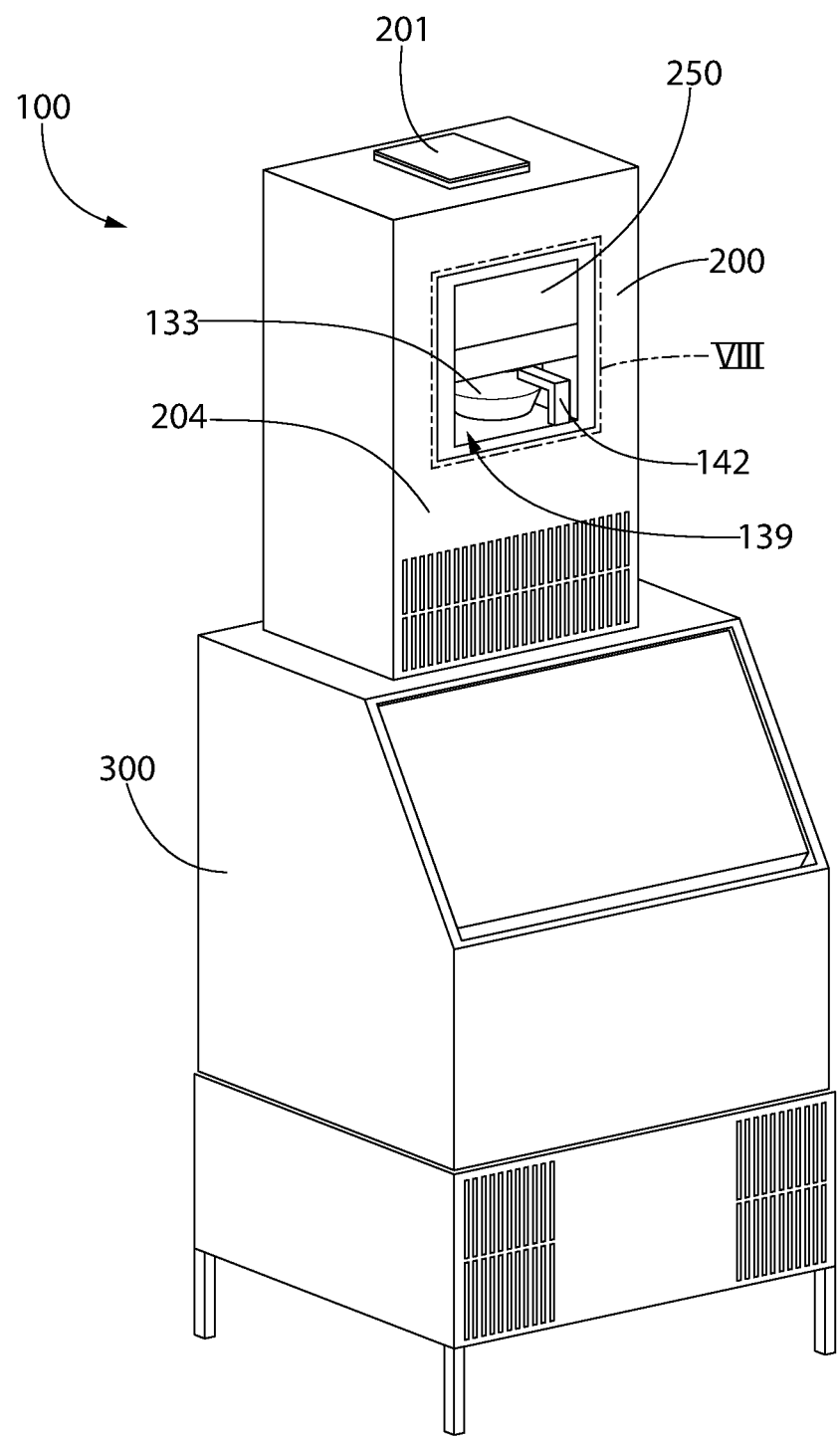
FIG. 2 is a front perspective view of an integrated apparatus for brewing and cooling a beverage in accordance with an embodiment of the present invention, the integrated apparatus including a first housing positioned atop a second housing.
Figure 3:
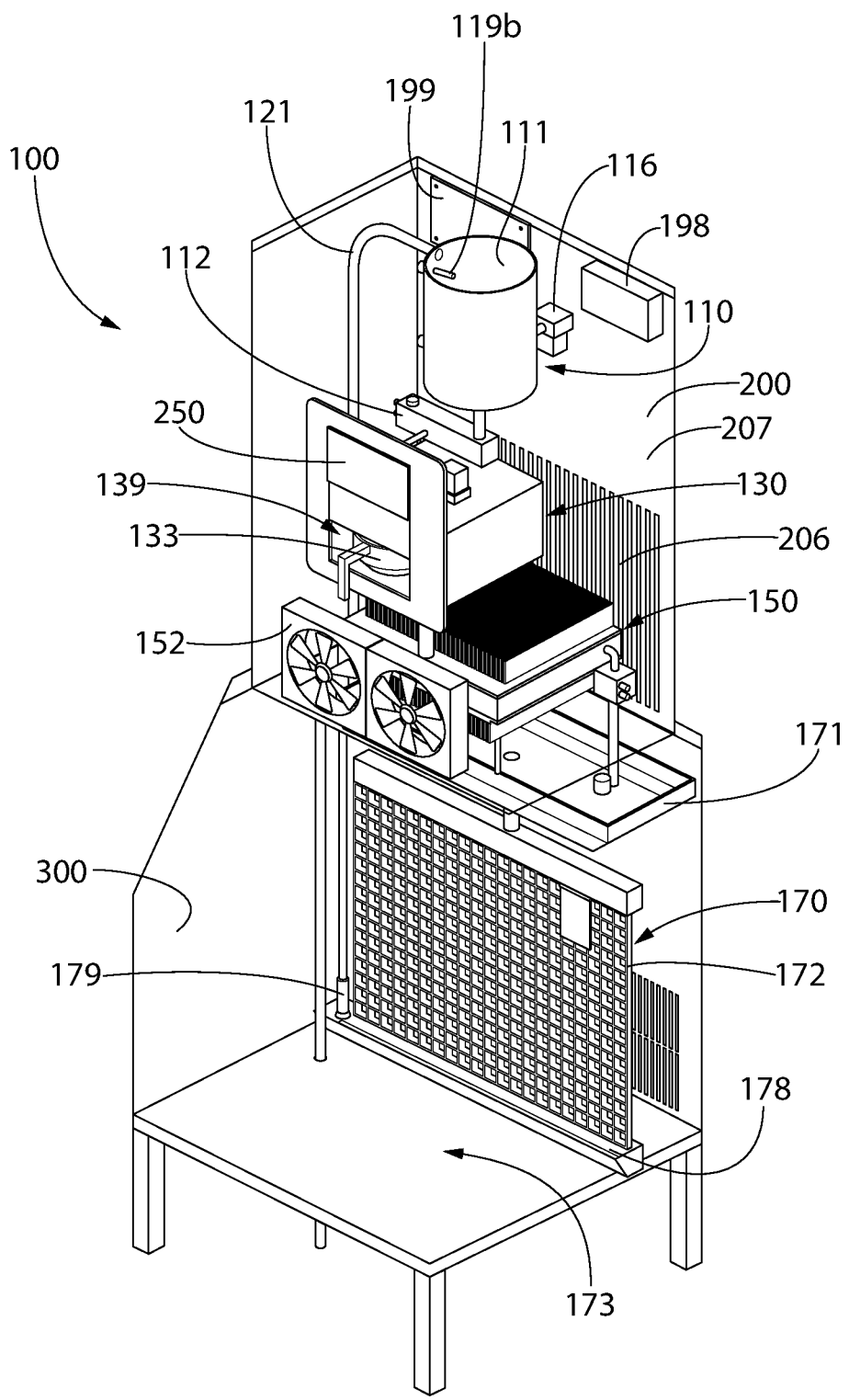
FIG. 3 is a partially cut-away front perspective view of the integrated apparatus of FIG. 2 illustrating the subsystems and components enclosed within both of the first and second housings.
Figure 4:
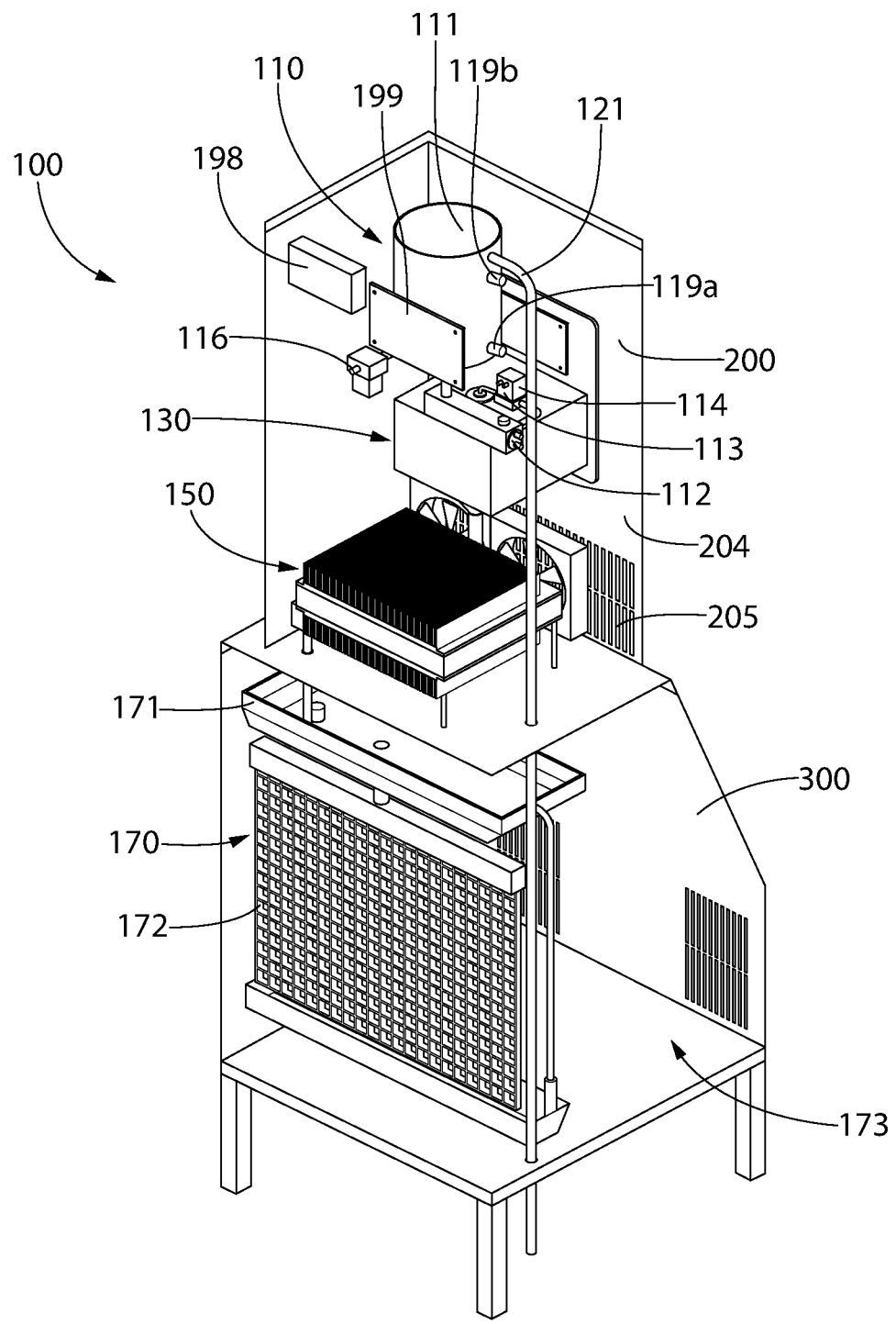
FIG. 4 is a partially cut-away rear perspective view of the integrated apparatus of FIG. 2 illustrating the subsystems and components enclosed within both of the first and second housings.

Referring to FIGS. 1-4 concurrently, an integrated apparatus for brewing and cooling a beverage (hereinafter "the integrated apparatus") 100 will be described in accordance with an embodiment of the present invention. FIG. 1 illustrates a fluid flow and circuit schematic 500 of the integrated apparatus 100, FIG. 2 illustrates an exterior of the integrated apparatus 100, and FIGS. 3 and 4 illustrate partial cut-away views of the integrated apparatus 100 (with panels of the housing of the integrated apparatus 100 removed) so that the internal components are visible. In general terms, the integrated brewing and cooling apparatus 100 is configured to brew a hot beverage, cool the hot beverage to approximately room temperature thereby forming a cooled beverage, and then freeze the cooled beverage to form a frozen beverage that can be discharged as a plurality of frozen beverage cubes. In certain embodiments, the beverage is coffee, although the invention is not to be so limited in all embodiments and it is possible that the beverage may be other types of drinkable liquids, particularly those that are initially brewed in a heated state such as tea, although other drinkable liquids may also be included within the scope of the invention as set forth herein even if not initially brewed in a heated state. Thus, the integrated apparatus 100 described herein brews or otherwise generates a hot beverage from hot water and then creates ice cubes from the hot water automatically and without user input other than to initiate a brewing cycle.

The integrated apparatus 100 generally comprises a hot water supply subsystem 110 that is configured to heat water to form hot water, a brewing subsystem 130 that is configured to receive and mix the hot water generated by the hot water supply subsystem 110 with a beverage additive (such as, for example without limitation, ground coffee beans, tea leaves, or the like) to form a hot beverage, a cooling subsystem 150 configured to receive the hot beverage generated by the brewing sub-system and cool the hot beverage to form a cooled beverage, and a freezing subsystem 170 configured to freeze the cooled beverage to form a frozen beverage, which may be in the form of frozen beverage cubes that can be added to a cup that is used for drinking. As discussed in more detail below, the freezing subsystem 170 comprises a cool beverage reservoir 171 for storing the cooled beverage discharged from the cooling subsystem 150 and a beverage ice maker 172. As will be discussed herein, in the exemplified embodiment the entirety of the liquid flow of: (1) the hot water from the hot water supply subsystem 110 to the brewing subsystem 130; (2) the hot beverage from the brewing subsystem 130 to the cooling subsystem 150; and (3) the cooled beverage from the cooling subsystem 150 to the cool beverage reservoir of the freezing subsystem 170 is gravity driven and is achieved without the use of any pumps or pressurization of the liquid to force its flow. Stated another way, the integrated apparatus 100 is free of any pumps that force liquid flow from the hot water supply subsystem 110 to the freezing subsystem 170. Furthermore, this process takes place without user intervention automatically once the brewing process begins. Thus, solely by gravity the liquid moves from the hot water supply subsystem 110 all the way into the freezing subsystem 170 as various valves are opened and closed. There may be one or more pumps used in the freezing subsystem 170, but upstream of the freezing subsystem 170 no pumps are included in the system or apparatus.

The liquid flows from the hot water supply subsystem 110 to the freezing subsystem 170 along a primary beverage processing flow path 101 of the integrated apparatus 100. The entirety of the liquid flow along the primary beverage processing flow path 101 is gravity driven. The hot water supply subsystem 110 is configured to heat water (or another liquid) in a first portion 102 of the primary beverage processing flow path 101 to form the hot water. The brewing subsystem 130 is configured to introduce an additive (i.e., ground coffee beans, tea leaves, or the like) into the hot water in a second portion 103 of the primary beverage processing flow path 101 to form the hot beverage. The cooling subsystem 150 is configured to cool the hot water in a third portion 104 of the primary beverage processing flow path 101 to form the cooled beverage. The hot water generated in the first portion 102 of the primary beverage processing flow path 101 flows solely via gravity into the second portion 103 of the primary beverage processing flow path 101. The hot beverage generated in the second portion 103 of the primary beverage processing flow path 101 flows solely via gravity into the third portion 103 of the primary beverage processing flow path 101. The cooled beverage generated in the third portion 103 of the primary beverage processing flow path 101 flows solely via gravity into the freezing subsystem 170.

Still referring to FIGS. 1-4 concurrently, in the exemplified embodiment the integrated apparatus 100 comprises a first housing 200 and a second housing 300. The hot water supply subsystem 110, the brewing subsystem 130, and the cooling subsystem 150 are located within the first housing 200 while the freezing subsystem 170 including the cool beverage reservoir 171, the beverage ice maker 172, and a freezer compartment 173 is located within the second housing 300. Thus, all of the components for brewing and cooling the beverage (i.e., coffee) are provided in the first housing 200 while all of the components for freezing the beverage (i.e., coffee) into beverage ice cubes are provided in the second housing 300. In the exemplified embodiment, the first housing 200 is positioned atop the second housing 300. The first and second housings 200, 300 are distinct from one another although the components held within the first and second housings 200, 300 are fluidly coupled together so that the fluid can flow from the cooling subsystem 150 within the first housing 200 into the freezing subsystem 170 within the second housing 300.

Each of the first and second housings 200, 300 may be formed from several panels that are formed of a stainless steel material such that each of the first and second housings 200, 300 forms a stainless steel cabinet for housing the various subsystems contained therein. However, the invention is not to be so limited and the first and second housings 200, 300 may be formed of other materials including other metals or non-metal materials such as plastic. Furthermore, the various dimensions of the first and second housings, including width, length, and height is not to be limiting of the present invention in all embodiments. For example, in the exemplified embodiment the first housing 200 has a smaller width than the second housing 300, although the widths of the first and second housings 200, 300 (and their lengths) may be the same in other embodiments.

Figure 9:
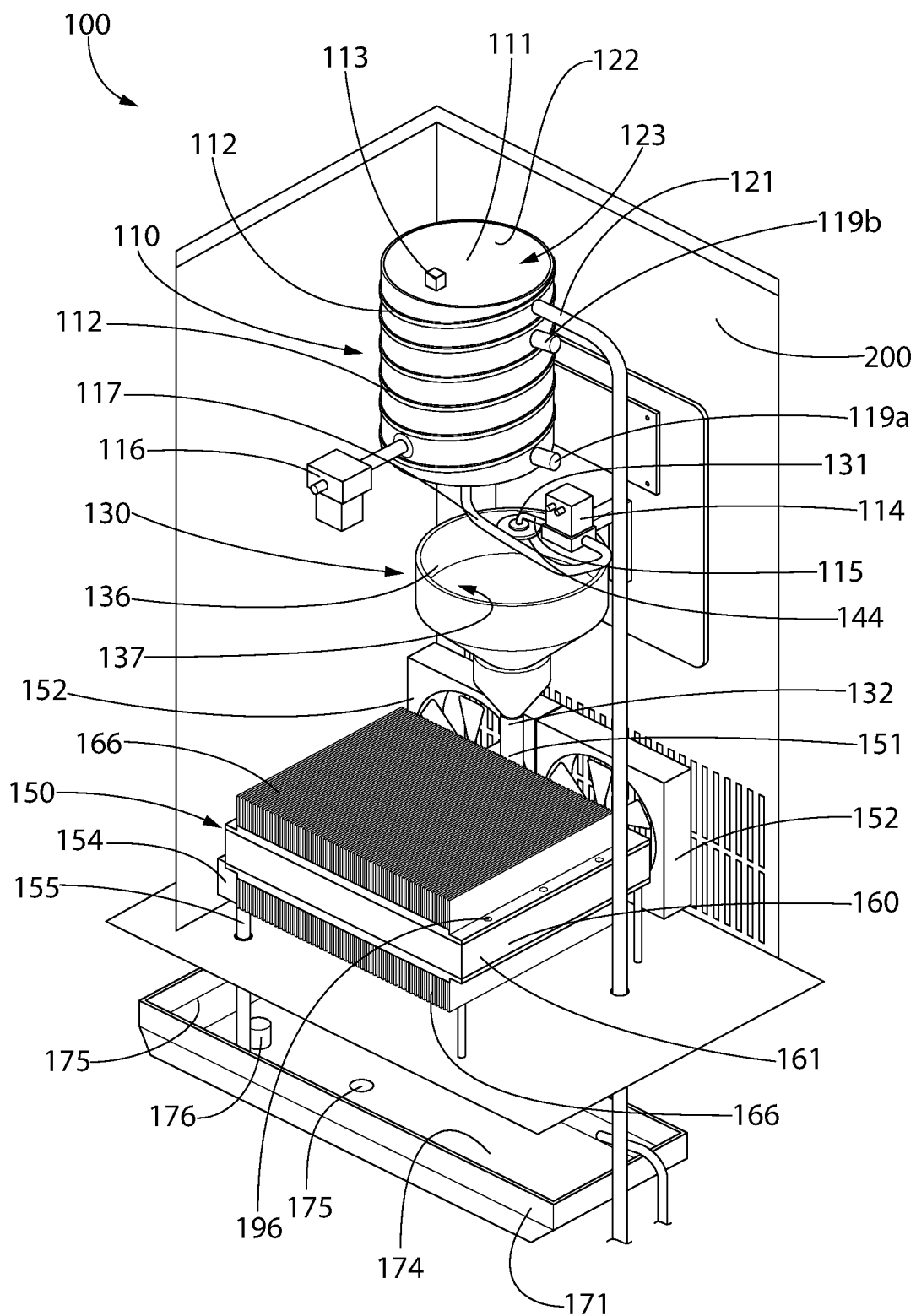
FIG. 9 is a partially cut-away view of the first housing of FIG. 2 in accordance with one embodiment of the present invention.

Referring to FIGS. 1 and 9 (and other figures that may be mentioned below to direct attention to a specific feature of the integrated apparatus 100), each of the subsystems that is enclosed within the first housing 200 will be described below to provide a better understanding of the various components that are included within each subsystem. To facilitate this description, it is noted that the integrated apparatus 100 includes a controller 199 that is operably coupled to several different sensors and valves within the different subsystems to control operation of the integrated apparatus 100. In the exemplified embodiment, the controller 199 (and a power source 198 for powering the controller 199 and other electric components of the integrated apparatus 100) is located within the first housing 200, although the controller 199 could be located in the second housing 300 or externally to the first and second housings 200, 300 in other embodiments. The power source 198 and the controller 199 are operably coupled to each other and to each electrical component that requires power and/or sends instructions to or receives instructions from the controller 199.

Based on temperature readings from various sensors and inputs from a control panel, the controller 199 is configured to activate and deactivate heating elements and air flow generators and open and close valves as needed to prevent overflow and to ensure operation of the integrated apparatus 100 is maintained in accordance with predetermined operating parameters and procedures. For example, in some embodiments the controller 199 will not allow the water/liquid to flow from the hot water supply subsystem 110 to the brewing subsystem 130 until the water is heated to a desired temperature. The function of the controller 199 in carrying out the operation of the integrated apparatus 100 will be described in much more detail below.

The controller 199 may in some embodiments comprise a processor and a memory device. The processor and memory device may be separate components or the memory device may be integrated with the processor within the controller 199 as is the case in the exemplified embodiment. Furthermore, the controller 199 may include only one processor and one memory device, or it may include multiple processors and multiple memory devices.

The processor of the controller 199 may be any computer or central processing unit (CPU), microprocessor, microcontroller, computational device, or circuit configured for executing some or all of the processes described herein, including without limitation: (1) activation and deactivation of heating elements: (2) activation and deactivation of an air flow generator; and (3) opening and closing of valves.

The memory device of the controller 199 may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by the processor which is operably connected thereto. The memory device may store algorithms and/or calculations that can be used (by the processor) to determine when to open/close and activate/deactivate the various electrical components of the system described herein.

The hot water supply subsystem 110 generally comprises a water tank 111, one or more heating elements 112, a first temperature sensor 113, a hot water valve 114, a hot water outlet 115, a water supply inlet 116, and a liquid level sensor 119 (which may include float switches 119a, 119b). Each of the heating elements 112, the first temperature sensor 113, the hot water valve 114, and the liquid level sensor 119 is operably coupled to the controller 199 (FIG. 1) so that the controller 199 can control operation of the heating elements 112 (on/off and varying their temperature) and the hot water valve 114 (open all the way, closed all the way, or something in between) based at least in part on data sent to the controller 199 from the first temperature sensor 113. The controller 199 can also control the inflow of water through the water supply inlet 116 into the water tank 111 based on data sent to the controller 199 from the liquid level sensor 119. Specifically, if the liquid level sensor 119 indicates that the level of the liquid in the water tank 111 is low, the controller 199 may automatically cause water to flow into the water tank 111 via the water supply inlet 116 (which is coupled to a water source such as a water supply line). If the liquid level sensor 119 indicates that the level of the liquid in the water tank 111 is high, the controller 199 may stop flow of the liquid into the water tank 111 via the water supply inlet 116. This can be done automatically without any user intervention or input based on communication between the controller 199 and the various electrical components mentioned.

A hot water conduit 117 extends from an outlet opening 118 in a bottom of the tank 111 of the hot water supply subsystem 110 to the brewing subsystem 130 to permit the hot water heated by the hot water supply subsystem 110 to flow into the brewing subsystem 130 as needed. The hot water conduit 117 may be a pipe, a tube, or the like formed of any desired material (plastic such as PVC (polyvinyl chloride), copper, lead, stainless steel, or the like) and having any desired cross-section that permits fluid to flow therethrough. In some embodiments, the heating elements 112, the temperature sensor 113, the hot water valve 114, and the hot water outlet 115 of the hot water supply subsystem 110 may be located along the hot water conduit 117.

The water tank 111 has an inner surface 122 that defines an internal cavity 123 that is configured to hold the water 124 or other liquid that is to be heated in the hot water supply subsystem 110. The system is described herein with water being the liquid that is in the water tank 111 because water is used to form most beverages including coffee and tea. However, it should be appreciated that other liquids can be used, including water-based liquids and liquids that do not include water such as fruit juices and the like, depending on the desired end result. The water tank 111 may be formed of stainless steel in some embodiments although the invention is not to be so limited and the water tank 111 may be formed of other metal materials or even plastics in other embodiments. The water tank 111 may have any desired shape including being circular, square, rectangular, or the like. The water tank 111 may have a constant cross-sectional area along its length or it may have a varying cross-sectional area, so as to be funnel-shaped or the like in some embodiments. In the exemplified embodiment, the internal cavity 123 of the water tank 111 has a maximum volume of 64 ounces, although the invention is not to be so limited in all embodiments and the water tank 111 may have a volume that is greater than or less than 64 ounces in other embodiments. Thus, in the exemplified embodiment the water tank 111 is designed to hold 64 ounces of water, but in other embodiments it may be designed to hold more or less than 64 ounces of water. The amount of water that can be stored in the water tank 111 dictates the amount of the hot beverage that can be brewed and then turned into beverage ice cubes in a single cycle. Thus, in the exemplified embodiment a single brewing cycle will generate up to 64 ounces of the hot beverage that can be converted into beverage ice cubes. However, the exact amount of water held in the water tank 111 is not to be limiting of the present invention in all embodiments.

The one or more heating elements 112 are configured to heat the water in the water tank 111 to a desired hot threshold temperature. The hot threshold temperature is the preferred temperature of the water before a brewing cycle begins (i.e., before the water is permitted to flow out of the water tank 111 and towards the brewing subsystem 130). In some embodiments, the water in the water tank 111 may be heated to be (i.e., the hot threshold temperature may be) between 100 and 210° F., more specifically between 110 and 190° F., still more specifically between 120 and 180° F., still more specifically between 130 and 170° F., even more specifically between 140 and 160° F., and more specifically approximately 150° F. In some embodiments the hot threshold temperature may be between 190 and 210° F., as this is the temperature at which coffee dissolves most readily. However, because the integrated apparatus 100 is making coffee ice cubes in some embodiments and the purpose is to reduce dilution in an iced coffee/beverage product rather than making an optimal cup of coffee, temperatures below the 190-210° F. range may be used effectively. Of course, the exact temperature may be outside of these ranges depending on the optimal temperature for a liquid that is used to brew different beverages. For example, the optimal temperature for water used to brew tea and coffee might be different, and thus the water in the water tank 111 may be heated to the specifically optimal temperature depending on the particular beverage that it is going to be used to make.

In the embodiment exemplified in FIGS. 1 and 9, the heating elements 112 are coupled directly to the outer surface of the water tank 111. FIG. 1 illustrates this generically, and FIG. 9 illustrates this in accordance with one embodiment whereby the heating elements 112 each wrap circumferentially around the outer surface of the water tank 111 in a spaced apart manner. Of course, the invention is not to be limited by the specific embodiment shown in FIG. 9 and the heating elements 112 may take on different shapes, sizes, configurations, and the like. For example, instead of elongated heating elements 112 that wrap around the water tank 111 as shown in FIG. 9, the heating elements 112 may be circular or polygonal shaped elements that are arranged around the outer surface of the water tank 111 in a spaced apart manner, or they may be elongated and extend vertically along the water tank 111, or they may include a single sheet-like heating element that wraps around the outer surface of the water tank 111. Thus, it should be appreciated that there are many variations for the structural embodiment of the heating elements 112 and it is merely desired that they are capable of heating the water in the water tank 111 to the hot threshold temperature noted herein above irrespective of their specific structural configuration.

Although the heating elements 112 are illustrated in FIGS. 1 and 9 as being coupled directly to the outer surface of the water tank 111, the invention is not to be so limited in all embodiments. Specifically, in other embodiments the heating elements 112 may be coupled to the inner surface of the water tank 111 or they may be suspended within the interior of the water tank 111 without being coupled directly to the inner surface of the water tank 111. Furthermore, referring to FIG. 10, in one embodiment the heating elements 112 may be located along the hot water conduit 117. In such embodiment, the heating element 112 may be a water heating element (700 Watt, for example) that is positioned within the flow path of the water as it exits the water tank 111 and flows towards the brewing subsystem 130. In such embodiment, the water will be heated after it leaves the water tank 111 rather than while it is within the water tank 111. Thus, the exact type and positioning of the heating elements 112 is not limiting of the invention in all embodiments so long as the heating elements 112 are configured to heat the water to a desired temperature before the water enters the brewing subsystem 150.

In the exemplified embodiment, the heating elements 112 will heat the water tank 111, which will in turn heat the water contained within the water tank 111. Of course, in other embodiments as mentioned herein, the heating elements 112 may heat the water while it is in the water tank 111 or the heating elements 112 may heat the water as or after it leaves the water tank 111, such as by being in-line heaters. In the exemplified embodiment, the heating elements 112 may be any type of heating element that can readily be secured to the outer surface of the water tank 111 while permitting the heating elements 112 to generate heat and heat the water in the water tank 111. For example, in one particular embodiment the heating elements 112 may be flexible silicone heat sheets that include an adhesive on one side thereof to permit the heating elements 112 to be adhesively secured to the outer surface of the water tank 111. Of course, the invention is not to be so limited and the heating elements 112 may be any type of heating element in other embodiments including resistive heating elements, heating coils, metal heating elements, ceramic heating elements, polymer PTC heating elements, composite heating elements, or combinations thereof. Thus, the invention is not to be particularly limited by the type of heating elements used unless expressly recited as such in the claims. Rather, in certain embodiments the heating elements 112 may be any type of element that is configured to generate heat.

As noted above, the heating elements 112 are operably coupled to the controller 199, and thus the controller 199 may control operation of the heating elements 112 by activating the heating elements 112 when heat is required to heat the water in the water tank 111 and deactivating the heating elements 112 when heat is no longer required. In some embodiments, so long as a sufficient amount of the water is located in the water tank 111 (as determined by the liquid level sensor 119), the heating elements 112 will be activated. In such an embodiment, the water in the water tank 111 will always be heated to the hot threshold temperature so that upon user activation of a brewing cycle by sending a brewing activation signal to the controller 199, the water will be ready to be sent to the brewing subsystem 130 without having to wait to heat the water. In other embodiments, in order to conserve energy the heating elements 112 may only be activated after a brewing activation signal is transmitted to the controller 199 (such as by the user pressing a button or the like). In such alternative embodiment, the water in the water tank 111 will remain unheated until it is needed to be heated for a brewing cycle.

Referring again to FIGS. 1 and 9, the first temperature sensor 113 is operably coupled to the controller 199 and positioned in such a manner so that it can be configured to sense the temperature of the water within the water tank 111 (or at some point upstream of the brewing subsystem 130). In FIG. 1, the first temperature sensor 113 is illustrated being located along the hot water conduit 117 adjacent to the outlet opening 118 in the tank 117. However, the invention is not to be so limited and the first temperature sensor 113 may be located within the interior of the tank 111 as illustrated in FIG. 9 so as to be in direct contact with the water/liquid held within the tank 111 to ensure accurate temperature readings of the water in the tank 111 are received by the first temperature sensor. Furthermore, the first temperature sensor 113 may be positioned at any other location so long as it is capable of detecting/sensing the temperature of the water held in the water tank 111. Thus, the exact positioning of the first temperature sensor 113 is not to be limiting of the invention other than that it must be configured to detect the temperature of the water held in the water tank 111 or the water in the hot water supply subsystem 110 before it passes to the brewing subsystem 130.

Figure 8A:
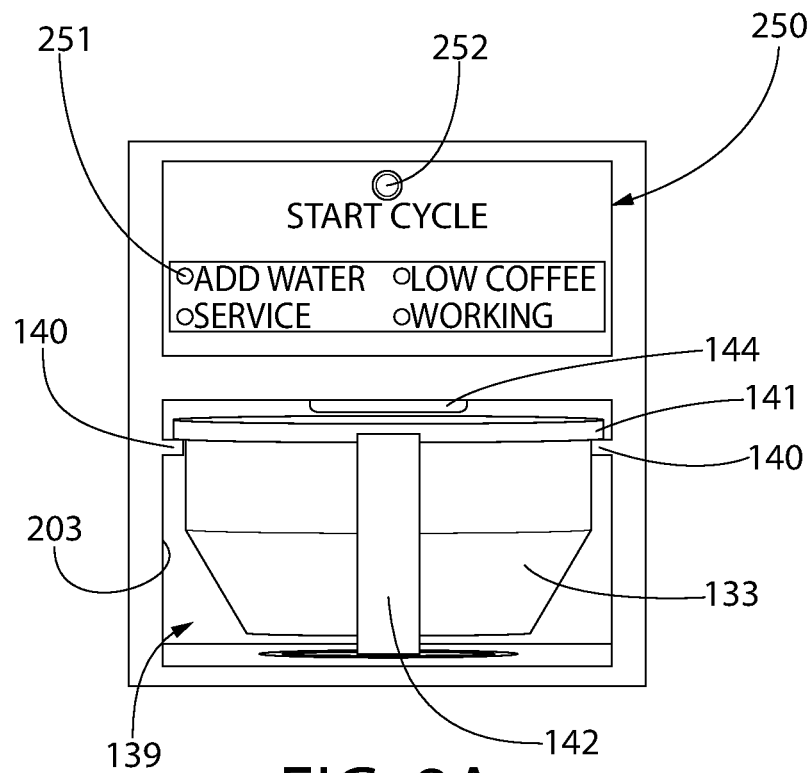
FIG. 8A is a close-up view of area VIII of FIG. 2 illustrating a control panel on the first housing with a mixing apparatus positioned in a brewing chamber.
Figure 8B:
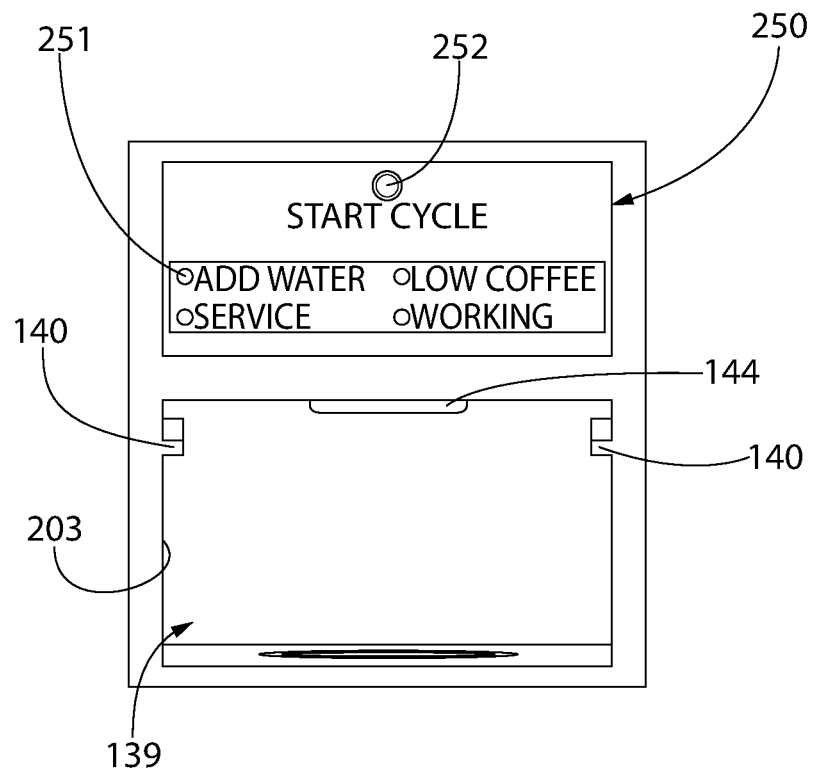
FIG. 8B is the close-up view of FIG. 8A with the mixing apparatus removed from the brewing chamber.

The hot water valve 114 is located downstream of the water tank 111 and upstream of the brewing subsystem 130 to control flow of the water from the water tank 111 to the brewing subsystem 130. Specifically, when the hot water valve 114 is fully closed, no water will flow from the water tank 111 to the brewing subsystem 130. When the hot water valve 114 is partially or fully open, water will flow, via gravity as described above, from the water tank 111 to the brewing subsystem 130. Thus, the hot water valve 114 is the component that controls the start/initiation of a brewing cycle because once the water passes the hot water valve 144 it will enter directly into the brewing subsystem 130. In the exemplified embodiment, the hot water valve 114 is operably coupled to the controller 199 so that the controller 199 can control operation (i.e., opening and closing) of the hot water valve 114. In some embodiments, the controller 199 may automatically open the valve upon a sufficient amount of water being held in the water tank 111 and heated to the hot threshold temperature. In other embodiments, some user input on a control panel (i.e., initiating a brewing activation signal) may be required to cause the controller 199 to open the hot water valve 114 as discussed herein below with reference in part to FIGS. 8A and 8B.

In the exemplified embodiment, the hot water valve 114 is an electric valve that is operably coupled to the controller 199. The hot water valve 114 may be any type of valve that can prevent and permit flow of the water from the hot water supply subsystem 110 to the brewing subsystem 130 as desired. In one embodiment, the hot water valve 114 (and all other valves described herein) is a solenoid valve. However, the exact type of valve used as the hot water valve 114 is not to be limiting of the present invention so long as the valve is capable of altering between closed and open positions as described herein.

The hot water outlet 115 is the outlet from the hot water supply subsystem 110 to the brewing subsystem 130. The hot water outlet 115 is downstream of the hot water valve 114. Furthermore, the hot water outlet 115 is located at a first elevation relative to a horizontal or approximately horizontal surface upon which the integrated apparatus 100 is positioned. All uses of the term elevation herein are relative to the same horizontal or approximately horizontal surface upon which the integrated apparatus 100 is positioned. Thus, if one elevation is described as being less than another elevation, it means the one elevation is closer to the horizontal surface on which the integrated apparatus 100 is positioned than the other elevation. Thought of another way, the elevation is the vertical distance of one component from the floor on which the integrated apparatus 100 is positioned.

Figure 6:
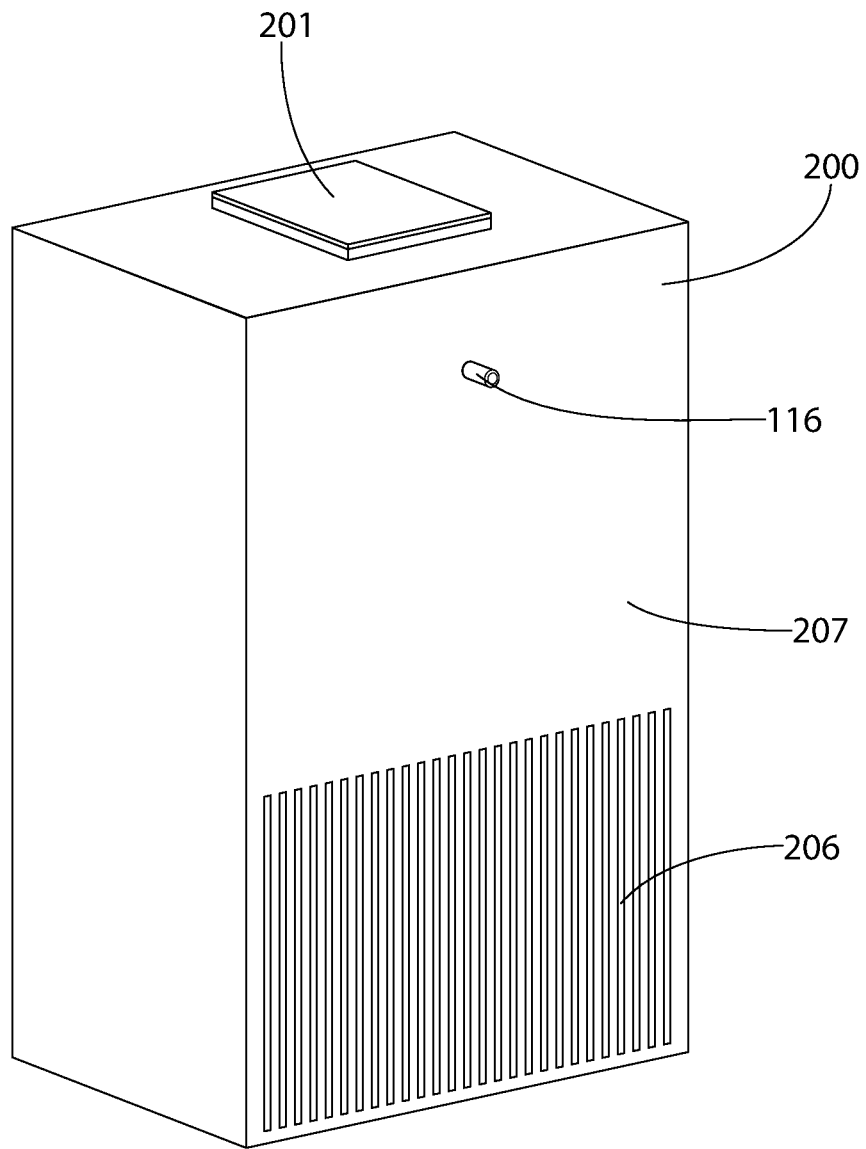
FIG. 6 is a rear perspective view of the first housing of FIG. 5.
Figure 7:
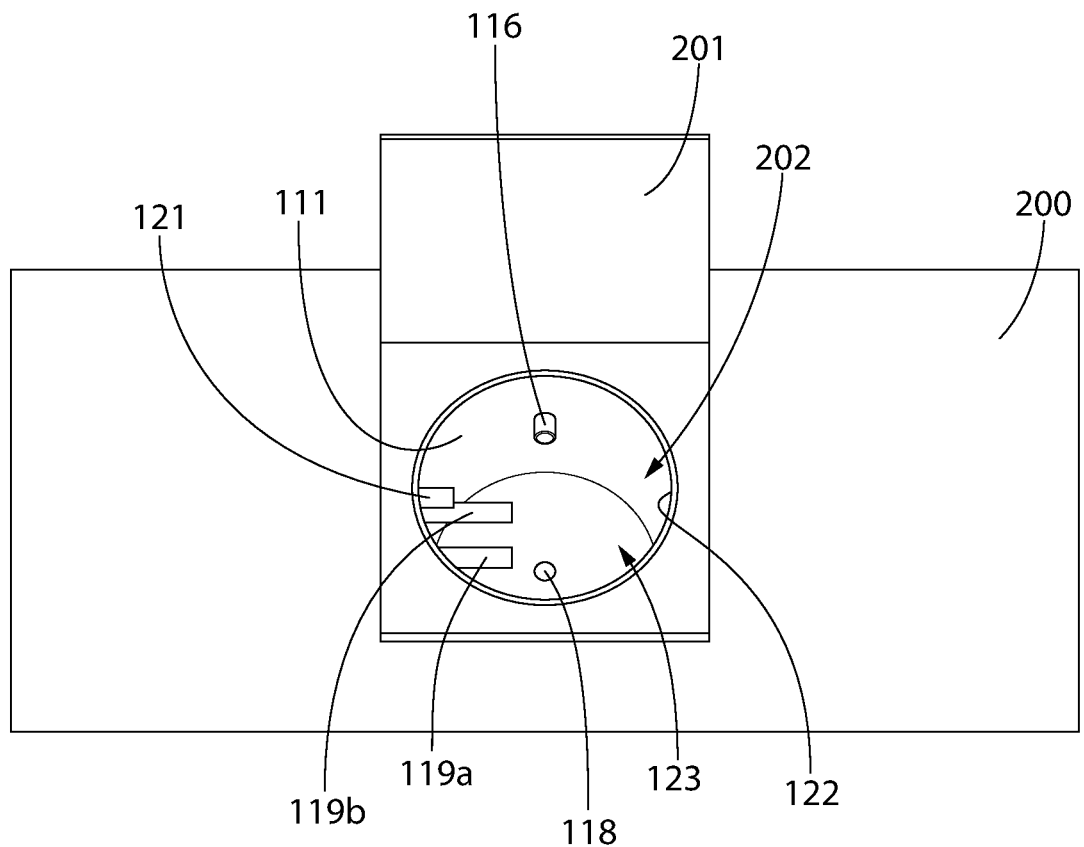
FIG. 7 is a top view of the first housing of FIG. 5 with a cover of a water tank in an open position.

The water supply inlet 116 may be used to automatically add water to the water tank 111 from a water supply line/water source. Specifically, the water supply inlet 116 may be coupled to a conduit that connects directly to a water supply, such as a water supply line in a home or building. The water supply inlet 116 may include a water supply valve 120 to control the flow of water from the water supply to the water tank 111 via the water supply inlet 116. When the water supply valve 120 is open, water can flow from the water supply to the water tank 111. When the water supply valve 120 is closed, water cannot flow from the water supply to the water tank 111. The water supply valve 120 may be operably coupled to the controller 199 so that opening and closing of the water supply valve 120 may be automated by the controller 199. Alternatively, the water supply valve 120 may be a manual valve that can be opened and closed manually by a user to flow water into and prevent flow of water into the water tank 111 from the water supply line. FIG. 6 illustrates the location where the water supply inlet 116 enters into the first housing 200 and FIG. 7 illustrates the location where the water supply inlet 116 enters into the internal cavity 123 of the water tank 111.

Figure 5:
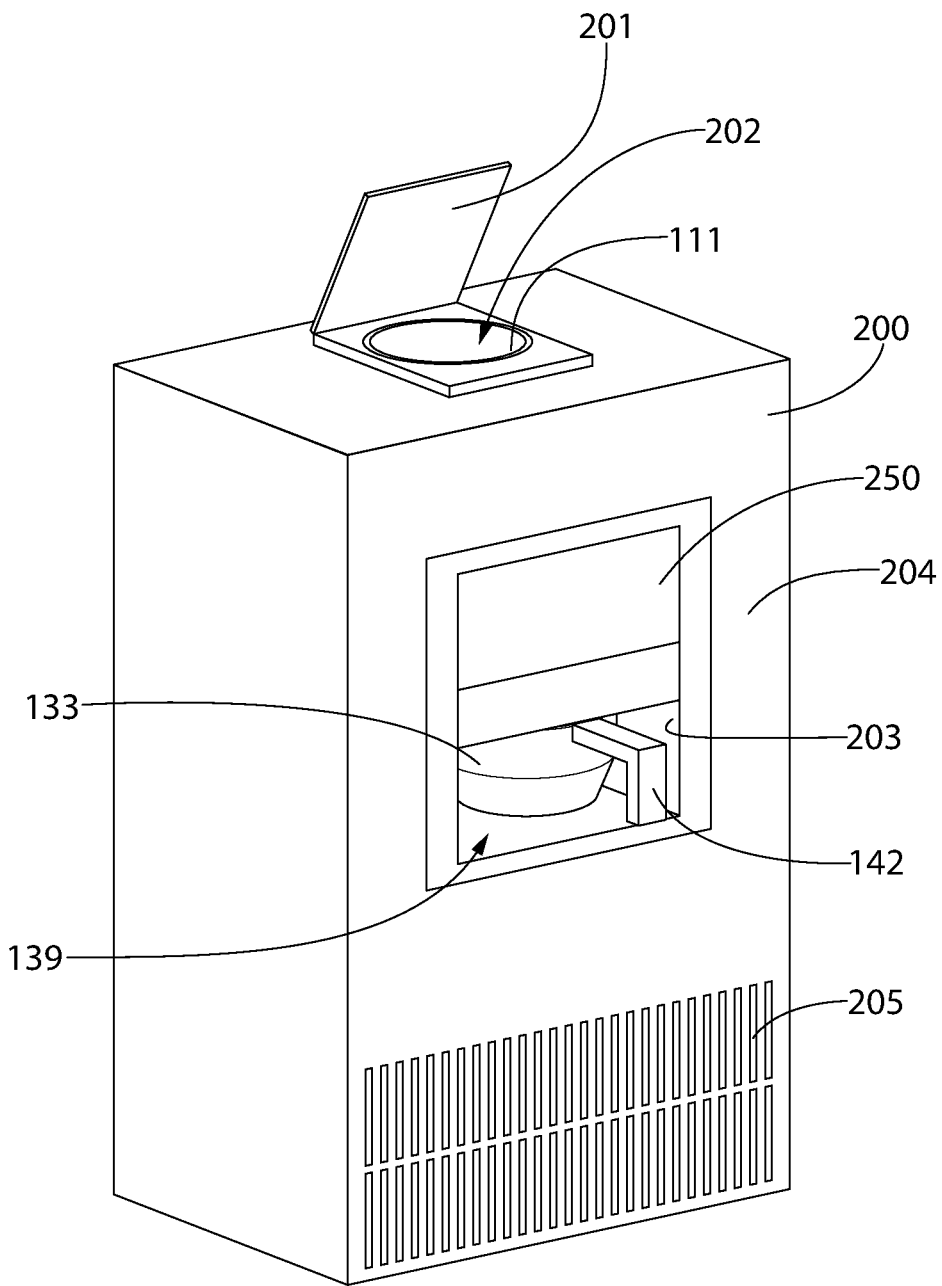
FIG. 5 is a front perspective view of the first housing of the integrated apparatus of FIG. 2.

In addition to or as an alternative to the water supply inlet 116, water may be added to the water tank 111 by simply pouring the water into the water tank 111 through an opening in its top end. Specifically, referring to FIGS. 2 and 5-7, the first housing 200 includes a cover 201 that is adjustable between a closed position as shown in FIGS. 2 and 6 and an open position as shown in FIGS. 5 and 7. When in the open position, an opening 202 in the top end of the water tank 111 is exposed, thus permitting a user to pour water into the internal cavity 123 of the water tank 111 through the opening 202. Thus, water may be added to the water tank 111 either automatically through the water supply inlet 116 or manually through the opening 202 in the top end of the water tank 111.

Finally, the hot water supply subsystem 110 comprises the liquid level sensor 119. The liquid level sensor 119 is operably coupled to the controller 199 to send signals to the controller 199 regarding the level of the water/liquid within the water tank 111. In FIG. 1, the liquid level sensor 119 is illustrated as a singular component. However, in FIGS. 7 and 9, for example, the liquid level sensor 119 is illustrated comprising an empty float switch 119a located near the bottom of the internal cavity of the water tank 111 and a full float switch 119b located near the top of the internal cavity of the water tank 111. The invention is not limited to whether a single liquid level sensor or an empty and full float switch is used to monitor the level of the water/liquid within the water tank 111.

The controller 199 may control the filling of the water tank 111 via the water supply inlet 116 automatically based on information sent to the controller 199 from the liquid level sensor 119. Specifically, if the liquid level sensor 119 sends data indicating that the water tank 111 is empty, the controller 199 may automatically activate the water supply inlet 116 by opening the water supply valve 120 to permit water to flow into the water tank 111 until the liquid level sensor 119 sends a signal to the controller 199 indicating that the water tank 111 is full. At that time, the controller 199 will close the water supply valve 120 so that no more water can enter therein. In this manner, the integrated apparatus 100 may automatically ensure that the water tank 111 is always full. This can reduce user time requirements in operation of the integrated apparatus 100 and in some instances where the heating elements 112 are always operational, ensure that hot water is constantly available for brewing. Furthermore, if the water tank 111 does overflow for any reason (either a user manually pouring too much water into the water tank 111 or due to the controller 199 or the water supply valve 120 not functioning properly), the system includes an overflow conduit 121 that extends from an opening in a sidewall of the water tank 111 to a drain (such as a floor drain or a sink drain or the like) so that the integrated apparatus 100 will not completely overflow. Rather, excess water will be drained from the water tank 111 through the overflow conduit 121 rather than flowing out through the opening 202 in the top end of the water tank 111.

Referring again to FIGS. 1 and 9 concurrently, the brewing subsystem 130 will be described. As described above, the brewing subsystem 130 receives the hot water generated by the hot water supply subsystem 110 and mixes it with a beverage additive to form a hot beverage. In that regard, the brewing subsystem 130 includes a hot water inlet 131 located at a second elevation relative to the horizontal surface on which the integrated apparatus 100 is positioned and a hot beverage outlet 132 located at a third elevation relative to the horizontal surface. The hot water inlet 131 is fluidly coupled to the hot water outlet 115 of the hot water supply subsystem 110 to permit the hot water to flow from the hot water supply subsystem 110 into the brewing subsystem 130.

As seen in FIGS. 1 and 9, the second elevation of the hot water inlet 131 of the brewing subsystem 130 is less than the first elevation of the hot water outlet 115 of the hot water supply subsystem 110. Furthermore, the third elevation of the hot beverage outlet 132 of the brewing subsystem 130 is less than the second elevation of the hot water inlet 131 of the brewing subsystem 130. These changes in elevations facilitate the gravity driven flow of the water/liquid throughout the brewing and cooling process as described herein.

The brewing subsystem 130 further comprises a dispenser 144 comprising one or more dispensing nozzles and a mixing apparatus 133. The mixing apparatus 133 is positioned to receive the hot water from the hot water inlet 131 and convert it into a hot beverage. Thus, the mixing apparatus 133 is downstream of the hot water inlet 131 and the hot water outlet 132 is downstream of the mixing apparatus 133. Furthermore, the dispenser 144 is fluidly coupled to the hot water inlet 131 so that the hot water passes from the hot water inlet 131 to the dispenser 144 where the hot water is dispensed into the mixing apparatus 133 via the one or more dispensing nozzles. In the exemplified embodiment, the dispenser 144 is a sprinkler head comprising a plurality of dispensing nozzles through which the hot water may flow into the mixing apparatus 133. Thus, the dispenser 144 may spray the hot water over a larger surface area to entirely cover an additive contained within the mixing apparatus 133 as described below. However, in other embodiments the dispenser 144 may simply comprise a single opening/nozzle through which the hot water may flow from the dispenser 144 into the mixing apparatus 133.

The mixing apparatus 133 may be a basket or other container having an inner surface 136 that defines an interior cavity 137 that is generally configured to hold a filter 134 and a bed of additives 135 therein. For example, the filter 134 may be a coffee-type filter made of disposable paper that is positioned within the interior cavity 137 of the mixing apparatus 133 and the bed of additives 135 may be ground coffee beans that are placed atop of the filter 134. Of course, the bed of additives 135 may be other than coffee beans in other embodiments, such as being tea leaves or the like. Varying the substance of the bed of additives 135 will modify/change the beverage that is formed as the end product. In any case, the filter 134 is positioned within the mixing apparatus 133 so that it may trap the coffee grounds while permitting the liquid coffee (i.e., hot beverage) formed by passing the hot water through the mixing apparatus 133 to flow through. The mixing apparatus 133 comprises an opening 138 in its bottom surface so that the hot water that flows into the brewing subsystem 130 from the hot water supply subsystem 110 can flow into the interior cavity 137, contact and pass through the bed of additives 135 and the filter 134, and pass through the opening 138 as the hot beverage towards the hot beverage outlet 132.

Once the hot beverage passes through the opening 138 in the mixing apparatus 13, the hot beverage will flow automatically into the cooling subsystem 150. Specifically, in the exemplified embodiment there are no valves or other devices to prevent flow of the hot beverage from the mixing apparatus 133 to the cooling subsystem 150. Rather, as soon as the hot beverage is formed in the brewing subsystem 130, the hot beverage flows directly into the cooling subsystem 150 so that the cooling process may begin. Of course, in alternative embodiments a valve may be added to the system between the brewing subsystem 130 and the cooling subsystem 150 to prevent overflow of the cooling subsystem 150 in case it already has a beverage being cooled therein. In such embodiments, the hot beverage may flow into a holding tank between the brewing subsystem 130 and the cooling subsystem 150 until the cooling subsystem 150 is empty and has sufficient available volume to accept the newly brewed hot beverage.

In the exemplified embodiment, adding a valve and/or holding tank between the brewing subsystem 130 and the cooling subsystem 150 is not needed because the hot water will not be released from the water tank 111 if there is a beverage being cooled in the cooling subsystem 150. Specifically, because in the exemplified embodiment once the hot water leaves the hot water supply subsystem 110 it automatically travels via gravity through the brewing subsystem 130 and to the cooling subsystem 150 without any valves to prevent or slow this flow, it may be necessary to ensure that the cooling subsystem 150 is empty before the hot water 150 is released from the water tank 111 and a brewing cycle begins. In this regard, as will be discussed more fully below, the cooling subsystem 150 may include a liquid level sensor that is operably coupled to the controller 199 so that if the liquid level sensor detects a particular amount of the beverage in the cooling subsystem 150, it will not open the hot water valve 114, thereby preventing a new brewing cycle from starting. In such an embodiment, even if a user tries to activate a brewing cycle, if there is an amount of the hot beverage in the cooling subsystem 150, the controller 199 will not allow the brewing cycle to begin in order to prevent overflow of the cooling subsystem 150.

Referring to FIGS. 1, 2, 5, 8A, and 8B, the brewing subsystem 130 further comprises a brewing chamber 139 in which the mixing apparatus 133 is removably positioned. The first housing 200 comprises a window 203 in a first upstanding wall 204 of the housing 200 that forms a passageway into the brewing chamber 139. Specifically, in FIG. 8A the mixing apparatus 133 is illustrated positioned within the brewing chamber 139 and in FIG. 8B the mixing apparatus 133 is illustrated removed from the brewing chamber 139. In this regard, the brewing chamber 139 comprises a pair of side rails 140 on which a flange 141 of the mixing apparatus 133 may be slid for insertion and removal of the mixing apparatus 133 from the brewing chamber 139. The mixing apparatus 133 may include a handle 142 to facilitate ready gripping by a user during the insertion and removal procedure. The mixing apparatus 133 must be removed from the brewing chamber 139 between brewing cycles so that a new filter 134 and a fresh amount of the additive 135 can be inserted into the interior cavity 137 of the mixing apparatus 133 in preparation for a subsequent brewing cycle. The handle 142 of the mixing apparatus 133 and the window 203 in the first housing 200 make the process of cleaning and refilling the mixing apparatus 133 easy to accomplish.

As seen in FIGS. 2, 5, 8A, and 8B, there is a control panel 250 on the first upstanding wall 204 of the first housing 200 that includes indicators 251 and an actuator 252. The indicators include an "add water" indicator, a "low coffee" indicator, a "service" indicator, and a "working" indicator. Each of the indicators has a light associated with it that can be lit up when the condition of that indicator is met. For example, when the water level in the water tank 111 is low as determined by the liquid level sensor 119, the "add water" indicator may be lit. This may be important where the water supply inlet 116 is not hooked up to a water supply and thus a user must manually add water into the water tank 111. When the machine requires service, the "service" indicator may be lit. When the machine is either brewing a beverage in the brewing subsystem 130 or cooling a beverage in the cooling subsystem 150, the "working" indicator may be lit. And finally, when the amount of brewed coffee is detected at a low level (determined based on the amount of the brewed and subsequently cooled coffee that is located in a cool beverage reservoir of the freezing subsystem 170 discussed in more detail below), the "low coffee" indicator may be lit, indicating to a user that more coffee should be brewed. The indicators may also include an "ice cube size" indicator and an "ice chest full" indicator. The "ice cube size" indicator may enable a user to change the size of the beverage ice cubes that are made by the integrated apparatus 100 as discussed more fully below. The "ice chest full" indicator may indicate to a user that no additional beverage ice cubes should be made because there is insufficient space to support them in the ice chest of freezer compartment 173. Other indicators can be included on the control panel 250 to enhance the user experience of the integrated apparatus 100.

In the exemplified embodiment, the actuator 252 is a button that can be pressed by a user to start a brewing cycle. Of course, the actuator 252 may be a toggle switch, a slide switch, or any other type of actuation mechanism as may be desired. A user actuating the actuator 252 may cause one of several things to happen, depending on specific system operation parameters. In some embodiments, pressing the actuator button 252 may activate the heating elements 112 to begin generating heat so that they can heat up the water within the water tank 111. In such an embodiment, upon the water in the water tank 111 being detected at the hot threshold temperature, the controller 199 may automatically cause the hot water valve 114 to open to send the hot water to the brewing subsystem 130. In other embodiments, the heating elements 113 may always be operating to heat the water to the hot threshold temperature when there is a sufficient amount of water detected in the water tank 111. In such an embodiment, upon pressing the actuator button 252 the controller 199 may immediately open the hot water valve 114 to start the brewing process because the water has already been heated (after checking with the first temperature sensor to ensure that the water has reached the hot threshold temperature).

Referring again to FIGS. 1 and 9, the cooling subsystem 150 will be described in greater detail. The cooling subsystem 150 generally comprises a hot beverage inlet 151, a heat exchanger 160, an air flow generator 152, a second temperature sensor 153, a cooled beverage valve 154, and a cooled beverage outlet 155. The cooling subsystem 150 may also include a liquid level sensor in some embodiments. The hot beverage inlet 151 receives the hot beverage from the brewing subsystem 130 and the cooled beverage outlet 155 permits the beverage, once cooled by the heat exchanger 160, to pass into the freezer subsystem 170. Thus, the hot beverage stays within the heat exchanger 160 until it is cooled to a cool threshold temperature, at which time it may be sent to the cool beverage reservoir 171 of the freezer subsystem 170. The hot beverage inlet 151 is located at a fourth elevation that is less than the third elevation of the hot beverage outlet 132 of the brewing subsystem 130. The cooled beverage outlet 155 is located at a fifth elevation that is less than the fourth elevation of the hot beverage inlet 151. Again, this permits the gravity flow of the liquid throughout the brewing and cooling process as described herein.

Figure 12:
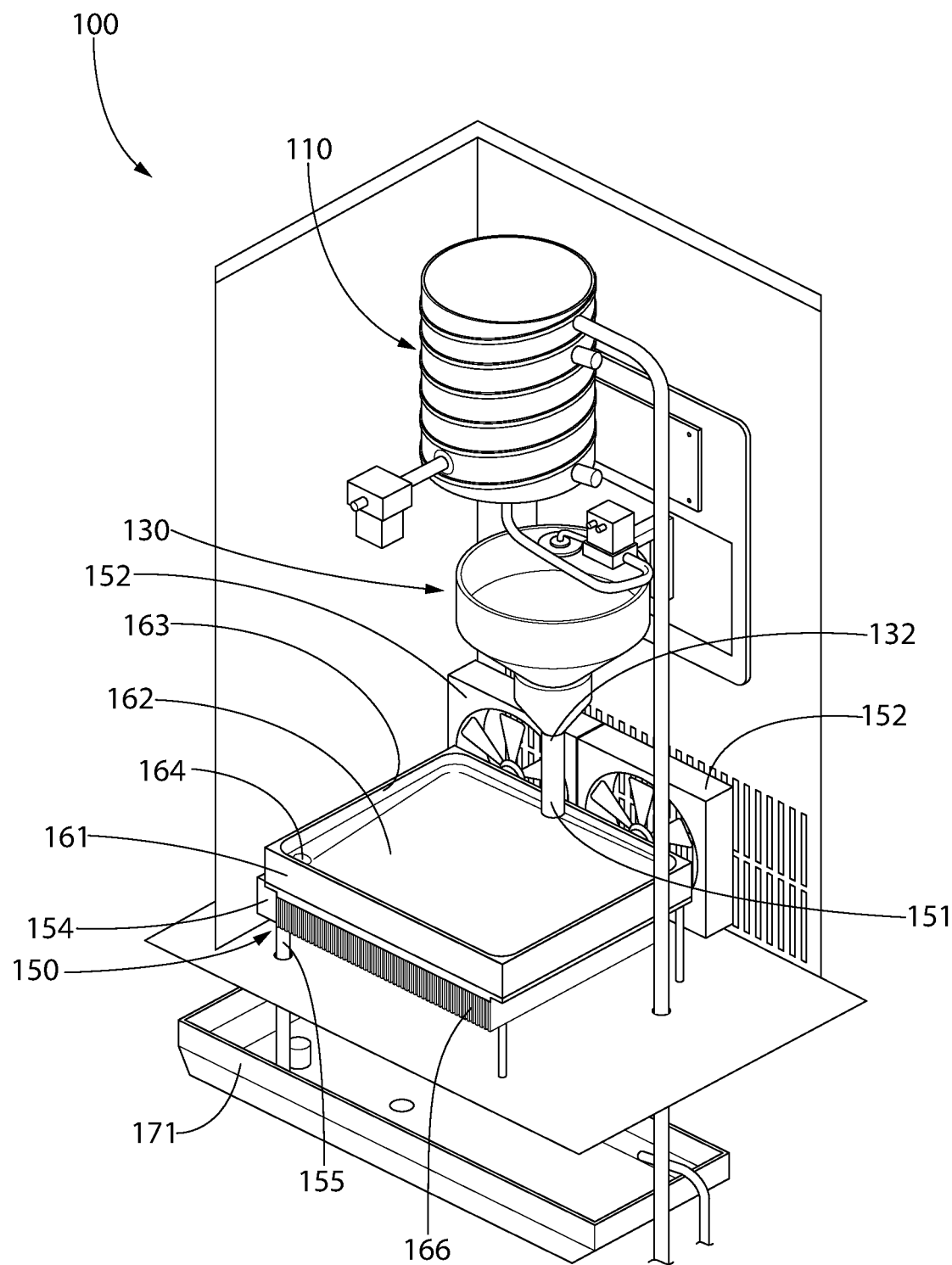
FIG. 12 is the partially cut-away view of FIG. 11 with the top of the heat exchanger removed in accordance with an alternative embodiment of the present invention.
Figure 13:
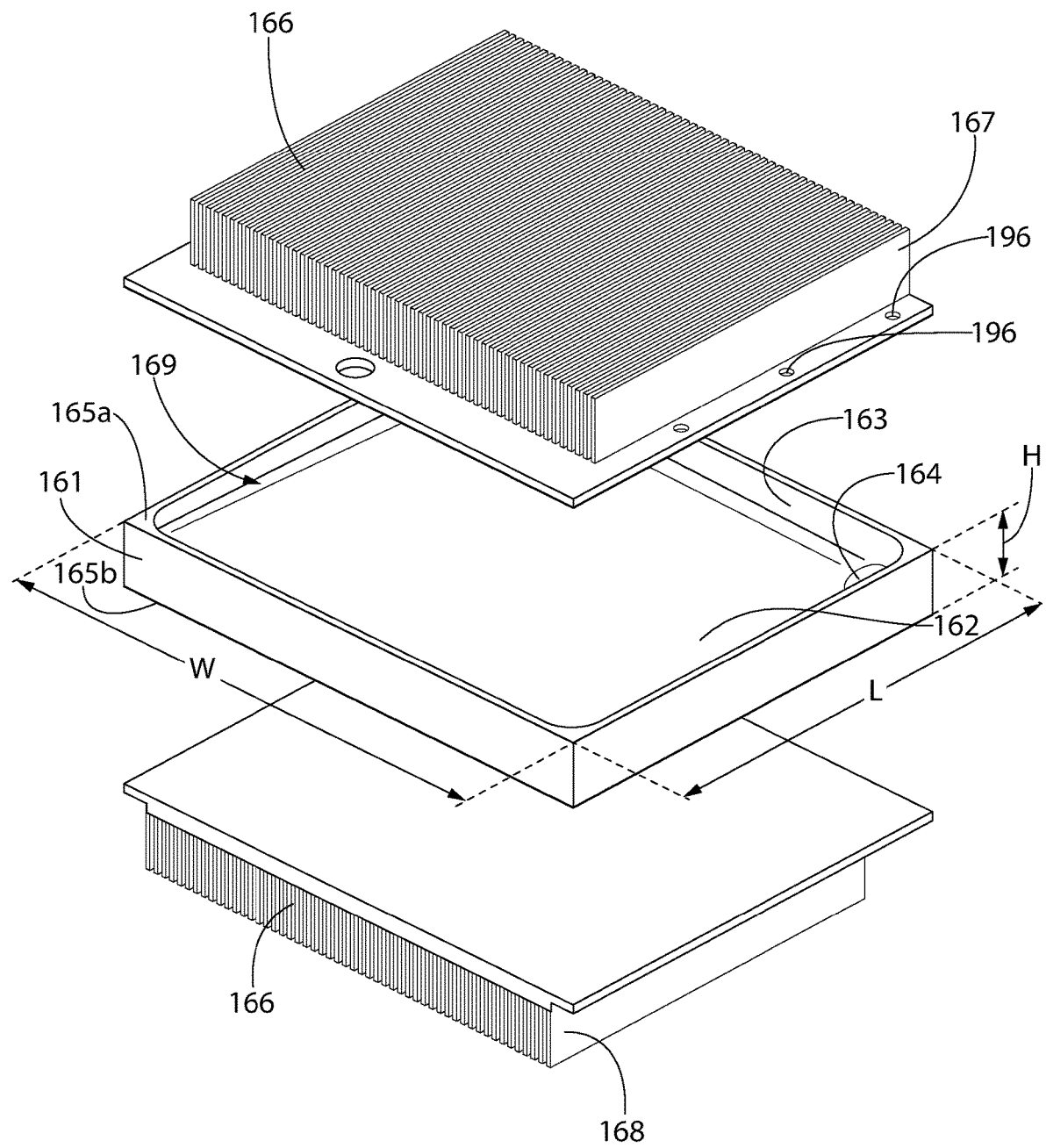
FIG. 13 is an exploded view of the heat exchanger of FIG. 12 in accordance with an embodiment of the present invention.

Referring to FIGS. 9, 12, and 13, the heat exchanger 160 will be described in accordance with one embodiment of the present invention. In the exemplified embodiment, the heat exchanger 160 comprises a hot beverage cooling tank 161 and a plurality of heat dissipating elements 166 coupled to and extending from the hot beverage cooling tank 161. The hot beverage cooling tank 161 comprises a floor 162 and a sidewall 163 extending upwardly from the floor 162. The floor 162 and the sidewall 163 collectively define a cavity or reservoir 169, which may also be referred to herein as a heat exchange chamber of the heat exchanger 160. In the exemplified embodiment, the cavity 169 has a volume of approximately 64 ounces so that all of the beverage brewed in a single cycle may pass through the brewing subsystem 130 and into the cooling subsystem 150 where it may be stored while it cools. Furthermore, it may be desirable to maximize the surface area of the floor 162 of the hot beverage cooling tank 161 to shorten the cooling time. Specifically, the shallower the hot beverage is while contained within the cavity 169 of the hot beverage cooling tank 161, the quicker it will cool. Thus, the length and width dimensions of the cavity 169 of the hot beverage cooling tank 161 may be maximized within the dimensions of the first housing 200 while keeping the height of the sidewalls 162 and the depth of the cavity 169 to a minimum while still enabling it to hold the preferred amount of the beverage (i.e., 64 ounces or the like). In some embodiments, it may be desirable for the maximum depth of the hot beverage within the cavity 169 to be 1-2 inches, or more specifically 1-1.5 inches. Thus, the maximum height of the sidewall 163 as measured from the floor 162 to the first surface 165a of the hot beverage cooling tank 161 may be 1-2 inches, or 1-1.5 inches.

In one embodiment, the hot beverage cooling tank 161 may have a length L, a width W, and a height H. The dimensions of the length L, width W and height H should be sufficient to equal a volume of at least 64 ounces while keeping the height H to a minimum. For example, in one embodiment the height H may be 1.5 inches, and the length L multiplied by the width W may be between 80 inches squared and 90 inches squared. Thus, in one embodiment the area of the hot beverage cooling tank 161 may be between 80 and 90 inches squared and the height H may be approximately 1.5 inches squared. Stated another way, in some embodiments the cavity 169 of the beverage cooling tank 161 may have a volume of between 115 and 130 inches cubed. The exact value of the length L, the width W, and the height H may be modified depending on the shape of the hot beverage cooling tank 161. Furthermore, the dimensions provided herein are not intended to be limiting of the present invention unless expressly recited in the claims.

In the exemplified embodiment, the cavity 169 of the hot beverage cooling tank 161 is square or rectangular-shaped with rounded corners. Utilizing rounded corners may be desirable to limit the amount of bacteria that may become deposited and remain within the cavity 169. Specifically, sharp corners are more prone to retaining bacteria and bacteria may be more difficult to remove from such sharp corners. Thus, rounding the corners is desirable in some embodiments to maintain the beverage cooling tank 161 in a hygienic manner. In the exemplified embodiment the top end of the beverage cooling tank 161 is closed by a lid that has some of the heat dissipating elements 166 extending therefrom. However, in other embodiments the top end of the beverage cooling tank 161 may be left open, which may speed up the cooling process.

Furthermore, the hot beverage cooling tank 161 comprises an outlet 164 in the floor 162 to permit the beverage, once cooled to the cool threshold temperature, to flow out of the hot beverage cooling tank 161 via the cooled beverage outlet 155. In certain embodiments, the floor 162 of the hot beverage cooling tank 161 may be angled towards the outlet 164 so that the liquid contained within the beverage cooling tank 161 flows automatically, via gravity, through the outlet 164 when the cooled beverage valve 154 is opened as discussed below. In such embodiments, the outlet 164 will be located at a lower elevation than the remainder of the floor 162 of the hot beverage cooling tank 161 to encourage flow of the cooled beverage through the outlet 164 at the appropriate time. Alternatively, the entire hot beverage cooling tank 161 may be angled when installed to permit the gravity flow of the liquid through the outlet 164 when the cooled beverage valve 154 is opened.

In certain embodiments, the hot beverage cooling tank 161 may be formed of aluminum, although the invention is not to be so limited and other thermally conductive materials may be used, including copper, brass, steel, bronze, or the like.

The hot beverage cooling tank 161 comprises a first surface 165a and a second surface 165b that is opposite the first surface 165a. In the exemplified embodiment, the plurality of heat dissipating elements 166 comprises a first set of fins 167 located on the first surface 165a (which may be formed by a lid or cover as described above) of the hot beverage cooling tank 161 and a second set of fins 168 located on the second surface 165b of the hot beverage cooling tank 160. The plurality of heat dissipating elements 166 increase the surface area of the heat exchanger 160, thereby more effectively removing heat from the hot beverage in the hot beverage cooling tank 161 for a shorter cooling time. The heat exchanger 160 may also include vent openings 196 in the top portion thereof to enable venting of the cavity 169.

Figure 11:
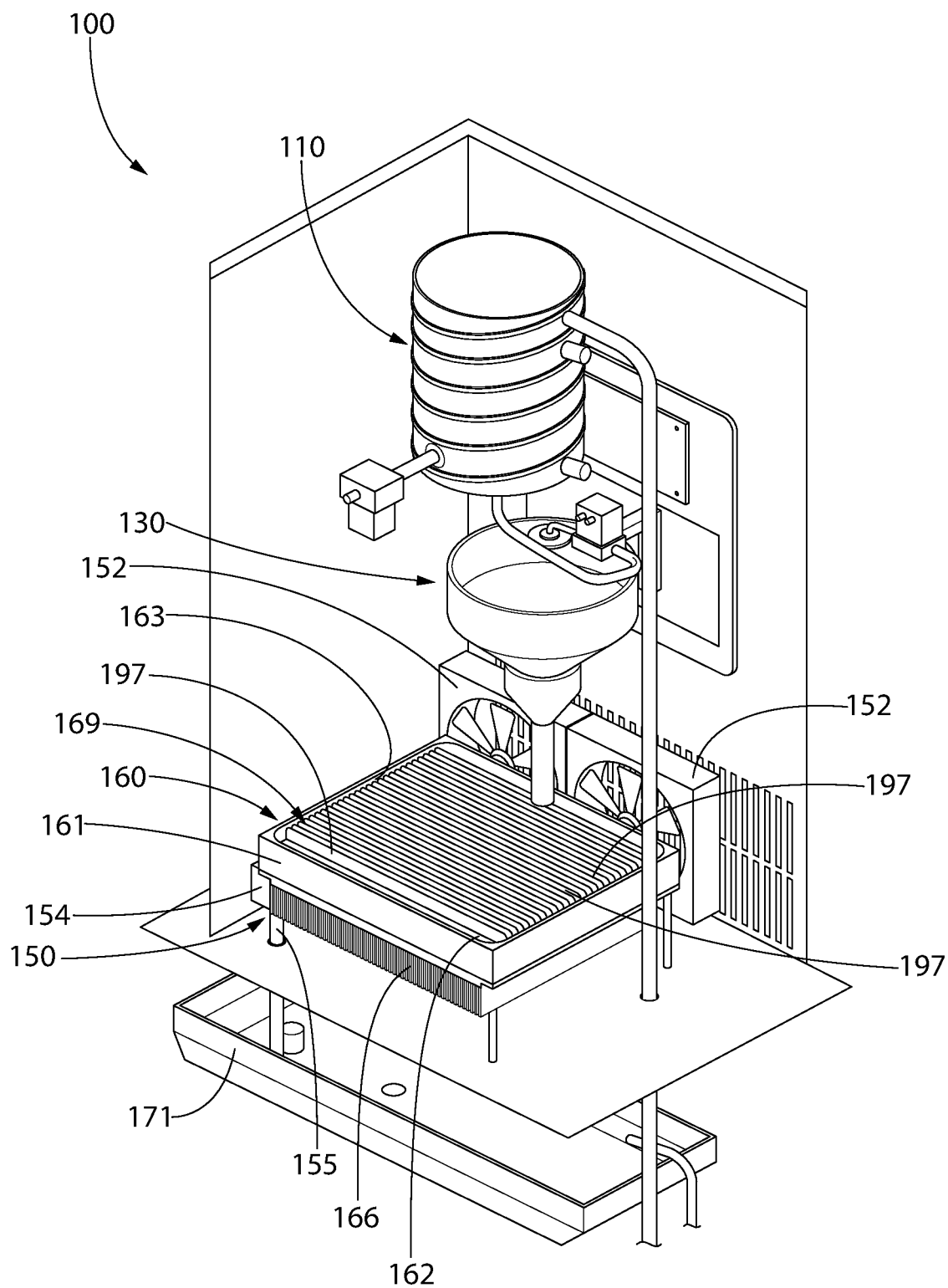
FIG. 11 is the partially cut-away view of FIG. 9 with a top portion of a heat exchanger removed.

FIG. 11 illustrates an alternative embodiment of the heat exchanger 160 with the top portion removed so that the cavity 169 is exposed. Specifically, in this embodiment the heat exchanger 160 includes internal fins 197 located within the cavity 169 of the hot beverage cooling tank 161. Such internal fins 197 may further reduce the cooling time.

Referring back to FIGS. 1 and 9, the integrated apparatus 100 will be further described. As noted above, the hot beverage inlet 151 receives the hot beverage discharged from the brewing subsystem 130 and flows the hot beverage into the cavity 169 of the hot beverage cooling tank 161 of the heat exchanger 160. It should be appreciated that during operation, the hot beverage simply remains stationary within the cavity 169 of the hot beverage cooling tank 161 as it cools and until it reaches a predetermined reduced temperature. For example, the hot beverage may enter the hot beverage cooling tank 161 at a temperature of approximately 150° F. and it may stay in the hot beverage cooling tank 161 until it reaches a cool threshold temperature. The cool threshold temperature may be between 60 and 90° F., more specifically between 70 and 80° F., and still more specifically approximately between 70 and 75° F. The hot beverage is not moving within the hot beverage cooing tank 161 during cooling, but rather remains stationary. Thus, the hot and subsequently cooled beverage simply stays within the hot beverage cooling tank 161 until it reaches the cool threshold temperature. In this way, the hot beverage cooling tank 161 acts as a holding chamber for holding the beverage while it cools. Although the beverage is stationary within the hot beverage cooling tank 161, there is an active air stream 159 being flowed across the heat exchanger 160 via the air flow generator 152 to assist in cooling the hot beverage.

In the exemplified embodiment, the air flow generator 152 comprises two fans that are positioned in a side-by-side arrangement so as to generate the air flow stream 159 across the heat exchanger 160. Thus, the air flow generator 152 is positioned adjacent to the heat exchanger 160 with its air blowing side facing the heat exchanger 160. In the exemplified embodiment, the two fans of the air flow generator 152 are positioned on the same side of the heat exchanger 160. However, in other embodiments the two fans may be positioned on opposite or adjacent sides of the heat exchanger 160.

As best seen in FIG. 1 and in FIGS. 3 and 4 when viewed together, the air flow generator 152 and the heat exchanger 160 are located within the first housing 200 in alignment with one or more inlet vents 205 formed in the first upstanding wall 204 of the first housing 200 and one or more outlet vents 206 in a second upstanding wall 207 of the first housing 200. The inlet and outlet vents 205, 206 are openings or holes formed into the first and second upstanding walls 204, 207 that permit air to enter into and leave the internal space within the first housing 200. The inlet and outlet vents 205, 206 may have any desired shape, configuration, and size and it can be different than that which is shown in the drawings in some embodiments. During operation the air flow generator 152 pulls ambient air through the one or more inlet vents 205 and generates the air flow stream 159 therefrom. The air flow stream 159 flows across the heat exchanger 160 and then out through the outlet vents 206. Although two fans are illustrated in the exemplified embodiment, the air flow generator 152 may include only one fan or more than two fans in other embodiments. Thus, the invention is not to be limited by the number of fans that make up the air flow generator 152, but rather in some embodiments merely that the integrated apparatus 100 includes the air flow generator 152 to speed up the beverage cooling process that takes place in the heat exchanger 160.

It should be appreciated that the processes taking place in the hot water supply subsystem 110 and the brewing subsystem 130 generate heat, and thus by placing the cooling subsystem 150 below the hot water supply subsystem 110 and the brewing subsystem 130, the heat generated in the hot water supply subsystem 110 and the brewing subsystem 130 does not affect the cooling of the hot beverage in the cooling subsystem 150. Rather, because heat rises, the heat generated in the hot water supply subsystem 110 and the brewing subsystem 130 remains above the heat exchanger 160. Furthermore, the heat exchanger 160 is positioned adjacent to the second housing 300, which houses the components of the freezing subsystem 170. Thus, the interior of the second housing 300 is a cold or chilled environment. By placing the heat exchanger 160 adjacent to the second housing 300, the processing time for cooling the beverage within the cooling subsystem 150 may be further reduced as the relatively cool temperature (below ambient and possibly below freezing) of the air within the second housing 300 may contact the heat exchanger 160.

As set forth herein, the air flow generator 152 is configured to blow ambient, room temperature air (i.e., the air flow stream 159) across the heat exchanger 160 to assist in the cooling of the hot beverage within the cavity 169 of the hot beverage cooling tank 161. This process may take ten or more minutes, or fifteen or more minutes, or twenty or more minutes in various embodiments. However, it may be desirable to continue cooling the hot beverage within the hot beverage cooling tank 161 until it reaches the cool threshold temperature, which as noted above may be between 70° F. and 75° F. in some embodiments.

Referring again to FIGS. 1 and 9, the second temperature sensor 153 monitors the temperature of the hot beverage within the hot beverage cooling tank 161. In FIG. 1, the second temperature sensor 153 is illustrated being located outside of the hot beverage cooling tank 161. However, the second temperature sensor 153 may alternatively be located within the cavity 169 of the hot beverage cooling tank 161 to ensure an accurate temperature reading of the hot beverage. The second temperature sensor 153 is operably coupled to the controller 199 so that the controller can control operation of the cooled beverage valve 154 based on the temperature readings transmitted from the second temperature sensor 153.

Specifically, the cooled beverage valve 154 is located adjacent to the outlet 164 of the hot beverage cooling tank 161 and is adjustable between a closed state that prevents the beverage within the cavity 169 of the hot beverage cooling tank 161 from exiting and an open state the permits the beverage within the cavity 169 of the hot beverage cooling tank 161 to pass into the freezing subsystem 170. In operation, the controller 199 will maintain the cooled beverage valve 154 in the closed state until the second temperature sensor 153 sends a signal to the controller 199 indicating that the beverage in the hot beverage cooling tank 161 has reached the cool threshold temperature, such as 70-75° F. as noted above. Upon the temperature sensor 153 signaling to the controller 199 that the temperature of the beverage in the hot beverage cooling tank 161 has reached the cool threshold temperature, the controller 199 will open the cooled beverage valve 154, thereby permitting the cooled beverage to flow from the cooling subsystem 150 to a cool beverage reservoir 171 of the freezing subsystem 170. The cooled beverage valve 154 will then bias back into the closed state (by instruction from the controller 199) either automatically upon the hot beverage cooling tank 161 being empty of the cooled beverage or after a user activates a new brewing cycle (once the user presses the brewing button to activate a new brewing cycle, this may initiate the closing of the cooled beverage valve 154 if it is not already closed).

In certain embodiments, the opening of the cooled beverage valve 154 may occur automatically by the controller 199 based on communications between the controller 199 and the cooled beverage valve 154 and the temperature sensor 153. Specifically, in some embodiments immediately upon the temperature sensor 153 detecting that the temperature of the beverage within the hot beverage cooling tank 161 has reached the cool threshold temperature, the temperature sensor 153 will transmit this data to the controller 199. In response, the controller 199 may automatically open the cooled beverage valve 154. Due to gravity as discussed herein (and the angle of the floor 162 of the hot beverage cooling tank 161), upon the cooled beverage valve 154 being opened, the cooled beverage will flow automatically into the cool beverage reservoir 171 of the freezing subsystem 170. The cool threshold temperature may be pre-set at the factory, and/or it may be set by an end user. The cool threshold temperature may in some embodiments be modifiable to enhance and optimize system operation.

Figure 14:
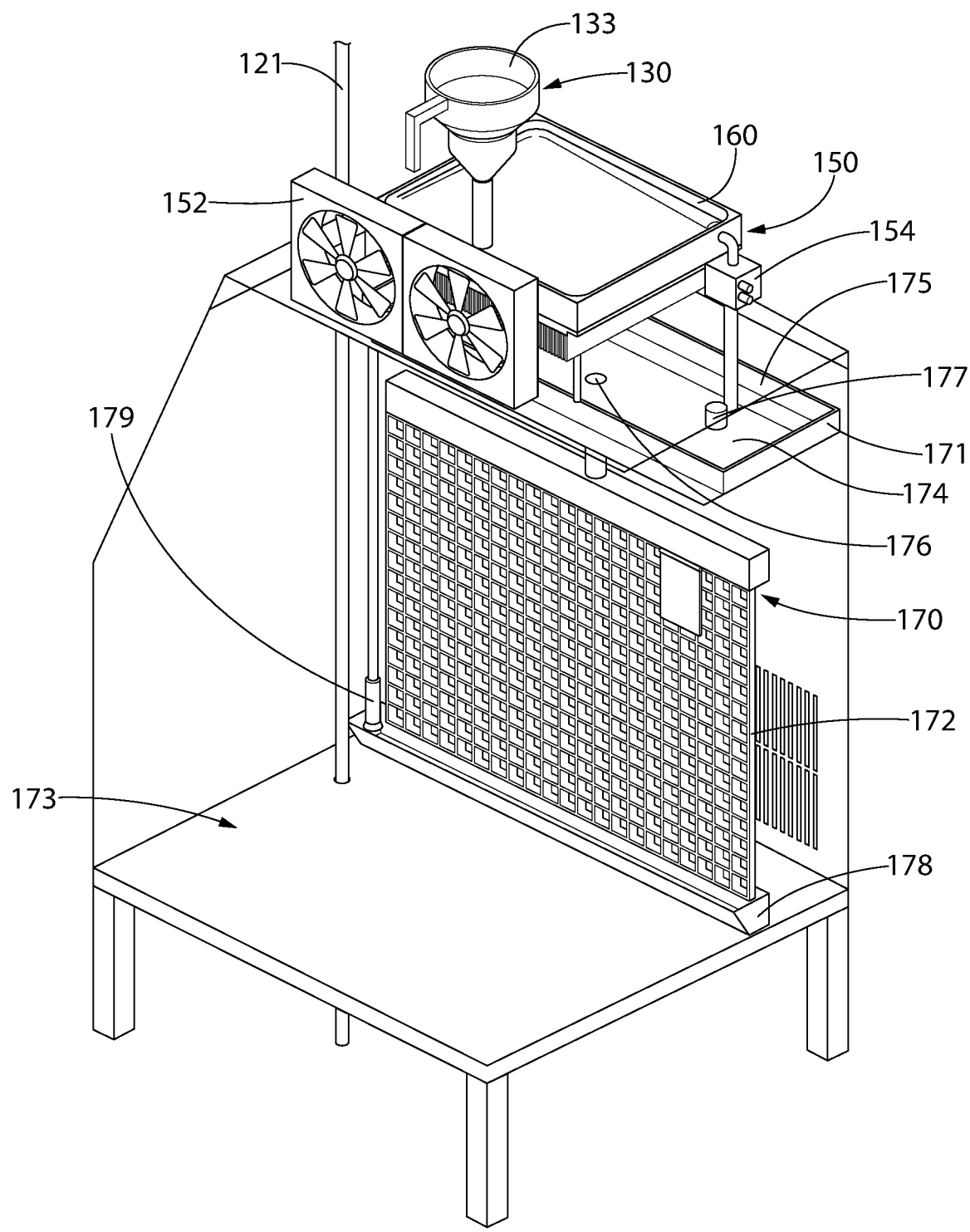
FIG. 14 is a partially cut-away view of the second housing of the integrated apparatus of FIG. 2.

Referring now to FIGS. 1, 9 and 14, the freezing subsystem 170 will be described. As noted above, the freezing subsystem 170 is enclosed within the second housing 300 rather than being within the first housing 200. In some embodiments, the freezing subsystem 170 may be a standard commercial grade ice cube maker and it may be retrofit to work in conjunction with the first housing 200 to make beverage ice cubes instead of water ice cubes. As noted above, the freezing subsystem 170 comprises the cool beverage reservoir 171, the beverage ice maker 172, and the freezer compartment 173.

Once the cooled beverage valve 154 is opened and the cooled beverage leaves the cooling subsystem 150, the cooled beverage flows into the cool beverage reservoir 171 of the freezing subsystem 170. The cool beverage reservoir 171 comprises a floor 174 and sidewalls 175 extending upwardly from the floor 174 to thereby define the reservoir for holding the cool beverage. Furthermore, an outlet 176 is formed into the floor 174 of the cool beverage reservoir 171 to permit the cool beverage to flow from the cool beverage reservoir 171 to the beverage ice maker 172. Finally, a liquid level sensor 177 is placed within the cool beverage reservoir 171 to detect the amount of the cooled beverage is in in the cool beverage reservoir 171. The liquid level sensor 177 is operably coupled to the controller 199 to transmit data regarding the amount of the cooled beverage that is in the cool beverage reservoir 171.

In the exemplified embodiment, the outlet 175 of the cool beverage reservoir 171 may always be open such that the cooled beverage in the cool beverage reservoir 171 will always flow out through the outlet 175 towards the beverage ice maker 172. In other embodiments, the integrated apparatus 100 may include an ice maker valve downstream of the cool beverage reservoir 171 and upstream of the beverage ice maker 172 to control when the cooled beverage can flow from the cool beverage reservoir 171 to the beverage ice maker 172. In some embodiments, opening and closing of the ice maker valve may be dictated by the data transmitted to the controller 199 from the liquid level sensor 177. Specifically, the controller 199 may keep the ice maker valve closed until a predetermined amount of the cooled beverage is located within the cool beverage reservoir 171.

In the exemplified embodiment, there is no ice maker valve included. Rather, the controller 199 may control the opening and closing of the cooled beverage valve 154 based on the data transmitted from the liquid level sensor 177 to the controller 199. Specifically, in some embodiments the controller 199 may only open the cooled beverage valve 154 when the temperature sensor 153 indicates that the cool temperature threshold has been reached and the liquid level sensor 177 indicates that the cool beverage reservoir 171 is sufficiently empty that it can hold all of the cooled beverage that is currently in the hot beverage cooling tank 161. This might be used to ensure overflow of the cool beverage reservoir 171 is prevented. Of course, in other embodiments the liquid level sensor 177 may play no role in the opening and closing of the cooled beverage valve 154 and this may be accomplished solely based on the cool threshold temperature being reached as discussed herein above.

In still other embodiments, the liquid level sensor 177 may indicate to the controller 199 that the cool beverage reservoir 171 is empty so that the controller 199 can cause the "low coffee" indicator light on the control panel 250 to illuminate. In some embodiments, this may be the only purpose of the liquid level sensor 177 and it may play no role in the opening and closing of the relevant valves as discussed herein.

In the exemplified embodiment, the beverage ice maker 172 comprises an evaporator plate that comprises a vertically mounted metal plate attached to a grid. The system may include refrigerant lines or the like to remove heat from the beverage ice maker 172 to lower its temperature to below freezing. The beverage ice maker 172 forms a grid with a plurality of cube openings, each of which will form a single ice cube during the ice making process described herein below.

In the exemplified embodiment, there is a closed fluid flow circuit formed between the cool beverage reservoir 171, the beverage ice maker 172, and an excess beverage trough 178 positioned downstream of the beverage ice maker 172. Specifically, to form ice from the cooled beverage, the cooled beverage flows from the cool beverage reservoir 171 out of the outlet 174 and then cascades over the beverage ice maker 172 or evaporator. As the cooled beverage cascades over the beverage ice maker 172, some of the cooled beverage freezes into ice. The cooled beverage that freezes into ice will adhere to the grid of the beverage ice maker 172 within one of the cube openings. However, not all of the cooled beverage will freeze into ice in a single pass over the beverage ice maker 172. The cooled beverage that does not freeze becomes excess beverage that is caught in the excess beverage trough 178. The system includes a pump 179 to pump the excess beverage from the excess beverage trough 178 back into the cool beverage reservoir 171, where the excess beverage mixes with any cooled beverage in the cool beverage reservoir 171 and does another pass over the beverage ice maker 172. This process continues until a sufficient amount of the cooled and excess beverage has frozen to make beverage ice cubes 180 of a desired size. The beverage ice cubes 180 are formed by the beverage freezing layer by layer as it cascades over the beverage ice maker 172. Once the beverage ice cubes 180 are formed to a sufficient or desired size, the beverage ice maker or evaporator plate 172 is heated to slightly melt the beverage ice cubes 180 until they fall, by gravity, into the freezer compartment 173 (see FIG. 1) where they are accessible to a user as described below. The freezing subsystem 170 may also include a mechanical component to push the beverage ice cubes away from the beverage ice maker or evaporator 172 to speed up this process rather than waiting for gravity to take the beverage ice cubes from the beverage ice maker 172 to the freezer compartment 173.

Referring to FIGS. 2 and 14, the second housing 300 may include a door 301 that can be altered between a closed state (shown in FIG. 2) and an open state (not shown). The door 301 may be coupled to the second housing 300 via a hinge, or it may be a slidable door such that it can be slid relative to the second housing 300 to gain access into the freezer compartment 173. When the door 301 is open, a passageway into the freezer compartment 173 is created so that a user can reach into the freezer compartment 173 to remove a desired amount of the beverage ice cubes to add to an iced beverage. For example, to convert a hot coffee beverage into an iced coffee beverage, a cup may be filled with the beverage ice cubes (which are formed from hot coffee brewed in the integrated apparatus 100 as described herein), and then a separately brewed hot coffee can be added to the cup. In this way, the beverage ice cubes will convert the hot coffee into an iced coffee without any dilution, thereby maintaining the desired flavor of the coffee.

Referring to FIGS. 1, 3, and 4, complete operation of the integrated apparatus 100 will be described from filling the water tank 111 with water to forming the beverage ice cubes 180. If the water supply inlet 116 is not coupled to a water supply or water source, the first step is for a user to pour water into the water tank 111 of the hot water supply subsystem 110. If the water supply inlet 116 is coupled to a water supply or water source, the first step is for the controller 199 to receive data from the liquid level sensor 119 regarding the amount of water that is in the water tank 111 and to open/close the water supply valve 120 as needed to ensure that a sufficient or desired amount of water is transported into the water tank 111. In embodiments where the water supply inlet 116 is coupled to a water supply, the water tank 111 may always be full or being filled automatically due to communication between the controller 199 and the liquid level sensor 119 and water supply valve 120.

In one embodiment, upon the water tank 111 being filled with a desired amount of the water (i.e., 64 ounces in one embodiment), the controller 199 will activate the heating element(s) 112 to heat the water in the water tank 111. The heating elements 112 will heat the water in the water tank 111 to the hot threshold temperature. In some embodiments, the heating elements 112, by way of instructions received from the controller 199, are configured to maintain the water in the water tank 111 at the hot threshold temperature so that it is prepared for brewing when a brewing activation signal is received by the controller 199, such as by a user pressing a button or otherwise actuation the actuator 252 on the control panel 250. Thus, in such embodiment the water in the water tank 111 is heated to the hot threshold temperature so long as the integrated apparatus 100 is powered on. In this embodiment, the water will remain heated in the water tank 111 until the brewing activation signal is received by the controller 199. In accordance with this embodiment, once the brewing activation signal is received by the controller 199, controller 199 will check to make sure that the water has reached the hot threshold temperature and if so, the controller 199 will automatically open the hot water valve 114 to enable the hot water to flow from the hot water supply subsystem 110 to the brewing subsystem 130.

Figure 10:
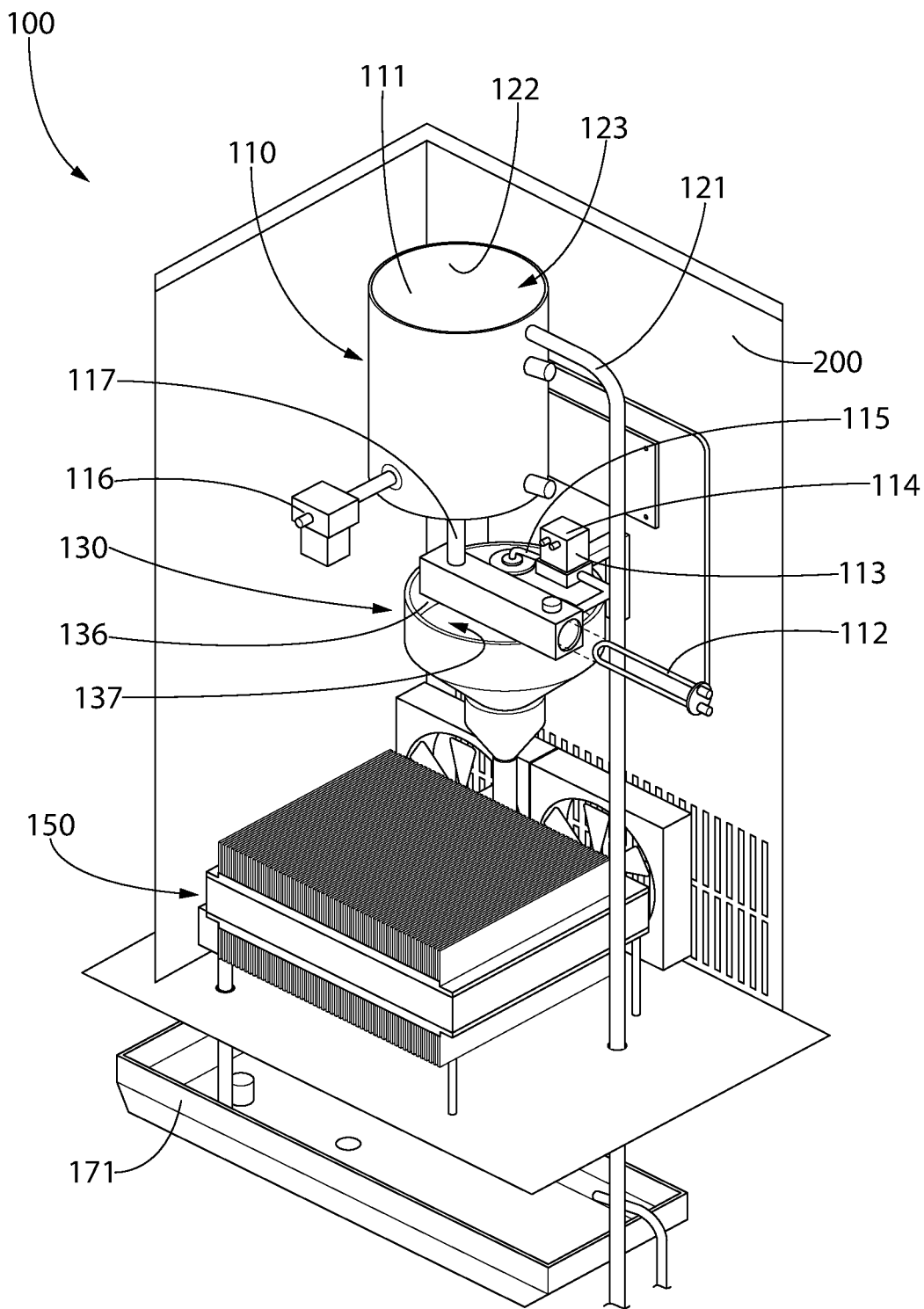
FIG. 10 is a partially cut-away view of the first housing of FIG. 2 in accordance with an alternative embodiment of the present invention.

In an alternative embodiment, the water in the water tank 111 may not be heated until the brewing activation signal is received by the controller 199. Specifically, in this alternative embodiment, the water will be at room temperature in the water tank 111, and then a user will actuate the actuator 252 thereby sending the brewing activation signal to the controller 199. At this time, and not prior, the controller 199 will instruct the heating elements 112 to power on and heat the water. This can occur either within the water tank 111 if the heating element 112 is coupled to the water within the water tank 111 or coupled to the water tank (FIG. 9) or external to the water tank 111 if the heating element 112 is located along a conduit that is outside of the water tank 111 (FIG. 10). In this embodiment, as soon as the water reaches the hot threshold temperature, the controller 199 will open the hot water valve 114 to enable the hot water to flow from the hot water supply subsystem 110 to the brewing subsystem 130 because the brewing activation signal has already been received.

Next, the hot water flows through the mixing apparatus 133 of the brewing subsystem 130, which is prefilled with the filter 134 and the additive 135. Specifically, the hot water will flow through the dispenser 144 and out of the dispenser nozzle(s) into the mixing apparatus 133 which is a container or coffee basket or the like. Within the mixing apparatus 133, the hot water will mix with the additive 135, flow through the additive 135 and the filter 134, and then flow out through the opening 138 in the bottom surface of the mixing apparatus 133 as a hot beverage. In one embodiment, the additive 135 may be ground coffee beans and the hot beverage may be hot coffee as described herein. The flow of the hot water into and through the brewing subsystem 130 is not impeded by any valves. Rather, the hot water will flow through the brewing subsystem 130 from the hot water inlet 131 to the hot beverage outlet 132 unimpeded by valves or other mechanisms to stop the flow of the liquid. The hot beverage will flow from the hot beverage outlet 132, through the hot beverage inlet 151 and into the heat exchanger 160 of the cooling subsystem 150. Thus, once the valve 124 of the hot water supply subsystem 110 is opened, flow of the liquid/water from the water tank 111 to the cooling subsystem 150 occurs via gravity without any valves impeding flow.

Once the controller 199 detects that the hot beverage has entered into the hot beverage cooling tank 161 of the heat exchanger 160, the controller 199 will activate the air flow generator 152 so that it will begin to stream air (i.e., the air flow stream 159) over and across the heat exchanger 160. In some embodiments, the controller 199 will be made aware of the existence of the hot beverage in the hot beverage cooling tank 161 based on signals sent from a liquid level sensor located in the hot beverage cooling tank 161. However, the invention is not to be so limited and the controller 199 may use other mechanisms for determining whether the hot beverage is present in the hot beverage cooling tank 161, including a mass or weight sensor, a temperature sensor, any sensor that may detect the presence or absence of liquid, or any other sensor that may be used to inform the controller 199 of the existence of the hot beverage in the hot beverage cooling tank 161.

Although described herein that the controller 199 only activates the air flow generator 152 when the hot beverage is detected in the hot beverage cooling tank 161, the invention is not to be so limited and in other embodiments the air flow generator 152 may always be activated so long as the integrated apparatus 100 is powered on. In other embodiments, the air flow generator 152 may operate on a cycle independent of the brewing cycles such that the air flow generator activates for five, ten, fifteen, twenty, or the like minutes and then deactivates for five, ten, fifteen, twenty, or the like minutes. Thus, the air flow generator 152 operation may be controlled by the controller 199, it may be preset and operate independently from the controller 199 in accordance with a predetermined schedule, or it may do some combination of the two.

While the hot beverage is stationary within the hot beverage cooling tank 161, the hot beverage cools over time due to the heat from the hot beverage transferring into the hot beverage cooling tank 161 and from there into the ambient environment. This transfer of heat from the hot beverage to the hot beverage cooling tank 161 occurs as a result of heat conduction (when two objects having different temperatures are in contact, heat flows from a hotter material to a cooler material until they are in thermal equilibrium). As noted herein, the hot beverage does not move during this cooling process, but rather remains in a non-moving stationary position within the hot beverage cooling tank 161 with the air stream 159 generated by the air flow generator 152 flowing over the hot beverage cooling tank 161.

While the hot beverage is in the hot beverage cooling tank 161, the second temperature sensor 163 continually monitors the temperature of the hot beverage in the hot beverage cooling tank 161 and transmits the temperature readings to the controller 199. Upon the second temperature sensor 163 detecting that the hot beverage has cooled to the cool temperature threshold (in some embodiments approximately room temperature, although exemplary and non-limiting temperature ranges for the cool temperature threshold are provided herein above), the second temperature sensor 163 transmits this information to the controller 199. Then, the controller 199 opens the cooled beverage valve 154 to allow the cooled beverage to flow from the hot beverage cooling tank 161 of the cooling subsystem 150 into the cool beverage reservoir 171 of the freezing subsystem 170.

In some embodiments, once in the cool beverage reservoir 171 of the freezing subsystem 170, the cooled beverage will immediately pass through the outlet 176 in the floor 174 of the cool beverage reservoir 171 so that it can cascade over the beverage ice maker 172 as discussed above. In other embodiments, the controller 199 may control flow of the cooled beverage from the cool beverage reservoir 171 using a valve system as discussed above. The cooled beverage continues to flow over the beverage ice maker 172 with the excess cooled beverage being caught by the excess beverage trough 178 and pumped back to the cool beverage reservoir 171 as described above. Once a sufficient amount of the liquid has frozen, the beverage ice cubes 180 are removed from the beverage ice maker 172 and transported to the freezer compartment 173 where they can be accessed by a user via the door 301 in the second housing 300 of the integrated apparatus 100.

In one embodiment, the entire process from filling the water tank 111 with water to forming beverage ice cubes may be automated and may occur without any user intervention required. Specifically, the controller 199 may be configured to automatically start a brewing cycle upon receiving a signal that the freezer compartment 173 is low on beverage ice cubes.

Specifically, in such embodiment a sensor in the freezer compartment 173 will inform the processor 199 that the freezer compartment 173 is low on beverage ice cubes, and in response the controller 199 will cause water to be filled into the water tank 111 (via the water supply inlet 116) and will then begin opening and closing valves as heating and cooling requirements of the water and beverage formed therefrom are met as set forth herein. In such an embodiment, the only action that might be required by a user is to ensure that a fresh batch of the additive is located within the mixing apparatus 133, although this part of the process could also be automated in some embodiments.

Thus, using the integrated apparatus, a liquid such as water may be heated, mixed with an additive to convert it to a hot beverage, cooled, and then turned to ice. This entire process, possibly excluding the ice formation process, may occur solely via gravity without the use of any pumps. Furthermore, this entire process may occur automatically simply by a user pressing a button or otherwise actuating the actuator 252 to send a brewing activation signal to the controller 199. There is a minimum of user interaction required for the entire process of providing water, brewing coffee from the water, and then turning that brewed coffee into ice cubes. This ensures that beverage or coffee ice cubes are always available within the integrated apparatus 100 and ready for addition to a drink to create an iced beverage without the typical dilution caused by standard water ice cubes.

Referring to FIGS. 15-23, another embodiment of an integrated apparatus for forming frozen beverage blocks (hereinafter "integrated apparatus") 600 is illustrated and will be described along with a related method of forming frozen beverage blocks. Much of the above-provided disclosure is applicable to the embodiments described below and will not be repeated herein in the interest of brevity. Thus, it should be appreciated that the description above may explain the details of various elements, components, parts, and the like that are not described in detail herein below. To be clear, the integrated apparatus 600 is very similar to the integrated apparatus 100 except that in the integrated apparatus 600 there is no brewing and there are additional components involved in the cooling process that were not included in the integrated apparatus 600. However, there is a great deal of overlap in the different embodiments and the overlapping structures and process steps may not be described in detail below with reference to FIGS. 15-23, it being understood that the description above is fully applicable.

In the exemplified embodiment, the integrated apparatus 600 does not have the capability to brew a beverage. In fact, in the exemplified embodiment the integrated apparatus 600 does not even have the capability to heat a beverage or liquid. Thus, the integrated apparatus 600 does not mix a liquid such as water with a bed of additives to form the beverage. Rather, in the exemplified embodiment of the integrated apparatus 600, the beverage is pre-made and then poured into or otherwise made to flow into the integrated apparatus 600 so that the beverage can be cooled if needed and then turned into frozen beverage blocks. The process of receiving the beverage and converting it into frozen beverage blocks may be fully automated in some embodiments with no action required by a human operator, except possibly to press a power or start button to initiate the operation. In some embodiments, a user need not even press a power or start button but the act of introducing the beverage into the integrated apparatus 600 may initiate operation. For example, a controller may detect that a beverage has been introduced and may automatically start the process of converting the beverage into frozen beverage blocks as described herein.

The term beverage as used herein includes any liquid that is intended for drinking, such as coffee, tea, soda, juice, hot chocolate or the like. Although in most preferable embodiments the beverage is a liquid other than pure water (although it could be water-based), in other embodiments the term beverage could also include pure water and the integrated apparatus 600 could be used to form traditional ice blocks/cubes made from water rather than frozen beverage blocks made from a non-water liquid. The integrated apparatus 600 converts the beverage into frozen beverage blocks so that the frozen beverage blocks can be added into a cup or glass containing the same beverage that was used to form the frozen beverage blocks. In this way, the beverage in the cup or glass can be chilled or cooled without diluting its taste. The frozen beverage blocks could also be added into a glass or cup containing a beverage that is different than the one that was used to create the frozen beverage blocks to create a different flavor profile or the like if so desired.

In certain embodiments, the beverage is intended to be a hot beverage, such as hot coffee, hot tea, hot chocolate, or the like. More specifically, the beverage, at least when initially poured into the integrated apparatus 600, is intended to have a temperature that is greater than 104° F., greater than 110° F., greater than 130° F., greater than 150° F., or the like. When a hot beverage is used, the integrated apparatus 600 is intended to cool the beverage and then convert the beverage from a liquid into a plurality of frozen blocks or cubes. Specifically, the integrated apparatus 600 will cool the hot beverage to a temperature that is at or below 104° F., and then proceed to convert the beverage from its liquid form into a solid frozen form. This is because it takes far too long to convert a hot beverage that is above 110° F., for example, into a frozen block in a freezing subsystem without first cooling the hot beverage to a temperature that is at or below 104° F. in a cooling subsystem. It should be appreciated that the integrated apparatus 600 could work just as well with a non-heated liquid, such as a liquid at or below room temperature or a liquid at or below 104° F. upon its first introduction into the integrated apparatus 600. The integrated apparatus 600 simply has the capability of cooling a beverage before turning it into frozen blocks or cubes, but this cooling capability need not be used each time the integrated apparatus 600 operates.

Figure 15:
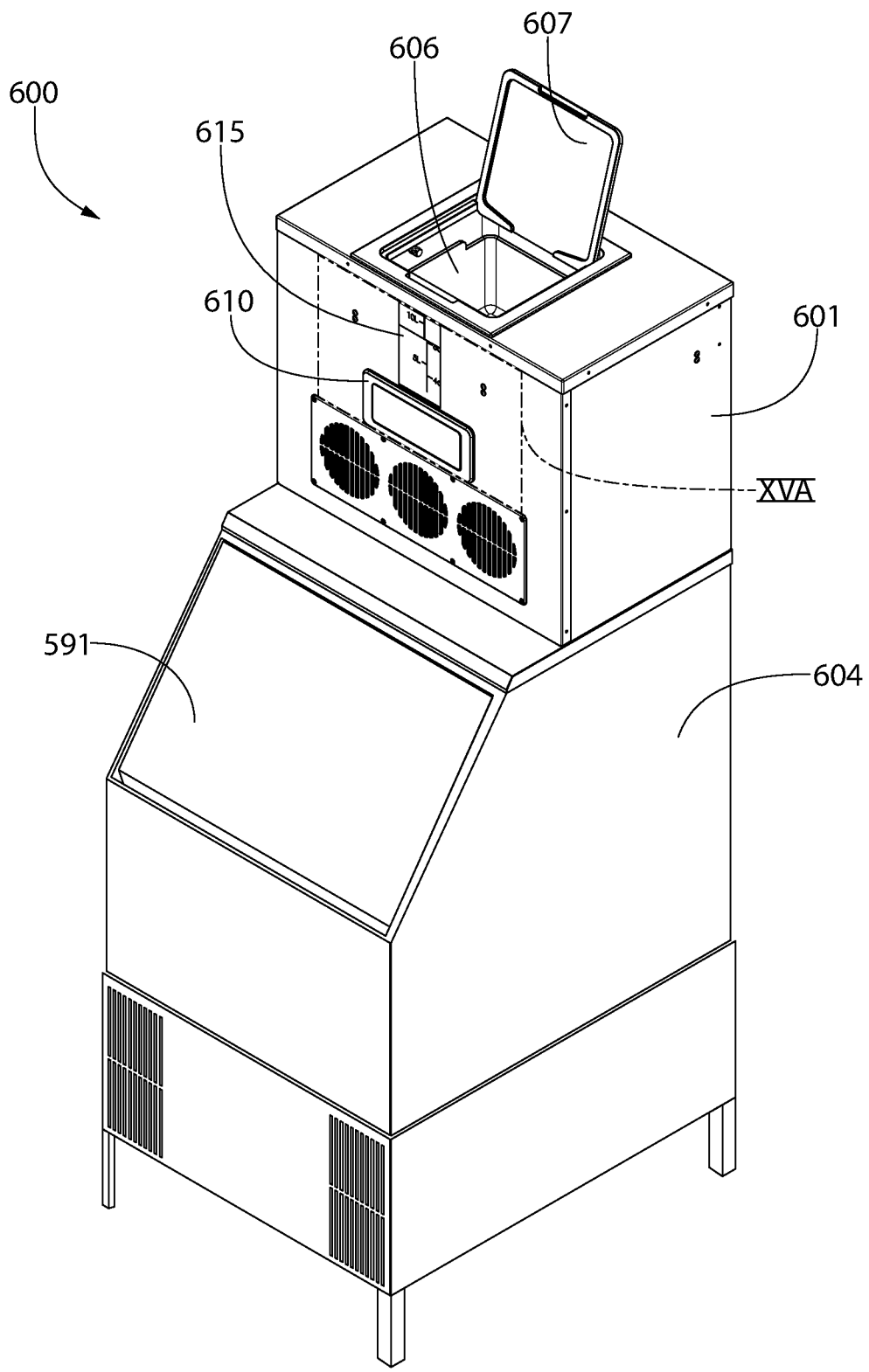
FIG. 15 is a front perspective view of an integrated apparatus for forming frozen beverage blocks from a beverage in accordance with another embodiment of the present invention.
Figure 23:
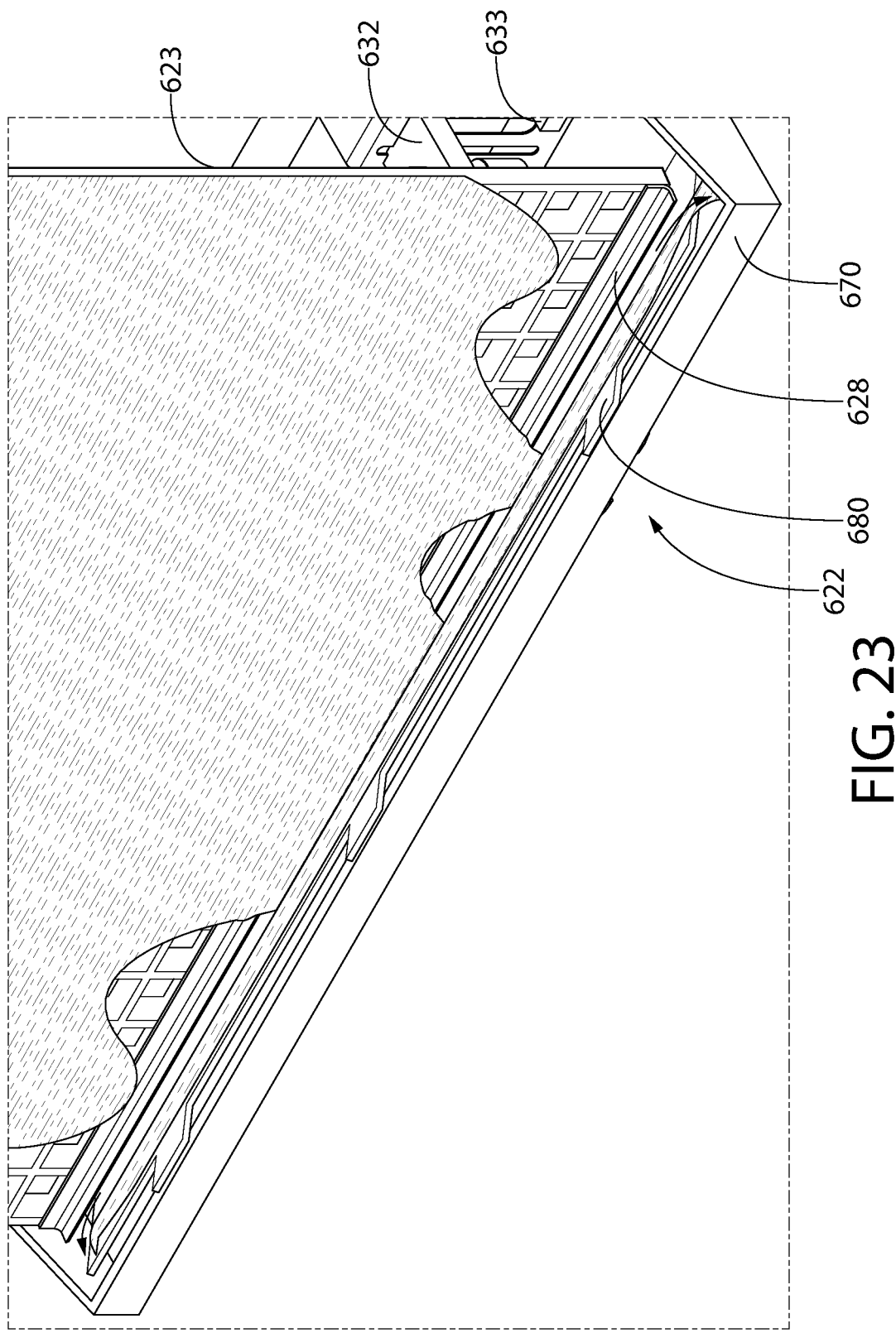
FIG. 23 is a close-up view of a portion of a freezing subsystem of the integrated apparatus of FIG. 15 during operation.

Referring first to FIGS. 15 and 23, the integrated apparatus 600 will be described. The integrated apparatus 600 generally comprises a first housing 601 that houses a beverage receiving subsystem 602 and a cooling subsystem 603 and a second housing 604 that houses a freezing subsystem 605. The first and second housings 601, 604 are coupled together so that the beverage receiving subsystem 602, the cooling subsystem 603, and the freezing subsystem 605 are fluidly coupled together so that a beverage such as coffee, tea, or the like can be cooled if needed and then turned into frozen beverage blocks by flowing through the beverage receiving subsystem 602, the cooling subsystem 603, and the freezing subsystem 605. The term frozen beverage blocks are intended to include a frozen structure having any desired shape, including cube-shaped, round, animal-shaped, theme-shaped or the like. Thus, the invention is in no way limited by the shape of the frozen beverage blocks that are formed using the integrated apparatus 600.

Figure 15A:
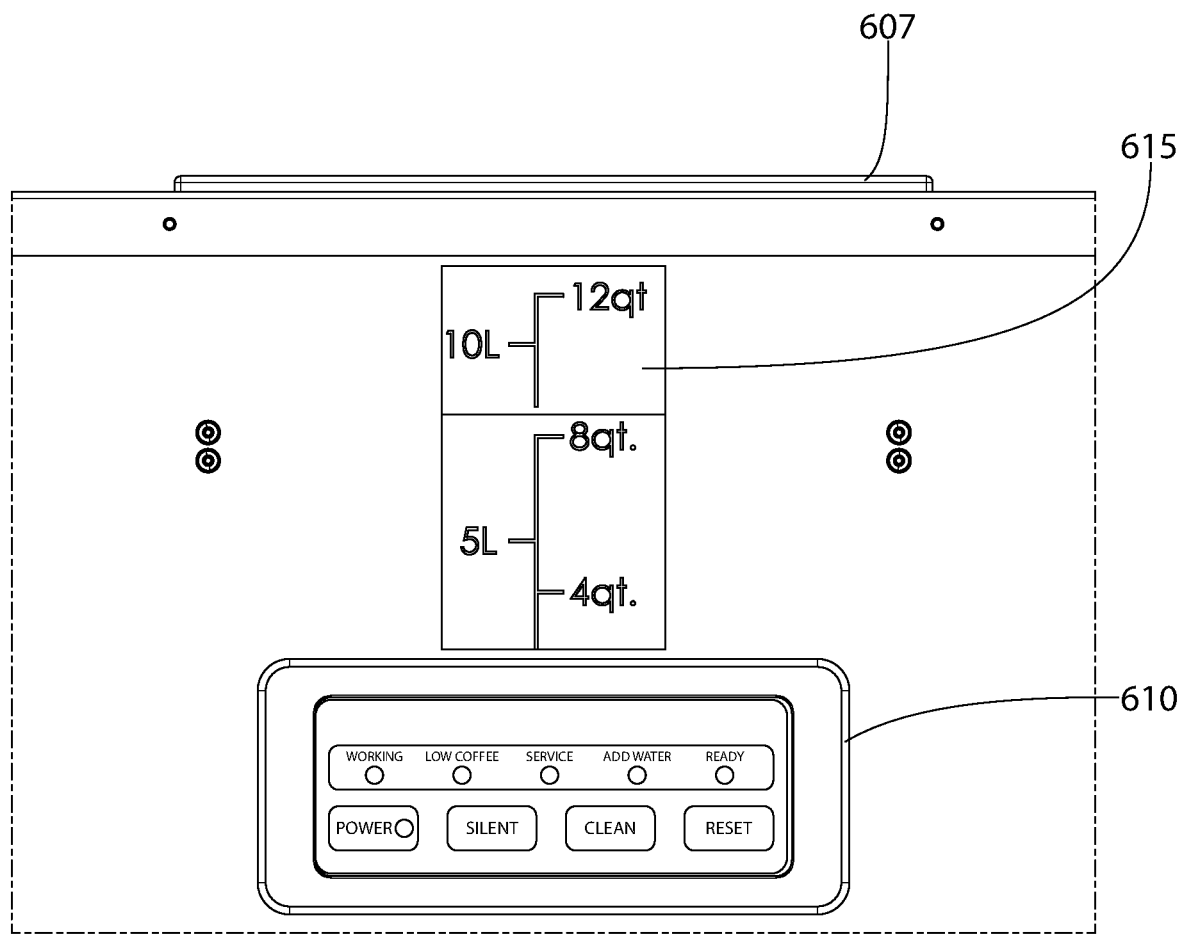
FIG. 15A is a close-up view of area XVA of FIG. 15.

In the exemplified embodiment, the front surface of the first housing 601 of the integrated apparatus 600 includes a control panel 610 and measuring indicia 615. Referring to FIG. 15A, in the exemplified embodiment the control panel 610 comprises several buttons that can be actuated by a user to initiate various processes/operations using the integrated apparatus 600. For example, in the exemplified embodiment the control panel 610 comprises a power button for powering the integrated apparatus 600 on and off, a silent button for reducing the sound level being emitted, a clean button to initiate a cleaning cycle, and a reset button to reset the process/operation. The control panel 610 also comprises several indicator lights including working (indicating that the integrated apparatus is currently working to produce frozen beverage blocks), low coffee (indicating that additional coffee or other beverage should be added to the hot beverage reservoir, described below, if operation is desired to continue), service (indicating that maintenance is needed on the integrated apparatus), and ready (indicating that the integrated apparatus is ready for operation). Of course, more or less indicators and buttons could be added and incorporated into the control panel as needed.

In the exemplified embodiment, the measuring indicia 615 is provided on a transparent or translucent portion of the first housing 601 so that a user can see the liquid level of the beverage in the hot beverage reservoir 606 and determine how much of the beverage is in the hot beverage reservoir 606 using the measuring indicia 615. The measuring indicia 615 is provided in liters and quarts in the exemplified embodiment, but could be in any measurement units as may be desired. The measuring indicia 615 could also be omitted in some embodiments.

The second housing 604 houses the components that are used to form the beverage blocks (i.e., the freezing subsystem 605) and also includes a storage area 590 for storing the beverage blocks after they are formed. The second housing 604 comprises a door 591 that can be moved from a closed position (FIG. 15) to an open position (not shown) to provide a user with access to the beverage blocks in the storage area 590. Thus, when a user needs to add beverage blocks to a drink, a user will open the door 591, remove one or more of the beverage blocks from the storage area 590, and add the beverage blocks to a cup in order to cool a liquid beverage.

Referring to FIGS. 15, 16, 17, and 24 concurrently, the integrated apparatus 600 will be further described. The beverage receiving subsystem 602 generally comprises a hot beverage reservoir 606. In the exemplified embodiment, the hot beverage reservoir 606 comprises a lid 607 that is alterable from an open state (FIG. 15) to a closed state. When in the open state, a beverage can be poured into the hot beverage reservoir 606 and when in the closed state the beverage is prevented from being poured into the hot beverage reservoir 606. The lid 607 may be altered into the open state by pivoting the lid 607 as depicted in the exemplified embodiment, removing the lid 607 from the integrated apparatus 600 completely, or by other means.

The hot beverage reservoir 606 is generally a container or the like having an open top end that can be closed by the lid 607, a closed bottom end, and a sidewall extending from the closed bottom end to the open top end. Thus, the hot beverage reservoir 606 defines an interior space that is configured to hold a volume of a liquid beverage. The hot beverage reservoir 606 comprises an opening 608 in its bottom end or in its sidewall near the bottom end so that the beverage can flow from the interior space defined by the hot beverage reservoir 606 into the cooling subsystem 603. This can be best seen in FIG. 24.

The hot beverage reservoir 606 may also comprise an overflow opening 609 in its sidewall near its open top end. The overflow opening 609 may be operably coupled to a drain or other discharge location via a conduit 610 so that if too much of the beverage is poured into the hot beverage reservoir 606 it can be discharged safely to a desired location rather than having it overflow and create a mess.

The cooling subsystem 603 generally comprises a cooling tube 611 and a chiller tank 612. The cooling subsystem 603 is downstream of the beverage receiving subsystem 602 and the chiller tank 612 is downstream of the cooling tube 611. Thus, during use, the beverage flows from the hot beverage reservoir 606 to the cooling tube 611, through the cooling tube 611 and then into the chiller tank 612. The beverage then rests or is held within the chiller tank 612 until its temperature is measured to be at or below a predetermined threshold temperature, as discussed above and as will be discussed further below. Thus, the beverage is held in the chiller tank 612 and prevented from exiting the chiller tank 612 until the temperature of the beverage is measured to be at or below the predetermined threshold temperature. The cooling subsystem 603 also comprises an air flow generator or fan device 626 that is configured to generate an air flow that is blown across the cooling tube 611 and the chiller tank 612 to cool the beverage as it flows through the cooling tube 611 and as it is held within the chiller tank 612. In the exemplified embodiment, there are three air flow generators 626 positioned side-by-side within the housing 601, although more or less than three air flow generators 626 could be used in other embodiments.

In the exemplified embodiment, the air flow generators 626 are configured to blow ambient temperature air across the cooling tube 611 and the chiller tank 612 to cool the beverage. This is effective in certain embodiments because generally the beverage is in excess of 130° F. or 150° F. when first poured into the hot beverage reservoir 606 and as described herein the air flow generators 626 are only needed to reduce the temperature of the beverage to at or below 104° F. Thus, so long as the air being blown is cooler than the beverage, the air will be effective at cooling the beverage. Thus, blowing ambient temperature air across the cooling tube 611 and the chiller tank 612 will cool the beverage as it flows therethrough because the beverage is at a higher temperature than ambient. Ambient temperature may be between 70° F. and 80° F. in some embodiments.

Figure 18:
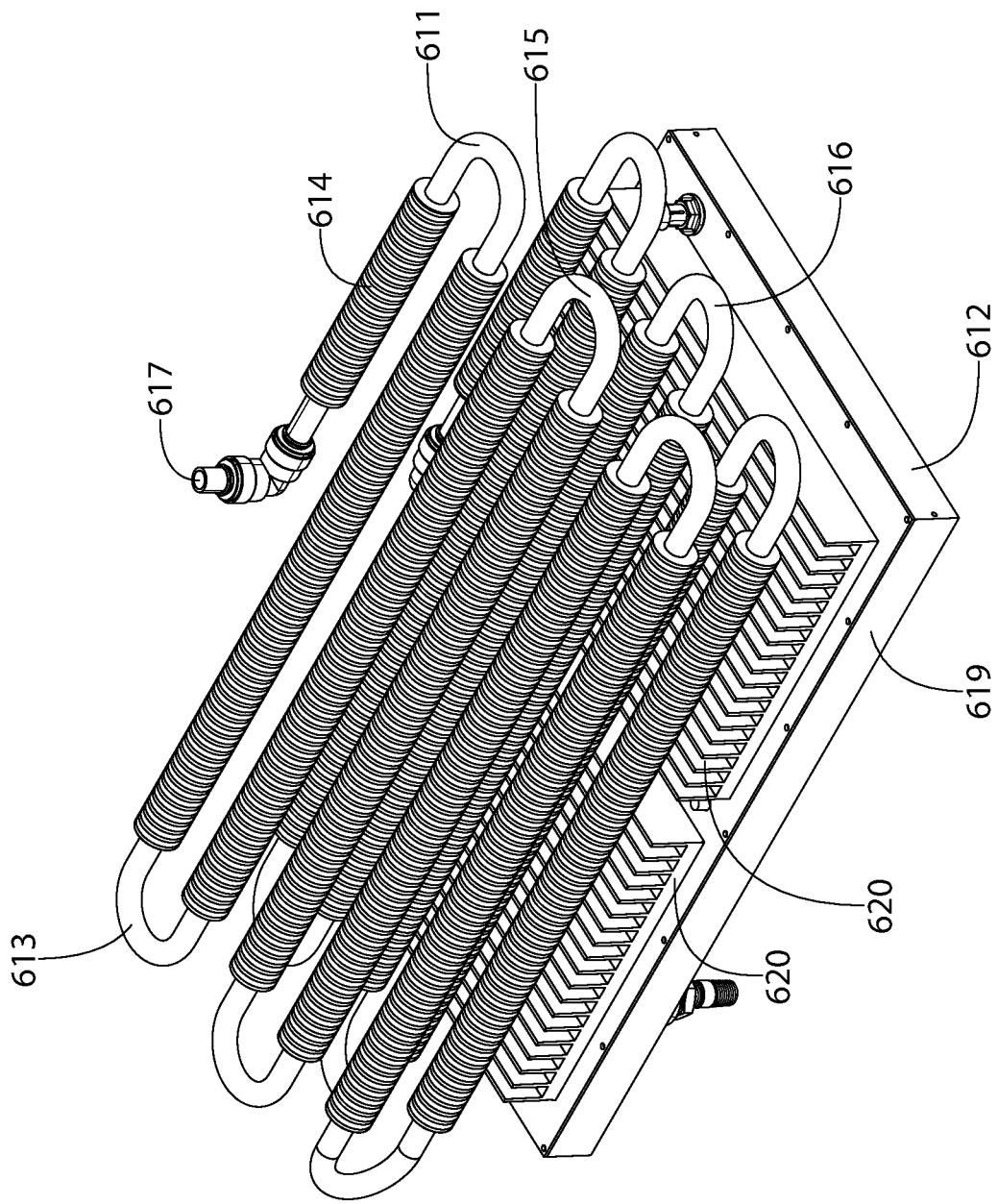
FIG. 18 is a perspective view of a cooling subsystem of the integrated apparatus of FIG. 15 including a cooling tube and a chiller tank.
Figure 19:
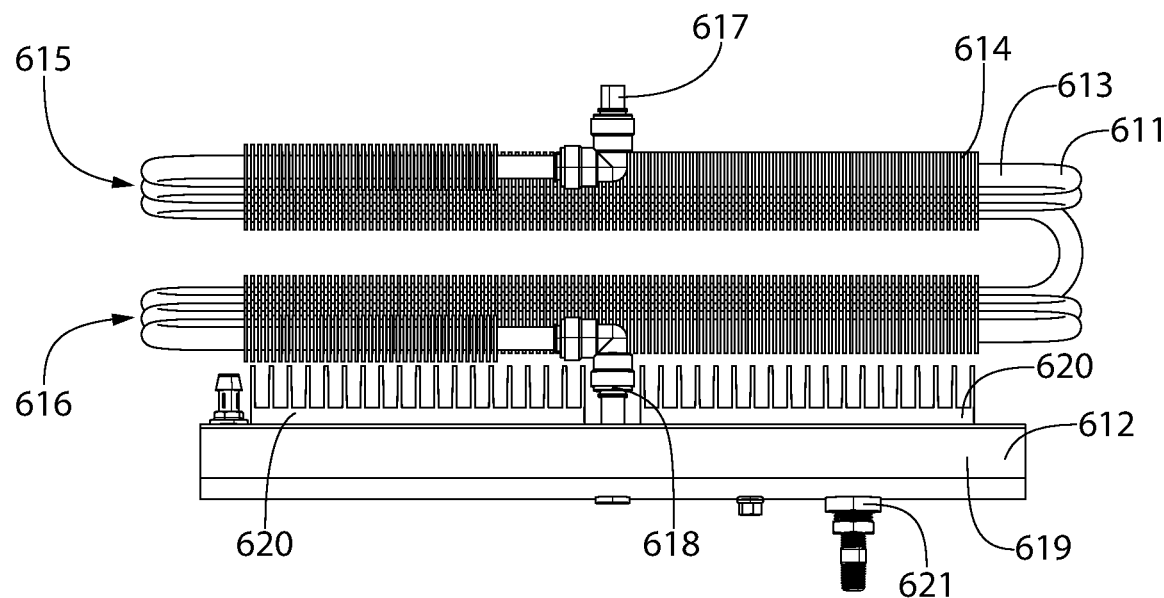
FIG. 19 is a front view of the cooling subsystem of FIG. 18.
Figure 20:
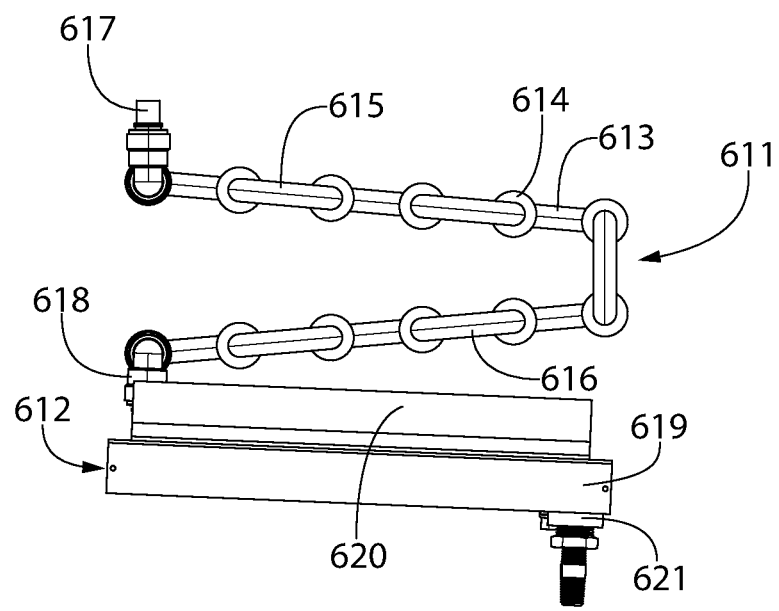
FIG. 20 is a side view of the cooling subsystem of FIG. 19.
Figure 21:
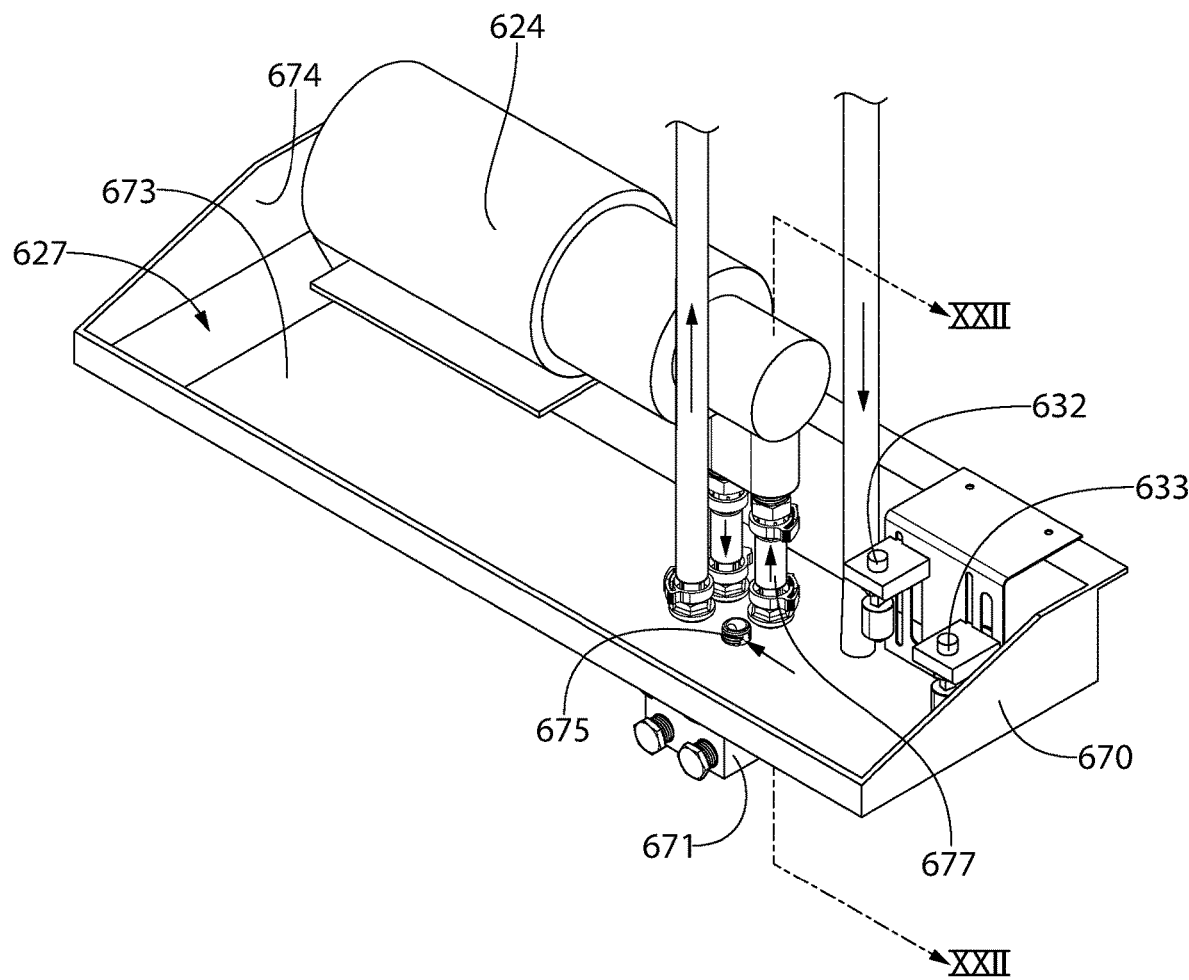
FIG. 21 is a close-up perspective view of portions of a freezing subsystem of the integrated apparatus.

Referring to FIGS. 18-20, the cooling tube 611 and the chiller tank 612 of the cooling subsystem 603 will be described in greater detail. The cooling tube 611 generally comprises a tube portion 613 and a plurality of fins 614 coupled to and extending from the tube portion 613. More specifically, the tube portion 613 comprises an inner surface that defines a flow passageway for the beverage and an outer surface opposite the inner surface. The plurality of fins 614 are coupled to the outer surface of the tube portion 613 and extend therefrom to enhance the cooling of a beverage flowing through the flow passageway. The plurality of fins 614 are arranged on the outer surface of the tube portion 613 in a spaced apart manner and in the exemplified embodiment they extend radially from the tube portion 613. The fins 614 help to remove heat from the beverage as the beverage flows through the cooling tube 611, thereby reducing the temperature of the beverage.

In the exemplified embodiment, each of the fins 614 is in the shape of a rounded disc, although the invention is not to be so limited in all embodiments and the fins 614 may take on other shapes as may be desired. In the exemplified embodiment, the tube portion 613 may be formed from stainless steel and the fins 614 may be formed from aluminum due to the higher thermal conductivity of aluminum as compared to stainless steel. Of course, other materials may be used for the tube portion 613 and the fins 614 so long as they permit the beverage to flow through and be cooled within the cooling tube 611 as described herein. For example, in some embodiments the entirety of the cooling tube 611 may be formed from stainless steel or aluminum, rather than having portions thereof formed from different ones of those materials. Other metals or thermally conductive materials may be used, such as copper, zinc, tungsten, nickel, magnesium, gold, chromium, or the like.

In the exemplified embodiment, the cooling tube 611 is arranged in a serpentine shape and defines a serpentine-shaped flow path. Stated another way, the cooling tube 611 is curved or otherwise bent into a plurality of side-by-side U-shapes with the bight of each U being located opposite the bight of an adjacent U. The serpentine shape forms a curved flow path having multiple turns. More specifically, in the exemplified embodiment the cooling tube 611 comprises a first section 615 having a serpentine shape with multiple turns located adjacent to the hot beverage reservoir 606 and a second section 616 having a serpentine shape with multiple turns located between the first section 615 and the chiller tank 612.

The first section 615 of the cooling tube 611 is oriented at a first angle relative to a horizontal plane and the second section 616 of the cooling tube 611 is oriented at a second angle relative to the horizontal plane (FIG. 20). Thus, the first and second sections 615, 616 collectively form a V-shape due to the angled orientation of the first and second sections 615, 616. The angling of the first and second sections 615, 616 of the cooling tube 611 is important in some embodiments because it allows the beverage to flow through the flow passageway of the cooling tube 611 passively solely due to gravity without the need for any pumps or other forced flow mechanisms to drive the movement of the beverage. Simply by angling the cooling tube 611 relative to a horizontal plane, the beverage will naturally and passively flow through the cooling tube 611 to the chiller tank 612 by the force of gravity.

The first section 615 of the cooling tube 611 is positioned directly above the second section 616 of the cooling tube 611. As a result, the cooling tube 611 takes up less space while maximizing the length of the flow passageway defined by the cooling tube 611 to maximize cooling of the beverage. The longer the period of time that the beverage is flowing through the cooling tube 611 the more the beverage will get cooled (assuming that the temperature of the beverage is above ambient temperature). Thus, by using the serpentine shape and vertically stacking the first and second sections 615, 616 of the cooling tube 611, maximum cooling of the beverage can be achieved within a small overall space. This is important because the integrated apparatus 600 may be used and stored in a coffee shop, for example, and such coffee shops tend to be quite small with little extra space for such machines. Thus, by minimizing the space taken up by the cooling tube 611 while maximizing the cooling result achieved therein, the integrated apparatus 600 can be made smaller to fit in smaller cafes and the like. In fact, in alternative embodiments additional "sections" can be added to the cooling tube 611 which will increase the vertical height of the cooling tube 611 but not the width and depth of the cooling tube 611, if an additional length of the cooling tube 611 would be desirable to provide additional time for the beverage to cool while flowing through the cooling tube 611.

The cooling tube 611 comprises an inlet 617 and an outlet 618. The inlet 617 is operably coupled to the first section 615 of the cooling tube 611 and provides a location at which the beverage can enter into the cooling tube 611 from the hot beverage reservoir 606. The outlet 618 is operably coupled to the second section 616 of the cooling tube 611 and provides a location at which the beverage can flow from the cooling tube 611 to the chiller tank 612.

The chiller tank 612 comprises a tank portion 619 comprising a cavity for holding the beverage and a heat sink 620 coupled to and extending from the tank portion 619. The chiller tank 612 is very similar to the heat exchanger 160 described above, and thus the details of the chiller tank 612 will not be provided herein, it being understood that the details of the heat exchanger 160 described above are applicable. Thus, although there is no view of the chiller tank 612 that allows visualization of the cavity that it comprises, these features should be understood from the description of the heat exchanger 160 above and FIGS. 10-13. The main difference is that where the heat exchanger 160 comprises heat dissipating elements on both sides thereof, the chiller tank 612 includes a heat sink 620 with heat dissipating elements on only one side thereof. As best seen in FIG. 20, the chiller tank 612 is oriented at an angle relative to a horizontal plane to ensure that the beverage contained therein flows to the outlet 621 of the chiller tank 612 via gravity.

Figure 16:
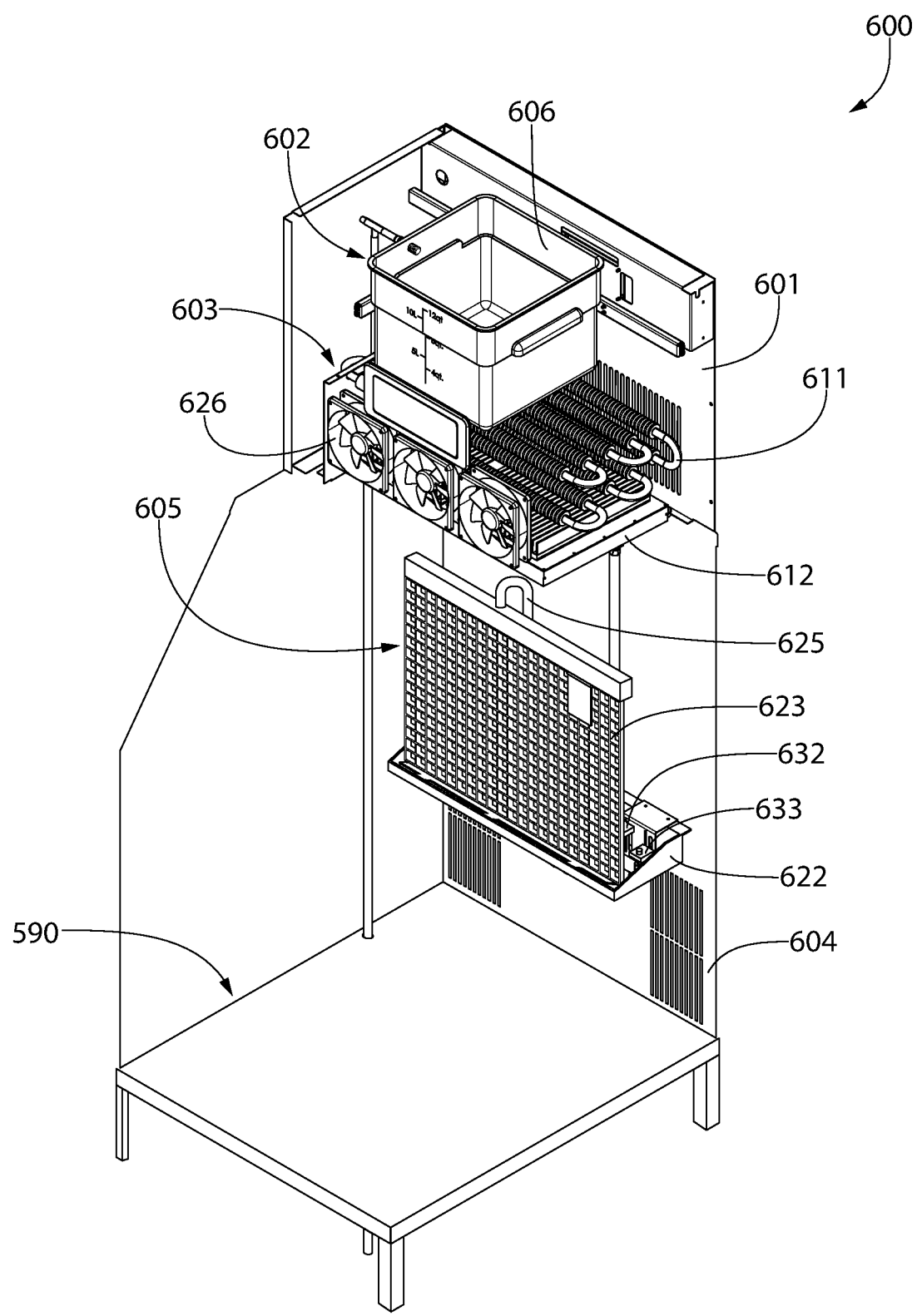
FIG. 16 is a partially cut-away front perspective view of the integrated apparatus of FIG. 15.
Figure 17:
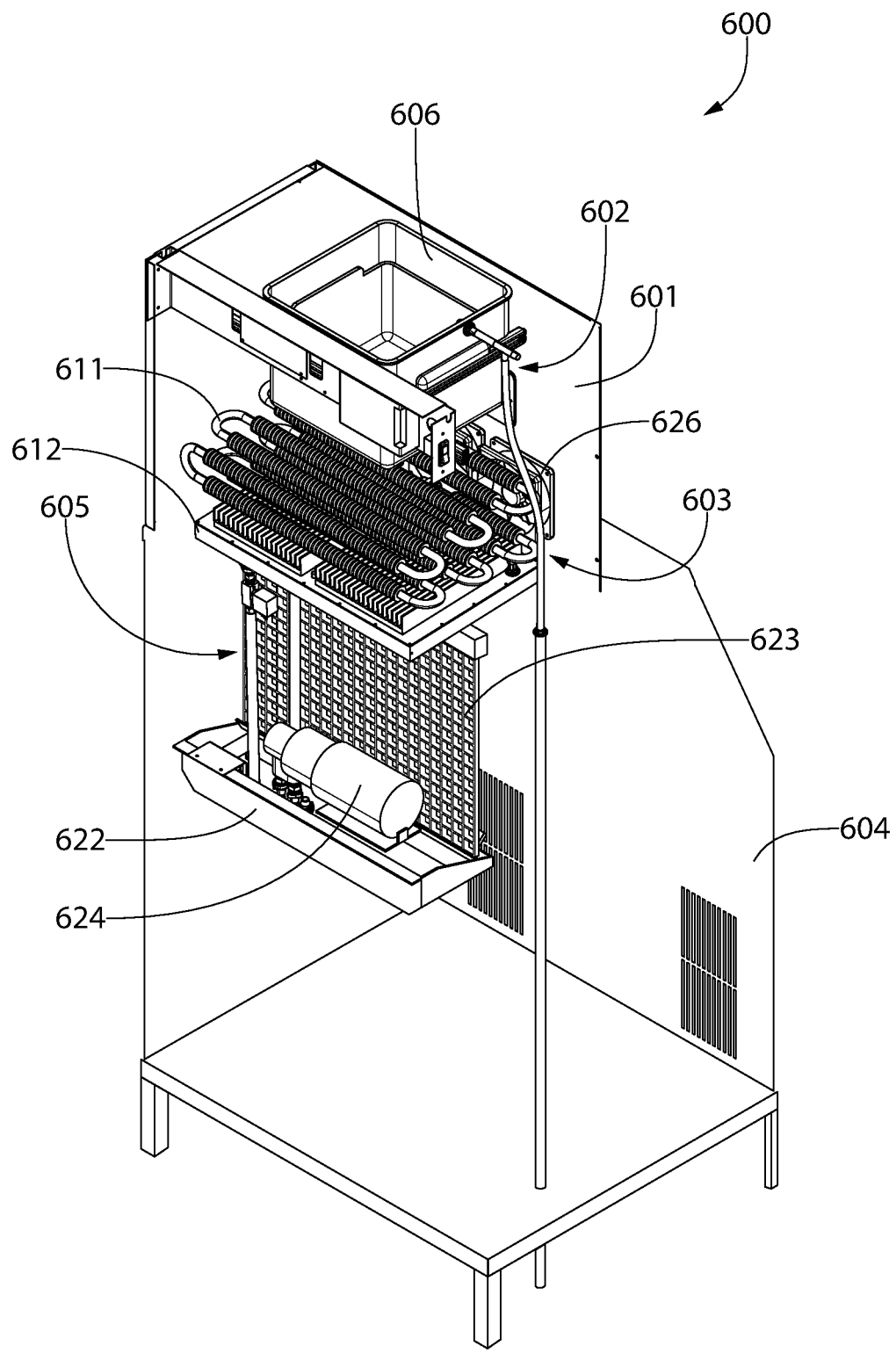
FIG. 17 is a partially cut-away rear perspective view of the integrated apparatus of FIG. 15.

Referring to FIGS. 16, 17, and 23, the freezing subsystem 605 will be briefly described. The freezing subsystem 605 generally comprises a cool beverage reservoir 622 and an evaporator 623. The evaporator 623 is the same as the evaporator or beverage ice maker 172 described above in the previous embodiment and thus it will not be described in great detail herein, it being understood that the description provided above is applicable. Furthermore, the general manner in which the freezing sub-system 605 generates or forms frozen beverage blocks using the evaporator 623 will not be described, it having been described in detail above. However, generally, the freezing subsystem 605 comprises a pump 624 for pumping the beverage from the cool beverage reservoir 622 to the top of the evaporator 623, where the beverage is allowed to cascade down the evaporator 623 and turn to frozen beverage blocks. Portions of the beverage that do not freeze flow back into the cool beverage reservoir 622 where they are again pumped to the top of the evaporator 623 and made to cascade down the evaporator. Thus, there is a closed-loop flow between the cool beverage reservoir 622 and the evaporator 623 to achieve the freezing of the beverage into the frozen beverage blocks 650. This process continues in as many cycles as are needed to freeze a sufficient amount of the beverage to form the frozen beverage blocks 650. The freezing subsystem 605 also comprises a conduit 624 that facilitates the flow of the beverage from the cool beverage reservoir 622 to the top of the evaporator 623.

In the exemplified embodiment, the pump 624 is an Axel Mag Pump (e.g., a magnetic pump that uses an impeller to create suction to move the beverage from the cool beverage reservoir 622 to the top end of the evaporator 623). However, the invention is not to be so limited in all embodiments and other types of pumps may be used in other embodiments.

The pump 624 of the exemplified embodiment is intended to be mounted horizontally within the integrated apparatus 600 so that the propeller of the pump 624 is not submerged within the beverage. This is done because when the propeller is submerged, it has the potential to churn the beverage into foam which is undesirable. The actuation of the impeller of the pump 624 is created by magnets inside of the pump 624, which increases the life-cycle of the pump 624. The pump 624 may have a customizable suction power, and hence a customizable flow rate. In the exemplified embodiment, the pump 624 is configured to operate with a flow rate of 0.3 to 2.0 gallons per minute, more specifically 0.5 to 1.5 gallons per minute, and still more specifically 0.7 to 1.0 gallons per minute. It has been determined that flow rates above the higher points in the ranges provided may cause the beverage to foam, which as mentioned is undesirable because the foam can spill out of the integrated apparatus 600 and such foam makes for poor frozen beverage blocks.

Referring to FIGS. 21-24, the freezer subsystem 605 will be further described. The cool beverage reservoir 622 comprises a collection trough 670 and a collection tank 671 that are fluidly coupled together. The collection trough 671 comprises a cavity 627 and the collection tank 671 comprises a cavity 672 that are collectively configured to hold a volume of the beverage. The collection trough 670 comprises a floor 673 and a sidewall 674 extending from the floor 673 to an open top end. There are multiple openings in the floor 673 of the collection trough 670. Specifically, there is a first opening 675 in the floor 673 of the collection trough 670 to permit the beverage to flow from the collection trough 670 into the collection tank 671. The collection tank 671 has a much smaller volume capacity than the collection trough 670, so only a small percentage of the beverage will flow from the collection trough 670 into the collection tank 671 before the collection tank 671 is full. Thus, in the cool beverage reservoir 622, most of the beverage will be located in the collection trough 670 and a portion of the beverage will flow into the collection tank 671.

There is a second opening 676 in the floor 673 of the collection trough 670 through which a pump conduit 677 extends. The pump conduit 677 has a first end 678 that is located in the cavity 672 of the collection tank 671 and a second end 679 that is coupled to the pump 624. Thus, the beverage that is pumped from the cool beverage reservoir 622 is taken directly from the cavity 672 of the collection tank 671. Specifically, during operation the pump 624 pulls the beverage from the cavity 672 of the collection tank 671, through the pump conduit 677, and then to the evaporator 623 to form the frozen beverage blocks 650 as described herein. This ensures that the pump 624 is always pulling the beverage from the lower-most or deepest point of the cool beverage reservoir 622 (i.e., from within the cavity 672 of the collection tank 671) to prevent air from being pulled into the pump 624. Of course, in alternative embodiments the collection tank 671 could be omitted and the beverage could be pulled from a bottom region of the cavity 627 of the collection trough 670. However, it has been found that using the collection tank 671 is the most effective way to ensure that no air is pulled in through the pump, which can create an undesirable result in terms of frozen beverage block formation. As can be seen, the pump 624 is horizontally oriented and is entirely removed from the cavity 627 of the collection trough 670 such that no part of the pump 624 is submerged in the beverage during operation as noted above.

Figure 22:
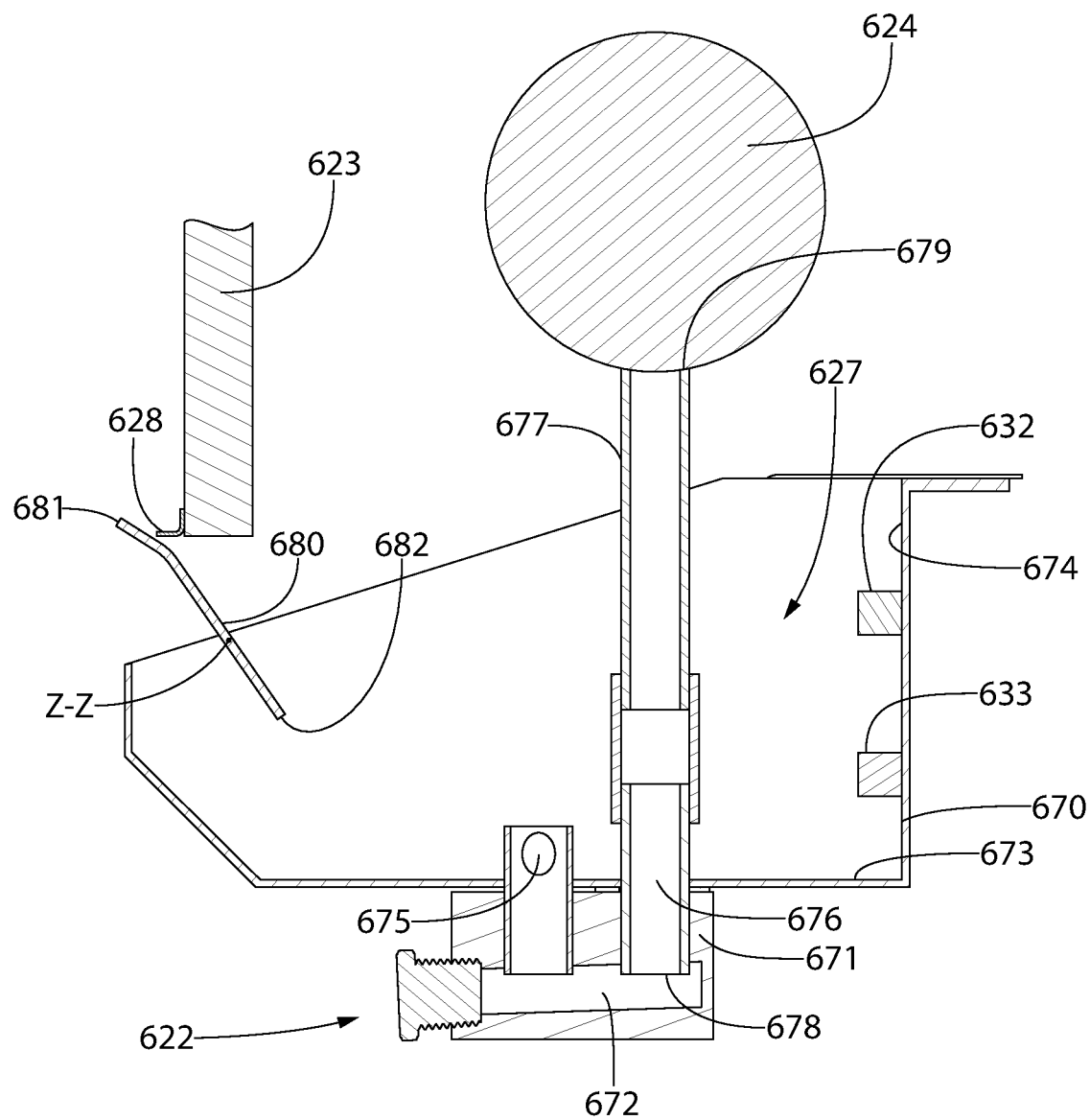
FIG. 22 is a cross-sectional view taken along line XXII-XXII of FIG. 21.

Furthermore, as best seen in FIGS. 22 and 23, an evaporator lip 628 is coupled to a bottom end of the evaporator 623 and protrudes from one of the two opposing major surfaces of the evaporator 623. In the exemplified embodiment, the evaporator lip 628 is an L-shaped component such that a horizontally extending lip thereof extends perpendicularly from the evaporator 623. The evaporator lip 628 is intended to catch the beverage as it flows down the evaporator 623 before the beverage is able to fall into the cavity 627 of the cool beverage reservoir 622. Thus, as shown in FIG. 22, the beverage falls, flows, or cascades down the front surface of the evaporator 623 during use. As the beverage cascades down the front surface of the evaporator 623, some of the beverage freezes and remains coupled to the evaporator 623 within one of the grid-like openings and the rest of the beverage remains in liquid form and falls until it contacts the evaporator lip 628. The evaporator lip 628 is secured tight against the front surface of the evaporator 623. Thus, the beverage flows along the evaporator lip 628 prior to falling into the cavity 627 of the collection trough 670 cool beverage reservoir 623.

Even more specifically, the integrated apparatus 600 also comprises a flap member 680 that is pivotably coupled to the collection trough 670. The flap member 680 is capable of pivoting or rotating about a rotational axis Z-Z. The flap member 680 has a first end 681 that is located very close to the evaporator lip 628 and a second end 682 that is located within the cavity 627 of the collection trough 670 of the cool beverage reservoir 622. Thus, the beverage will flow along the evaporator lip 628 until it reaches a distal end of the horizontal portion of the evaporator lip 628, at which time the beverage will flow onto the flap member 680. The beverage will then flow along the flap member 680 and into the cavity 627 of the collection trough 670 and eventually will flow off of the flap member 680 at the second end 682 of the flap member 680 and into the cavity 627 of the collection trough 670. Because the second end 682 of the flap member 680 is located in the collection trough 670, this results in a very short drop for the beverage, if there is any drop at all, dependent on the level of the beverage that is already present in the collection trough 670.

For example, if the second end 682 of the flap member 680 is submerged in the beverage, the beverage that is flowing down the flap member 680 will simply flow directly into the beverage in the collection trough 670. If the second end 682 of the flap member 680 is not submerged in the beverage, the beverage flowing down the flap member 680 will fall off of the second end 682 of the flap member 680 and free fall until it either contacts the floor 673 of the collection trough 670 or until it contacts any other beverage that is already in the collection trough 670. In either case, having the flap member 680 extending into the cavity 627 of the collection trough 670 reduces the distance that the beverage free falls into the collection trough 670, which prevents the beverage from foaming. If the beverage were to free fall from the evaporator 623 into the collection trough 670 (i.e., if the evaporator lip 628 and/or the flap member 680 were omitted), the impact of the beverage with the floor 673 of the collection trough 670 or with any other beverage already in the collection trough 670 would create foam due to the free fall distance of the beverage. The structure depicted in FIG. 22 and described above reduces this distance, thereby reducing or eliminating foam generation.

Thus, the evaporator lip 628, alone and/or in combination with the flap member 680, prevents the beverage from cascading down the front surface of the evaporator 623 and immediately falling into the cool beverage reservoir 622, which would require the beverage to fall a distance of 2-3 inches or so depending on the volume of the beverage that is in the cool beverage reservoir 622 at the time. The reason that this is important is that if the beverage were coffee, for example, the act of the coffee falling from the evaporator 623 into the cool beverage reservoir 622 would cause the coffee to foam upon impact. Specifically, the coffee free-falling the 2-3 inches into the cool beverage reservoir 622 before contacting the floor of the cool beverage reservoir 622 or other beverage located in the cool beverage reservoir 622 would cause the coffee (and some other beverages) to foam. Because the coffee is cold as it is being turned to a frozen coffee block by the evaporator 623, the coffee foam becomes thick and compounds. Thus, the foam would build over time and eventually spill out of the cool beverage reservoir 622 and down the back of the integrated apparatus 600, causing a fairly large mess. The foam would also eventually be passed through the pump 624 which would cause the frozen beverage blocks to have large air bubbles in them, which is not ideal.

Thus, the evaporator lip 628 allows the coffee (or other beverage) to continue flowing along parts of the machine into the cool beverage reservoir 622 rather than free-falling for too great of a distance before the beverage makes impact within the cool beverage reservoir 622 or any beverage already present therein. As a result, the beverage (i.e., coffee) does not foam (or any foam generated is minimal) and the frozen beverage blocks that are formed are free of air bubbles and foam does not leak out of the machine. Thus, when the machine is being used to make coffee or other beverages that may foam upon impact as described herein, the evaporator lip 628 is important for successful operation of the integrated apparatus 600.

Figure 24:
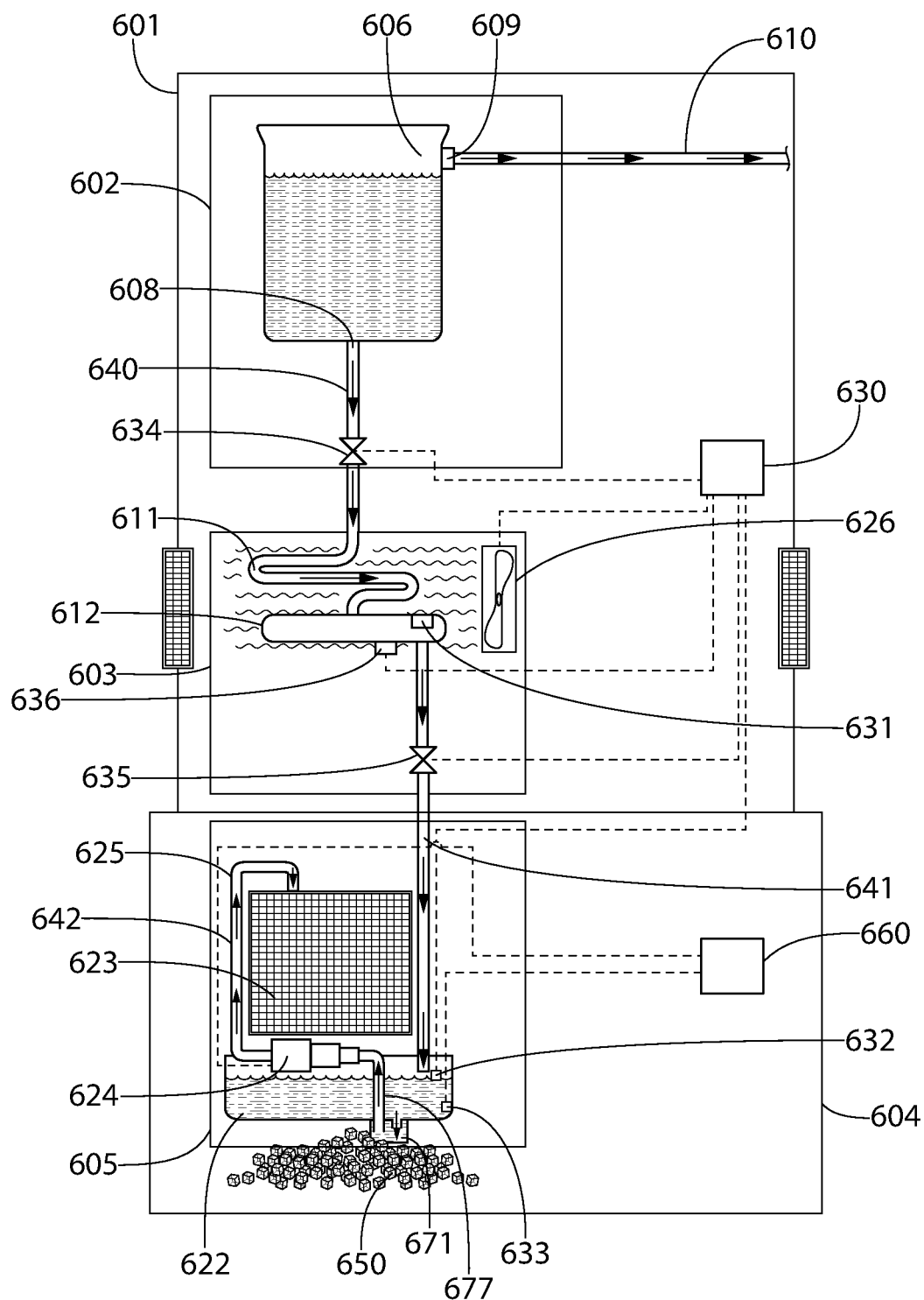
FIG. 24 is a fluid circuit schematic of the integrated apparatus of FIG. 15.

Referring to FIG. 24, the electronic components of the integrated apparatus 600 will be described. The integrated apparatus 600 comprises a first controller 630 and a second controller 660 that control the process steps and method of operation of the integrated apparatus 600. Thus, the first and second controllers 630, 660 may be any computer or central processing unit (CPU), microprocessor, micro-controller, computational device, or circuit configured for executing some or all of the processes described herein, including without limitation: (1) activation and deactivation of an air flow generator; and (2) opening and closing of valves, based on input received from various sensors. The first and second controllers 630, 660 may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by the processor which is operably connected thereto. The memory device may store algorithms and/or calculations that can be used (by the processor) to determine when to open/close and activate/deactivate the various electrical components of the system described herein. The first and second controllers 630, 660 may include or be operably coupled to a power source in some embodiments as has been described in detail above.

The integrated apparatus 600 comprises a first liquid level sensor 631 that is configured to detect when a liquid level of the beverage in the chiller tank 612 is at or above an upper threshold, a second liquid level sensor 632 that is configured to detect when a liquid level of the beverage in the cool beverage reservoir is at or above an upper threshold, and a third liquid level sensor 633 that is configured to detect when a liquid level of the beverage in the cool beverage reservoir is at or below a lower threshold. The first and second liquid level sensors 631, 632 are operably coupled to the first controller 630 so that the first controller 630 can use the information/data provided to it by the first and second liquid level sensors 631, 632 to control the opening and closing of valves, the fan device 626, and the like as described herein. The third liquid level sensor 633 is operably coupled to the second controller 660 so that the second controller 660 can control the activation/deactivation of the pump 624, and the like, as described herein.

In the exemplified embodiment, the integrated apparatus comprises a first valve 634 downstream of the hot beverage reservoir 606 and upstream of the cooling tube 611 of the cooling subsystem 603 and a second valve 635 downstream of the chiller tank 612 of the cooling subsystem 603 and upstream of the cool beverage reservoir 622 of the freezing subsystem 605. In the exemplified embodiment, each of the first and second valves 634, 635 is operably coupled to the first controller 630. The fan device 626 is also operably coupled to the first controller 630 as shown in FIG. 24. The pump 624 and the third liquid level sensor 633 are operably coupled to the second controller 660. Thus, the first controller 630 is able to control the opening and closing of the first and second valves 634, 635 and activation/deactivation of the fan device 626 and the second controller 660 is able to control activation and deactivation of the pump 624 based on information they receive from the various sensors including the first, second, and third liquid level sensors 631, 632, 633, and a temperature sensor 636, as described herein.

Figure 25:
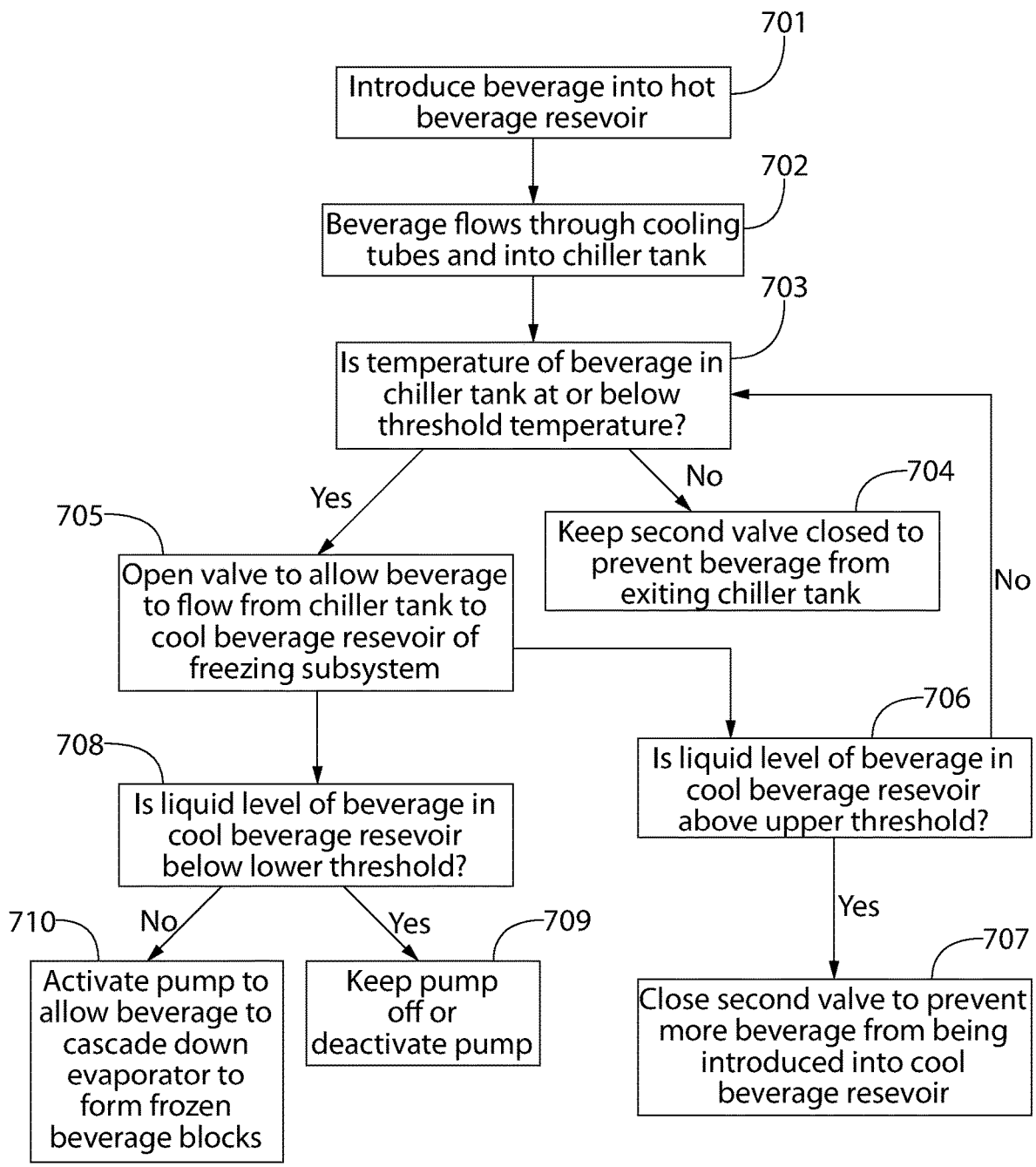
FIG. 25 is a block diagram of the processing sequence during operation of the integrated apparatus of FIG. 15.

Referring to FIGS. 24 and 25, operation of the integrated apparatus 600 in accordance with a method of forming frozen beverage blocks will be described. The first step in the process is to introduce a beverage into the hot beverage reservoir 606 of the beverage receiving subsystem 601 (Step 701). This can include pouring the beverage from a different container, cup, or the like into the hot beverage reservoir 606, transporting the beverage through a conduit into the hot beverage reservoir 606, or the like. In some embodiments, upon introducing the beverage into the hot beverage reservoir 606, the beverage will immediately flow into the cooling subsystem 603 (Step 702). In other embodiments, a user must first press power or start on the control panel 610 of the integrated apparatus 600 before the beverage will flow from the hot beverage reservoir 606 to the cooling subsystem 603. Thus, in some embodiments the first valve 634 is closed until a user presses the power button on the control panel 610, and such pressing of the power button will cause the first controller 630 to open the first valve 634. In other embodiments, the first valve 634 may be omitted or only used to prevent the beverage from flowing out of the hot beverage reservoir 606 when the chiller tank 612 is full, as described directly below.

The opening and closing of the first valve 634 may also, or alternatively, be controlled in another way. Specifically, as noted above the first liquid level sensor 631 provides information to the first controller 630 regarding the level of the beverage in the chiller tank 612. Thus, if the first liquid level sensor 631 measures the liquid level of the beverage in the chiller tank 612 to be above a pre-determined upper threshold, the controller may close the first valve 634 to ensure that additional amounts of the beverage do not flow into the chiller tank 612 to prevent the chiller tank 612 from overflowing. In other embodiments, additional amounts of the beverage may simply be held in the cooling tube 611 and in a first conduit 640 that extends between the hot beverage reservoir 606 and the cooling tube 611 if the chiller tank 612 is full and cannot hold any more of the beverage. Thus, in some embodiments the first liquid level sensor 631 may also be omitted.

As noted above, the beverage that is poured or otherwise introduced into the hot beverage reservoir 606 may be hot, such as above 104° F., above 110° F., above 130° F., above 150° F., above 170° F., or the like. However, this is not required and the beverage could have any temperature desired including temperatures below 104° F. Once the beverage is released from the hot beverage reservoir 606, the beverage flows through the first conduit 640 and into the passageway of the cooling tube 611 of the cooling subsystem 610. In some embodiments, the fan device 626 is operating to generate an air stream or to blow cool air as soon as a user presses the start or power button on the control panel 610. In other embodiments, the first controller 630 may activate the fan device 626 as soon as the beverage flows from the hot beverage reservoir 606 into the cooling subsystem 603. Either way, as the beverage flows through the cooling tube 611 of the cooling subsystem 610, cooling air (which may be at ambient temperature) generated by the fan device 626 is blown across the cooling tube 611 to cool the beverage, if such cooling is needed (i.e., if the beverage is above 104° F., or if the beverage has a temperature that is above ambient). In some embodiments, the fan device 626 may be operating even if the temperature of the beverage is already below the predetermined threshold temperature noted herein. In some embodiments, the fan device 626 is activated by the first controller 630 when the temperature sensor 636 measures the temperature of the beverage to be at or above the predetermined threshold temperature.

As described above, in the exemplified embodiment the beverage flows along a serpentine flow path within the passageway of the cooling tube 611. The heat of the beverage will dissipate through the tube portion 613 and the fins 614 of the cooling tube 611 to reduce the temperature of the beverage as the cooling air generated by the fan device 626 is blown across the cooling tube 611. The beverage flows through the cooling tube 611 passively such that the flow is entirely gravity driven because the cooling tube 611 is angled relative to a horizontal plane as described above. Thus, the beverage will flow through the cooling tube 611 being cooled all the while. Eventually, the beverage will reach the outlet of the cooling tube 611, at which time the beverage will flow into the cavity of the chiller tank 612.

The cooling air generated by the fan device 626 blows across the chiller tank 612 to continue cooling the beverage while the beverage is located within the chiller tank 612. In some embodiments the cooling air generated by the fan device 626 may be blown simultaneously across the cooling tube 611 and the chiller tank 612. In other embodiments, the direction at which the cooling air is blown may change depending on the location of the beverage in the system. Thus, if the beverage is in the cooling tube 611, the cooling air will be blown across the cooling tube 611 and if the beverage is in the chiller tank 612, the cooling air will be blown across the chiller tank 612.

When the beverage reaches the chiller tank 612, the second valve 635 will generally be closed, at least initially, to hold the beverage in the chiller tank 612 or prevent the beverage from exiting the chiller tank 612 and flowing into the freezing subsystem 605 until the temperature of the beverage in the chiller tank 612 is measured to be at or below a predetermined threshold temperature. In that regard, the integrated apparatus 600 comprises a temperature sensor 636 that is configured to measure the temperature of the beverage that is located within the chiller tank 612 (Step 703). The temperature sensor 636 is operably coupled to the first controller 630 so that the first controller 630 can control the opening/closing of the second valve 635 based on the temperature of the beverage in the chiller tank 612. If the temperature sensor 636 measures the temperature of the beverage in the chiller tank 612 to be above the predetermined threshold temperature, the first controller 630 will keep the second valve 635 closed to prevent the beverage from exiting the chiller tank 612 (Step 704). Upon the temperature sensor 636 measuring the temperature of the beverage in the chiller tank 612 to be at or below the predetermined threshold temperature, the first controller 630 will open the second valve 635, thereby allowing the beverage to flow from the chiller tank 612 to the cool beverage reservoir 622 (Step 705). In the exemplified embodiment, the flow of the beverage from the chiller tank 612 to the cool beverage reservoir 622 is entirely passive and gravity driven such that no pumps or other mechanisms are required to drive this flow. The beverage flows along a second conduit 641 from the chiller tank 612 to the cool beverage reservoir 622.

In some embodiments, the flow rate of the beverage through the second valve 635 is in a range of 0.5 to 4 gallons per minute, more specifically 0.5 to 3 gallons per minute, and still more specifically 1 to 2 gallons per minute. The reason for this is that it ensures that the first controller 630 has sufficient time to re-close the second valve 635 as soon as the temperature sensor 636 measures the temperature of the beverage to be above the predetermined threshold temperature. For example, in some embodiments the beverage may fill the chiller tank 612, the cooling tubes 611, the conduit 640, and the hot beverage reservoir 606. The temperature sensor 636 is only measuring the temperature of the beverage that is in the chiller tank 612. Thus, as soon as the temperature of the beverage that is in the chiller tank 612 is at or below the predetermined threshold temperature, the first controller 630 will open the valve and allow the beverage to flow into the freezing subsystem 605. As soon as the temperature sensor 636 measures the beverage to above the predetermined threshold temperature, the first controller 630 will close the second valve 635. However, if the flow of the beverage through the second valve 635 is too fast, some of the hotter beverage that was located in the cooling tubes 611, the conduit 640, and/or the hot beverage reservoir 606 may also flow through the second valve 635 before the first controller 630 has a chance to close the second valve 635. Thus, by keeping the flow rate of the beverage through the second valve 635 to the range noted above, this can be kept to a minimum or prevented.

In the exemplified embodiment, the predetermined threshold temperature may be approximately 104° F. In some embodiments, approximately may include a 10% increase or decrease from the provided value. In other embodiments, the predetermined threshold temperature may be exactly 104° F. Thus, until the beverage in the chiller tank 612 reaches 104° F., the beverage will be held in the chiller tank 612 and prevented from flowing into the freezing subsystem 605.

The reason for this is that if the beverage is above 104° F., it will take far too long for the freezing subsystem 605 to form frozen beverage blocks from the beverage. It has been determined that 104° F. is an optimal temperature that results in an optimal time period in terms of both cooling the beverage in the cooling subsystem 603 and freezing the beverage in the freezing subsystem 605. If one has to wait until the beverage temperature is much below 104° F., it will take too long to cool the beverage in the cooling subsystem 603 and if the beverage is released from the chiller tank 612 when much above 104° F. it will take too long to freeze the beverage in the freezing subsystem 605. Furthermore, temperatures hotter than 104° F. may damage the pump 624. In some embodiments, the predetermined threshold temperature may be in a range of 80° F. to 120° F., more specifically 95° F. to 110° F., more specifically 100° F. to 105° F., and more specifically approximately 104° F. Of course, if the beverage is already below the predetermined threshold temperature upon it being introduced into the hot beverage reservoir 606, the beverage will be immediately released from the chiller tank 612 (so long as there is sufficient space in the cool beverage reservoir 622 to receive the beverage, as discussed below) because additional cooling of the beverage will not be needed. Thus, the beverage may be introduced into the apparatus with a lower temperature without affecting the operation. The machine is merely capable of cooling the beverage to below the predetermined threshold temperature if such cooling is needed.

The entirety of the flow of the beverage along a first flow path from the hot beverage reservoir 606 of the beverage receiving subsystem to the cool beverage reservoir 622 of the freezing subsystem 605 may be gravity driven. This includes flow of the beverage from the hot beverage reservoir 606 through the first conduit 640, into and through the cooling tube 611, into the chiller tank 612, and from the chiller tank 612 into and through the second conduit 641, and from the second conduit 641 into the cool beverage reservoir 622. Although there are first and second valves 634, 635 located along the first flow path in the exemplified embodiment, there are no pumps or other components that drive the flow other than gravity.

Once a sufficient amount of the beverage is within the cool beverage reservoir 622 of the freezing subsystem 605, the freezing subsystem 605 operates to convert the liquid beverage into frozen beverage blocks. During operation of the freezing subsystem 605, the beverage is pumped by the pump 624 along a closed-loop flow path from the cool beverage reservoir 622 and through a cool beverage conduit 642 to a top end of the evaporator 623. Next, the beverage cascades down the evaporator 623 until the beverage contacts the evaporator lip 628. Next, the beverage falls from the evaporator lip 628 back into the cool beverage reservoir 622 (possibly via the flap member 680 as described above). The beverage may go through multiple cycles within the closed-loop flow path until enough of the beverage has frozen to form frozen beverage cubes 650. Specifically, the evaporator is very cold and will eventually freeze the beverage. However, because the beverage may initially be around 100° F. when it enters the freezing subsystem 105, it will likely take several passes of the beverage through the closed-loop flow path before it freezes. As the beverage continues to cascade down the evaporator 623, more and more of the beverage freezes such that the beverage freezes in layers within the openings in the evaporator 623 (which is in the form of a grid). This process is the same as the process described above with regard to the earlier described embodiment.

In this embodiment, there are two liquid level sensors in the cool beverage reservoir 622, the second liquid level sensor 632 and the third liquid level sensor 633. As noted above, the second liquid level sensor 632, which is operably coupled to the first controller 630, is configured to detect when a liquid level of the beverage in the cool beverage reservoir 622 is at or above an upper threshold. The third liquid level sensor 633, which is operably coupled to the second controller 660, is configured to detect when the liquid level of the beverage in the cool beverage reservoir 622 is at or below a lower threshold. Thus, upon the liquid level of the beverage in the cool beverage reservoir 622 being measured by the second liquid level sensor 632 to be at or above the upper threshold (Step 706), the first controller 630 may close the second valve 634, which is located upstream of the cool beverage reservoir 622 and downstream of the chiller tank 612, to prevent an additional amount of the beverage from flowing from the chiller tank 612 to the cool beverage reservoir 622 (Step 707). This prevents the beverage from overflowing the cool beverage reservoir 622. If the liquid level of the beverage in the cool beverage reservoir is not above the upper threshold (Step 706), the second valve 635 will be open if the temperature of the beverage in the chiller tank 612 is also at or below the threshold temperature. Thus, the opening and closing of the second valve 635 is controlled (by the first controller 630) by the temperature detected by the temperature sensor 636 (closed when temperature is above predetermined threshold and open when temperature is below predetermined threshold) and by the second liquid level sensor 632 (open when the liquid level is below the upper threshold and closed when the liquid level is at or above the upper threshold).

Furthermore, upon the liquid level of the beverage in the cool beverage reservoir 622 being measured by the third liquid level sensor 633 to be at or below the lower threshold (708), the second controller 660 may deactivate the pump 624 and prevent the beverage from flowing through the closed-loop flow path (709). This is done when the liquid level is too low to prevent the pump 624 from sucking in air. The reason is that if the pump 624 sucks in air, foam will be generated in the beverage (particularly when the beverage is coffee). As noted above, such foam is undesirable as it creates frozen beverage blocks with air bubbles therein and other deformities and also may cause the beverage to foam and overflow out of the machine. When the liquid level of the beverage in the cool beverage reservoir 622 is measured to be above the lower threshold (Step 710), the pump 624 is activated and the beverage is made to flow along the closed fluid flow path noted above. The pump will remain activated 624 and the beverage will undergo several cycles through the closed fluid flow path as needed to freeze a sufficient amount of the beverage to form the frozen beverage blocks 650.

The invention described herein can be used to cool a hot beverage and then convert the hot beverage from a liquid into frozen beverage blocks. Thus, for example, a user may brew a pot of coffee and then immediately introduce the coffee into the integrated apparatus 600 without spending any time pre-cooling the coffee. Thus, the coffee may be approximately between 195° F. and 205° F. at the time that it is first introduced into the hot beverage reservoir 606. The coffee will flow through the cooling tubes 611 and then be held in the chiller tank 612 while cooling air blows across the cooling tubes 611 and the chiller tank 612 to reduce the temperature of the coffee. The coffee will be prevented from exiting the chiller tank 612 until the temperature of the coffee has been reduced to at or below the threshold temperature, which in the exemplified embodiment is approximately 104° F. (or the ranges provided above). Once the beverage temperature reaches the predetermined threshold temperature, the beverage may be released from the chiller tank 612 into the freezing subsystem 605 where the beverage can be converted from its liquid form to a solid, frozen form (i.e., frozen coffee blocks).

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An apparatus for forming frozen beverage blocks comprising:
    a beverage receiving inlet configured to receive a beverage;
    a holding tank configured to hold the beverage that is introduced into the beverage receiving inlet;
    a freezing subsystem comprising a cool beverage reservoir and an evaporator, the cool beverage reservoir comprising a collection trough that is configured to receive the beverage upon the beverage being released from the holding tank and a collection tank, the collection trough comprising a floor having an opening that provides a pathway from the collection trough into the collection tank so that a portion of the beverage located in the collection trough flows into the collection tank;
    a pump subsystem comprising a pump conduit having a first end located in the collection tank of the cool beverage reservoir and a second end that is coupled to a pump; and
    wherein the pump subsystem is configured to pump the beverage from the cool beverage reservoir to a top of the evaporator, the beverage configured to cascade down the evaporator and either freeze along the evaporator to form the frozen beverage blocks from the beverage or flow back into the cool beverage reservoir to be pumped once again to the top of the evaporator.

2. The apparatus according to claim 1 wherein the collection trough has a first volume and the collection tank has a second volume, the first volume being greater than the second volume.

3. The apparatus according to claim 1 further comprising an evaporator lip coupled to a bottom end of the evaporator and a flap member having an upper portion positioned adjacent to the bottom end of the evaporator and a lower portion located within the collection trough, and wherein portions of the beverage that cascade down the evaporator to the bottom end of the evaporator without freezing flow along the evaporator lip and the flap member whereby the portions of the beverage are reintroduced into the collection trough of the cool beverage reservoir.

4. The apparatus according to claim 3 wherein the flap member is sloped relative to a surface of the beverage in the collection trough.

5. The apparatus according to claim 1 wherein the pump is oriented horizontally and is positioned external to the cool beverage reservoir so that the pump is not submerged in the beverage contained in the cool beverage reservoir.

6. A method of forming frozen beverage blocks comprising:
    introducing a beverage into a beverage receiving reservoir;
    flowing the beverage from the beverage receiving reservoir into a holding tank;
    upon the temperature of the beverage in the holding tank being measured to be at or below a predetermined lower threshold temperature, allowing the beverage to flow from the holding tank into a cool beverage reservoir of a freezing subsystem;
    measuring a liquid level of the beverage in the cool beverage reservoir of the freezing subsystem using a liquid level sensor that is operably coupled to a controller;
    upon the liquid level of the beverage in the cool beverage reservoir being measured by the liquid level sensor to be at or above a predetermined upper threshold, the controller closing a second valve that is located downstream of the holding tank and upstream of the freezing subsystem so that the beverage cannot flow from the holding tank into the freezing subsystem; and
    forming frozen beverage blocks from the beverage in the freezing subsystem.

7. The method according to claim 6 wherein the beverage flows from the beverage receiving reservoir into the holding tank solely via gravity, and wherein the beverage flows from the holding tank into the freezing subsystem solely via gravity.

8. The method according to claim 6 wherein the beverage flows along a first flow path, solely via gravity, from the beverage receiving reservoir to the cool beverage reservoir of the freezing subsystem, and wherein the beverage is pumped in multiple cycles along a second closed-loop flow path from the cool beverage reservoir, through a cool beverage conduit, along an evaporator, and back into the cool beverage reservoir during the formation of the frozen beverage blocks.

9. The method according to claim 6 further comprising:
    measuring the temperature of the beverage in the holding tank using a temperature sensor that is operably coupled to a controller; and
    upon the temperature of the beverage being measured to be at or below the predetermined lower threshold temperature, the controller opening a valve that allows the beverage to gravity flow from the holding tank to the cool beverage reservoir of the freezing subsystem.

10. The method according to claim 6 wherein the beverage is coffee.

11. The method according to claim 6 wherein forming frozen beverage blocks from the beverage comprises pumping the beverage from the cool beverage reservoir of the freezing subsystem to a top end of an evaporator of the freezing subsystem with a pump that is operably coupled to a controller, the beverage cascading downwardly along the evaporator of the freezing subsystem from the top end of the evaporator to a bottom end of the evaporator and either freezing along the evaporator to form the frozen beverage blocks or flowing back into the cool beverage reservoir, wherein the beverage flows continuously along a closed-loop flow path between the cool beverage reservoir and the evaporator until either: (1) the pump is deactivated; or (2) the beverage freezes.

12. The method according to claim 6 wherein the freezing subsystem comprises a pump that is mounted horizontally so that a propeller of the pump is not submerged within the beverage located within the cool beverage reservoir of the freezing subsystem.

13. The method according to claim 12 wherein the pump is operable to pump the beverage from the cool beverage reservoir at a flow rate between 0.3 and 2.0 gallons per minute.

14. A method of forming frozen beverage blocks comprising:
introducing a beverage into a beverage receiving reservoir;
flowing the beverage from the beverage receiving reservoir into a holding tank;
upon the temperature of the beverage in the holding tank being measured to be at or below a predetermined lower threshold temperature, allowing the beverage to flow from the holding tank into a cool beverage reservoir of a freezing subsystem; and
forming frozen beverage blocks from the beverage in the freezing subsystem;
wherein forming frozen beverage blocks from the beverage comprises pumping the beverage from the cool beverage reservoir of the freezing subsystem to a top end of an evaporator of the freezing subsystem with a pump that is operably coupled to a controller, the beverage cascading downwardly along the evaporator of the freezing subsystem from the top end of the evaporator to a bottom end of the evaporator and either freezing along the evaporator to form the frozen beverage blocks or flowing back into the cool beverage reservoir, wherein the beverage flows continuously along a closed-loop flow path between the cool beverage reservoir and the evaporator until either: (1) the pump is deactivated; or (2) the beverage freezes; and
wherein, prior to flowing from the evaporator back into the cool beverage reservoir, the beverage flows along an evaporator lip located along the bottom end of the evaporator and from the evaporator lip to a flap member that extends into the cool beverage reservoir to reduce a distance that the beverage free falls into the cool beverage reservoir and prevent the beverage from foaming.

15. The method according to claim 11 further comprising flowing the beverage from a collection trough of the cool beverage reservoir into a collection tank of the cool beverage reservoir through an opening in a floor of the collection trough, and wherein the pump is fluidly coupled to the beverage in the collection tank so that the beverage that is pumped to the top end of the evaporator is taken directly from the collection tank.

* * * * *